United States Patent
Mochizuki et al.

(10) Patent No.: US 12,257,933 B2
(45) Date of Patent: Mar. 25, 2025

(54) ROTATING DEVICE FOR VEHICLE INTERIOR ITEM, AND ROTATING DEVICE FOR VEHICLE SEAT

(71) Applicant: TS TECH CO., LTD., Asaka (JP)

(72) Inventors: Haruki Mochizuki, Tochigi (JP); Akira Miyoshi, Tochigi (JP); Takuji Kaneda, Tochigi (JP); Hirohisa Abe, Tochigi (JP)

(73) Assignee: TS TECH CO., LTD., Asaka (JP)

(*) Notice: Subject to any disclaimer, the term of this patent is extended or adjusted under 35 U.S.C. 154(b) by 0 days.

(21) Appl. No.: 18/643,450

(22) Filed: Apr. 23, 2024

(65) Prior Publication Data

US 2024/0270129 A1    Aug. 15, 2024

Related U.S. Application Data

(63) Continuation of application No. 18/354,236, filed on Jul. 18, 2023, now Pat. No. 12,012,019, which is a
(Continued)

(30) Foreign Application Priority Data

May 31, 2019 (JP) .................................. 2019-102647
Jul. 4, 2019 (JP) .................................. 2019-125481
(Continued)

(51) Int. Cl.
*B60N 2/14* (2006.01)
*B60N 2/12* (2006.01)
(Continued)

(52) U.S. Cl.
CPC ............... *B60N 2/146* (2013.01); *B60N 2/12* (2013.01); *B60N 2/02246* (2023.08); *B60N 2/20* (2013.01)

(58) Field of Classification Search
CPC ...... B60N 2/146; B60N 2/12; B60N 2/02246; B60N 2/20; B60N 2/0705; B60N 2/01541; B60N 2/02253; B60N 2/0732
See application file for complete search history.

(56) References Cited

U.S. PATENT DOCUMENTS 3,338,622 A    8/1967 Bachmann
5,292,179 A    3/1994 Forget
(Continued)

FOREIGN PATENT DOCUMENTS

JP    H 02-74427 A    3/1990
JP    H 05-330371 A    12/1993
(Continued)

OTHER PUBLICATIONS

Chinese Office Action for corresponding Chinese Application No. 202080039331.X, dated Mar. 23, 2023, 12 pages.
(Continued)

*Primary Examiner* — Mark R Wendell
(74) *Attorney, Agent, or Firm* — Dority & Manning, P.A.

(57) ABSTRACT

A rotating device for a vehicle interior item is provided with latching means that is provided on a side of a base member having a rotation support part, and engagement means that is provided on a side of a rotating member supporting a vehicle interior item and being rotatably supported by the rotation support part, and can be switched between a state in which the engagement means engages with the latching means so as to suppress detachment of the rotating member from the base member and a state in which the engagement with the latching means is released when the rotating member attains the rotatable state, wherein the latching means and the engagement means are disposed further outside than the rotating member in plan view at least when the rotating member is in the non-rotating state. Accordingly, it is possible to suppress an increase in the height
(Continued)

while suppressing detachment when the vehicle interior item is not rotating.

8 Claims, 35 Drawing Sheets

Related U.S. Application Data continuation of application No. 17/614,778, filed as application No. PCT/JP2020/021399 on May 29, 2020, now abandoned.

(30) Foreign Application Priority Data

Dec. 3, 2019 (JP) .................................. 2019-218991
Apr. 23, 2020 (JP) .................................. 2020-076526

(51) Int. Cl.
  *B60N 2/02* (2006.01)
  *B60N 2/20* (2006.01)

(56) References Cited

U.S. PATENT DOCUMENTS

| | | |
|---|---|---|
| 10,730,409 B2 | 8/2020 | Linnberg |
| 10,988,054 B1 | 4/2021 | Sturhan et al. |
| 11,420,573 B2 | 8/2022 | Yamamoto |
| 2007/0284905 A1 | 12/2007 | Bailey |
| 2010/0109380 A1 | 5/2010 | Jorgensen |

FOREIGN PATENT DOCUMENTS

| | | |
|---|---|---|
| JP | H 07-223473 A | 8/1995 |
| JP | H 08-67181 A | 3/1996 |
| JP | H 08-113065 A | 5/1996 |
| JP | H 09-286263 A | 11/1997 |
| JP | 2002-347497 A | 12/2002 |
| JP | 2004-123044 A | 4/2004 |
| JP | 2004-291723 A | 10/2004 |
| JP | 2006-304538 A | 11/2006 |
| JP | 2010-173491 A | 8/2010 |
| JP | 2017-094875 A | 6/2017 |
| JP | 2019-199163 A | 11/2019 |

OTHER PUBLICATIONS

Extended European Search Report for corresponding European Application No. 20814499.8, dated Jul. 11, 2023, 7 pages.
International Search Report and Written Opinion with English Translation issued in PCT/JP2020/021399, dated Jul. 7, 2020 (8 pages).
Japanese Office Action (w/ English translation) for corresponding Application No. 2019-102647, dated Aug. 2, 2023, 10 pages.
Japanese Office Action (w/ English translation) for corresponding Application No. 2019-218991, dated Jan. 30, 2024, 8 pages.
Search Report received in corresponding Application No. 24153950. 1, dated Apr. 19, 2024, 7 pages.

ROTATING DEVICE FOR VEHICLE INTERIOR ITEM, AND ROTATING DEVICE FOR VEHICLE SEAT

CROSS REFERENCE TO RELATED APPLICATIONS

This application is a continuation of U.S. application Ser. No. 18/354,236, filed on Jul. 18, 2023, which is a continuation of U.S. application Ser. No. 17/614,778, filed on Nov. 29, 2023, which is the U.S. National Stage entry of International Application No. PCT/JP2020/021399, filed on May 29, 2020, which claims priority to Japanese Patent Application No. 2019-102647, filed on May 31, 2019; Japanese Patent Application No. 2019-125481, filed on Jul. 4, 2019; Japanese Patent Application No. 2019-218991, filed on Dec. 3, 2019; and Japanese Patent Application No. 2020-076526, filed on Apr. 23, 2020, all of which are incorporated herein by reference in their entireties for all purposes.

TECHNICAL FIELD

The present invention relates to a rotating device for a vehicle interior item that includes a base member that has a rotation support part, a rotating member that supports the vehicle interior item, is rotatably supported by the rotation support part, and is disposed above the base member, rotation-locking means that enables the rotating member to be switched between a rotatable state and a non-rotatable state, latching means that is provided on the base member side, and engagement means that is provided on the rotating member side and can be switched between a state in which the engagement means engages with the latching means when the rotating member is in the non-rotating state so as to suppress detachment of the rotating member from the base member and a state in which the engagement with the latching means is released when the rotating member attains the rotatable state, and to a rotating device for a vehicle seat in which the vehicle interior item is a vehicle seat.

BACKGROUND ART

A rotating device for a vehicle seat in which a rotating member supporting a vehicle seat as a vehicle interior item is rotatably supported by a base member, engaging a lock pin on the rotating member side with a lock hole on the base member side when the rotating member is not rotating restricts rotation of the vehicle seat and also suppresses detachment of the vehicle seat when a large load acts on the vehicle seat, and when rotating the rotating member, that is, the vehicle seat, disengaging the lock pin from the lock hole releases the suppression of detachment and enables rotation of the vehicle seat is known from Patent Document 1.

PRIOR ART DOCUMENTS

Patent Documents

Patent Document 1: Japanese Patent Application Laid-open No. 05-330371
Patent Document 2: Japanese Patent Application Laid-open No. 2010-173491
Patent Document 3: Japanese Patent Application Laid-open No. 2004-123044

SUMMARY OF THE INVENTION

Problems to be Solved by the Invention

<First Problem>
Accompanying an increase in the elements necessary for a vehicle seat in recent years, a reduction in the size of the vehicle seat is required, but in an arrangement that includes detachment suppression means as disclosed in Patent Document 1 above, the height tends to increase by a proportion corresponding to the detachment suppression means, and there is therefore a desire for an arrangement that can prevent the height of a rotating device for a vehicle interior item such as a vehicle seat from increasing even it includes detachment suppression means, that is, a desire for solving the first problem.

The present invention has been accomplished in light of such circumstances, and it is a first object thereof to provide a rotating device for a vehicle interior item that can solve the first problem by enabling an increase in the height to be suppressed while suppressing detachment when the vehicle interior item such as a vehicle seat is not rotating, and to provide a rotating device for a vehicle seat in which the vehicle interior item is a vehicle seat.

<Second Problem>
Furthermore, a vehicle seat device that includes a rotation mechanism having a rotating member having mounted thereon a seat cushion frame supporting a seat cushion and a base member rotatably supporting the rotating member from below, and making a seat rotatable with respect to a floor is known from Patent Document 2, etc.

In order to facilitate operation of the rotation mechanism disposed beneath a seat cushion, the entry of foreign matter into the rotation mechanism should be avoided as much as possible, but Patent Document 2 does not disclose a structure that can solve the second problem, for example, one that suppresses the entry of foreign matter into the rotation mechanism.

It is a second object of the present invention to provide a vehicle seat device that can solve the second problem by suppressing the entry of foreign matter into a rotation mechanism.

<Third Problem>
Moreover, a vehicle seat device that includes a seat cushion frame supporting a seat cushion, a rotation mechanism disposed beneath the seat cushion frame while having a rotating member supporting the seat cushion frame and a base member rotatably supporting the rotating member from below, electrical equipment, and an ECU for controlling operation of the electrical equipment, wherein the rotating member is supported by the base member so that it can rotate in response to operation of an electric motor, is known from for example Patent Document 3, etc.

In a vehicle seat device that includes electrical equipment such as an electric motor, in order to ensure there is space for disposing an ECU controlling the operation of the electrical equipment, there is a third problem that the height of a seat cushion increases, and there is a desire to avoid this.

It is a third object of the present invention to provide a vehicle seat device that can solve the third problem by enabling any increase in height of the position of a seat cushion due to disposition of an ECU to be avoided.

<Fourth Problem>
Furthermore, a vehicle rotating seat device that includes a seat frame supporting a seat main body, a rotating member supporting the seat frame, a base member rotatably supporting the rotating member, and an electrical component such as an electric motor for rotating the rotating member is known from for example Patent Document 3, etc.

In such a vehicle rotating seat device, an electrical component is often mounted on the seat frame side, and there is a fourth problem that when a seat main body and a seat frame rotate, an electric wire connected to the electrical component will slag or be damaged due to an unreasonable load acting thereon, and there is a desire to avoid this.

It is a fourth object of the present invention to provide a vehicle seat-rotating device that can solve the fourth problem by avoiding the occurrence of slagging of an electric wire connected to an electrical component or the occurrence of damage to the electric wire when a seat main body is rotating.

Means for Solving the Problems

<Solution Means for First Problem and Effects Thereof>

In order to attain the first object, according to a first aspect of the present invention, there is provided a rotating device for a vehicle interior item, comprising a base member that has a rotation support part, a rotating member that supports the vehicle interior item, is rotatably supported by the rotation support part, and is disposed above the base member, rotation-locking means that enables the rotating member to be switched between a rotatable state and a non-rotatable state, latching means that is provided on the base member side, and engagement means that is provided on the rotating member side and can be switched between a state in which the engagement means engages with the latching means when the rotating member is in a non-rotating state so as to suppress detachment of the rotating member from the base member and a state in which the engagement with the latching means is released when the rotating member attains the rotatable state, characterized in that the latching means and the engagement means are disposed further outside than the rotating member in plan view at least when the rotating member is in the non-rotating state. In accordance with the first aspect, since the latching means and the engagement means are disposed further outside than the rotating member in plan view at least when the rotating member is not rotating, the latching means and the engagement means do not overlap the rotating member in the height direction, and it is possible to form the rotating device compactly in the height direction while suppressing, by the latching means and the engagement means, detachment of the rotating member.

Further, according to a second aspect of the present invention, in addition to the first aspect, the engagement means is disposed at a position where at least part of the engagement means overlaps the rotating member when viewed from a side. In accordance with the second aspect, since at least part of the engagement means overlaps the rotating member when viewed from the side, it is possible to suppress any increase in the height of the rotating device due to disposition of the engagement means.

According to a third aspect of the present invention, in addition to the first or second aspect, the latching means is fixed to the base member at a position where at least part of the latching means overlaps the base member supported on a vehicle floor when viewed from the side. In accordance with the third aspect, due to the latching means being fixed to the base member supported on the vehicle floor, the latching means can be attached to the base member in advance when assembling the rotating device onto the vehicle floor, it is possible to enhance the ease of assembly, and it is also possible to suppress any increase in the height of the rotating device due to disposition of the latching means.

According to a fourth aspect of the present invention, in addition to any one of the first to third aspects, the engagement means comprises a shaft support member that is fixed directly or indirectly to the rotating member, a shaft member that is supported by the shaft support member, and a hook member that is pivotably and axially supported by the shaft member, the latching means comprises a striker that can engage with the hook member and a striker support member that supports the striker and is fixed directly or indirectly to the base member, and part of the hook member that is engaged with the striker is set outside the shaft support member in plan view. In accordance with the fourth aspect, since the part where the hook member of the engagement means and the striker of the latching means are engaged is set, in plan view, outside the shaft support member fixed directly or indirectly to the rotating member, when a detachment load is acting it is possible for the striker to easily receive the load.

According to a fifth aspect of the present invention, in addition to the fourth aspect, the striker is disposed at a position lower than the lower end of the rotating member when viewed from the side. In accordance with the fifth aspect, since the striker is present at a position lower than the lower end of the rotating member when viewed from the side, it is possible to prevent the rotating member from interfering with the striker when it is rotating while suppressing any increase in the height of the rotating device.

According to a sixth aspect of the present invention, in addition to the fourth or fifth aspect, the shaft support member comprises a shaft support wall portion to which the shaft member is fixed while being disposed outside the rotating member in plan view, and a pair of extending wall portions that are connectedly provided on the shaft support wall portion at positions sandwiching the shaft member therebetween and extend toward the rotating member side, and the extending wall portions are fixed directly or indirectly to the rotating member. In accordance with the sixth aspect, since the pair of extending wall parts forming part of the shaft support part while sandwiching the shaft member therebetween are fixed directly or indirectly to the rotating member, it is possible to enhance the bracing strength of the shaft support member when a load is acting on the rotating member.

According to a seventh aspect of the present invention, in addition to any one of the first to sixth aspects, the rotating device has movement means that can move the base member in a vehicle fore-and-aft direction, and the engagement means is disposed at a position where the engagement means avoids the movement means in plan view. In accordance with the seventh aspect, since the engagement means is disposed at a position in which, in plan view, it avoids the movement means, which enables the vehicle interior item to move in the vehicle fore-and-aft direction, it is possible, by preventing the movement means and the engagement means from overlapping each other in the height direction, to suppress any increase in the height of the rotating device.

According to an eighth aspect of the present invention, in addition to the seventh aspect, the engagement means is disposed outside the movement means in plan view. In accordance with the eighth aspect, since the engagement means is present outside the movement means in plan view, the engagement means is disposed closer to the outside of the rotating device, and it is possible to receive a load from the vehicle interior item side via a more outer part of the base member.

According to a ninth aspect of the present invention, in addition to the seventh or eighth aspect, the movement means is disposed between the vehicle floor and the base member, and the latching means is disposed further outside than the movement means in plan view. In accordance with the ninth aspect, since the latching means is disposed in plan view outside the movement means, which is disposed between the vehicle floor and the base member, it is possible to receive a load from the vehicle interior item side via a more outer part of the base member while disposing the latching means so as to avoid interference with the movement means.

According to a tenth aspect of the present invention, in addition to the fourth aspect, provided between the shaft support member and the hook member is an urging member that pivotingly urges the hook member in a direction in which the hook member engages with the striker In accordance with the tenth aspect, since the hook member is pivotingly urged by the urging member in a direction in which it engages with the striker, it is possible to retain a state in which the hook member and the striker are engaged.

According to an eleventh aspect of the present invention, in addition to the any of the first to tenth aspects, the latching means and the engagement means are placed at two locations on each of opposite sides of the base member and the rotating member in a vehicle width direction while being spaced in the vehicle fore-and-aft direction and disposed further rearward than the front end and further forward than the rear end of the rotating member when viewed from the side in the vehicle width direction. In accordance with the eleventh aspect, due to the latching means and the engagement means in the engaged state being disposed at two locations on each of opposite sides of the base member and the rotating member in the vehicle width direction while being spaced in the vehicle fore-and-aft direction, the latching means and the engagement means are disposed further rearward than the front end and further forward than the rear end of the rotating member while enabling the vehicle interior item to be retained in two attitudes that are rotated through 180 degrees, and it is thus possible to compactly dispose the latching means and the engagement means.

According to a twelfth aspect of the present invention, in addition to the eleventh aspect, the pair of engagement means spaced in the vehicle fore-and-aft direction are formed so as to have a structure in which pivoting of lower end parts of the hook members of the two engagement means toward the side on which the lower end parts move away from each other in the non-rotatable state enables individual engagement of the two hook members with the striker to be released. In accordance with the twelfth aspect, since the pair of engagement means spaced in the vehicle fore-and-aft direction are formed so as to disengage from the striker by pivoting the lower end parts of the hook members of the engagement means toward the side on which they move away from each other in a state in which the rotating member cannot rotate, it is possible to prevent the hook members from interfering with each other when releasing the engagement with the striker in the non-rotatable state.

According to a thirteenth aspect of the present invention, there is provided a rotating device for a vehicle seat in which the vehicle interior item of the rotating device for a vehicle interior item according to any one of the first to twelfth aspects is a vehicle seat having a seat cushion and a seat back disposed above the seat cushion, wherein the engagement means is disposed at a position in which at least an upper part of the engagement means overlaps the seat cushion when viewed from the side. In accordance with the thirteenth aspect, since at least the upper part of the engagement means overlaps the seat cushion of the vehicle seat when viewed from the side, it is possible to suppress any increase in the height of the vehicle seat.

According to a fourteenth aspect of the present invention, in addition to the thirteenth aspect, the rotating device for a vehicle seat comprises a reclining lever that operates so as to switch between a state in which tilting of the seat back, which is tiltable with respect to the seat cushion, is enabled and a state in which the tilting is restricted, and at least part of specific engagement means, which is at least one of the plurality of engagement means, is disposed so as to overlap the reclining lever when viewed from the side. In accordance with the fourteenth aspect, since when viewed from the side at least part of the specific engagement means, which is at least one of the plurality of engagement means, overlaps the reclining lever, which operates so as to switch the inclined state of the seat back, it is possible to suppress any increase in the height of the rotating device for a vehicle seat equipped with the reclining lever.

According to a fifteenth aspect of the present invention, in addition to the fourteenth aspect, a seat cushion frame supporting the seat cushion is formed from a pair of side frames that are arranged at positions spaced from each other and extend linearly, and a pair of linking frames that provide a link between opposite end parts of the side frames, and the engagement means is disposed at a position where at least part of the engagement means overlaps the side frame when viewed from the side. In accordance with the fifteenth aspect, since at least part of the engagement means overlaps the pair of side frames forming part of the seat cushion frame when viewed from the side, it is possible to suppress any increase in the height of the rotating device for a vehicle seat.

Moreover, according to a sixteenth aspect of the present invention, in addition to the fourteenth aspect, the reclining lever is disposed outside one side frame of the pair of side frames in plan view, and at least part of the specific engagement means is disposed further outside than the reclining lever in plan view. In accordance with the sixteenth aspect, since at least part of the specific engagement means is present in plan view outside the reclining lever disposed outside one side frame among the pair of side frames, it is possible to receive a load from the vehicle interior item side via a more outer part of the base member.

<Solution Means for Second Problem and Effects Thereof>

In order to achieve the second object, according to a first aspect of the present invention, there is provided a vehicle seat device that includes a rotation mechanism (117) that has a rotating member (130) having mounted thereon a seat cushion frame (119) supporting a seat cushion (112, 172) and a base member (129) rotatably supporting the rotating member (130) from below, characterized in that at least part, along a peripheral direction, of an outer periphery of an upper part of the rotating member (130) is covered by a cover (165, 175, 178) from the outside. In accordance with the first aspect, since at least part along the peripheral direction of the outer periphery of the upper part of the rotating member is covered by the cover from the outside, it is possible to prevent foreign matter from entering the interior via at least the part of the rotation mechanism that is covered by the cover.

Furthermore, according to a second aspect of the present invention, in addition to the first aspect, the cover (165, 175, 178) is disposed at a position in which the cover (165, 175, 178) covers the outer periphery of the upper part of the rotating member (130) from a rear in a state in which an occupant seated on the seat cushion (112, 172) faces forward in a vehicle fore-and-aft direction. In accordance with the second aspect, since the cover covers the outer periphery of the upper part of the rotating member from the rear in a state in which an occupant seated on the seat cushion faces forward in the vehicle fore-and-aft direction, it is possible to suppress the entry of foreign matter into the rotation mechanism from a rear passenger seat side in a state in which a driver's seat or a passenger seat faces forward.

Moreover, according to a third aspect of the present invention, in addition to the second aspect, the cover (175) is formed by extending a skin (172a) of the seat cushion (172). In accordance with the third aspect, since the cover is formed from the skin of the seat cushion, when suppressing the entry of foreign matter into the rotation mechanism, it is possible to avoid any increase in the number of components.

Furthermore, according to a fourth aspect of the present invention, in addition to the first or second aspect, in a state in which an occupant seated on the seat cushion (112) faces forward in the vehicle fore-and-aft direction, a skin (112a) of the seat cushion (112) is linked to a rear edge of an upper end part of the rotating member (130) while being in contact with an outer face of the cover (165, 178). In accordance with the fourth aspect, since the skin of the seat cushion is linked to the rear edge of the upper end part of the rotating member in a state in which an occupant seated on the seat cushion faces forward in the vehicle fore-and-aft direction and, moreover, the skin is in contact with the outer face of the cover, it is possible to link the upper part of the cover directly to the skin of the seat cushion and to suppress more effectively the entry of foreign matter into the rotation mechanism from the rear passenger seat side in a state in which the driver's seat or the passenger seat faces forward.

Moreover, according to a fifth aspect of the present invention, in addition to the first, second or fourth aspect, the seat cushion frame (119) has a pair of side frames (119a) that extend linearly and are supported on the rotating member (130), and the cover (165) is mounted on the side frames (119a). In accordance with the fifth aspect, since the cover is mounted on the pair of side frames of the seat cushion frame, it is possible to rotate the cover together with the seat by a simple structure.

Furthermore, according to a sixth aspect of the present invention, in addition to the first, second, fourth or fifth aspect, an outside face of the cover (165, 178) is formed into an arc shape that protrudes toward the outside of the rotating member (130). In accordance with the sixth aspect, since the outside face of the cover has an arc shape that protrudes toward the outside of the rotating member, when the cover rotates together with the seat, even if the cover comes into contact with luggage, etc. on a floor within a vehicle compartment, it is possible to realize smooth rotation of the cover, and consequently the seat.

Moreover, according to a seventh aspect of the present invention, in addition to the first to sixth aspects, in a state in which an occupant seated on the seat cushion (112, 172) faces forward in the vehicle fore-and-aft direction, a fixed cover member (167, 177) that covers at least the base member (129) from the rear is fixedly disposed beneath the cover (165, 175, 178). In accordance with the seventh aspect, since the fixed cover member, which covers at least the base member from the rear in a state in which an occupant seated on the seat cushion faces forward in the vehicle fore-and-aft direction, is fixedly disposed beneath the cover, it is possible to suppress the entry of foreign matter into the rotation mechanism from the rear passenger seat side in a state in which a driver's seat or a passenger seat faces forward.

Furthermore, according to an eighth aspect of the present invention, in addition to the seventh aspect, the fixed cover member (167) is formed so as to be in relatively slidable contact with a lower part of the cover (165, 178) in a state in which an occupant seated on the seat cushion (112) faces forward in the vehicle fore-and-aft direction. In accordance with the eighth aspect, since the fixed cover member is in relatively slidable contact with the lower part of the cover, it is possible to suppress more effectively the entry of foreign matter into the rotation mechanism from the rear passenger seat side in a state in which a driver's seat or a passenger seat faces forward.

Moreover, according to a ninth aspect of the present invention, in addition to the seventh or eighth aspect, the lower end position of a side cover (114) covering the side frame (119a) from the outside is set at the same height as the lower end position of the cover (165, 178). In accordance with the ninth aspect, due to the lower end position of the side cover being the same as the lower end position of the cover, it is possible to suppress the entry of foreign matter into the rotation mechanism from the rear passenger seat side in a state in which a driver's seat or a passenger seat faces in the vehicle width direction.

Furthermore, according to a tenth aspect of the present invention, in addition to the ninth aspect, the cover (178) is formed integrally with at least one of the pair of side covers (114). In accordance with the tenth aspect, since the cover is formed integrally with at least one of the pair of side covers, it is possible to easily assemble the cover while avoiding any increase in the number of components due to disposition of the cover.

<Solution Means for Third Problem and Effects Thereof>

In order to achieve the third object, according to a first aspect of the present invention, there is provided a vehicle seat device that includes a seat cushion frame (216) that supports a seat cushion (211a), a rotation mechanism (214) that is disposed beneath the seat cushion frame (216) while having a rotating member (230) supporting the seat cushion frame (216) and having a base member (229) rotatably supporting the rotating member (230) from beneath, electrical equipment (253, 265), and an ECU (270, 271) that controls operation of the electrical equipment (253, 265), characterized in that a circular housing part (241) opening at least upward is formed in a central part of the rotating member (230), and the ECU (270, 271) is present within the housing part (241) in plan view and is disposed at a position in which at least part of the ECU (270, 271) overlaps the rotating member (230) when viewed from the side. In accordance with the first aspect, since the ECU is housed in plan view within the circular housing part, which is formed in the central part of the rotating member and opens at least upward, and at least part of the ECU is present at a position in which it overlaps the rotating member when viewed from the side, it is possible, by suppressing upward protrusion of the ECU from the rotating member, to avoid any increase in the height of the seat cushion caused by disposition of the ECU and it is also possible to avoid any increase in the size of the vehicle seat device in a direction orthogonal to the rotational axis of the rotating member.

Furthermore, according to a second aspect of the present invention, in addition to the first aspect, the rotating member (230) is formed so as to have a taper portion (230a) whose diameter increases in going upward, a cylindrical side wall portion (230b) that rises upward from an upper end part of the taper portion (230a) so as to form the housing part (241) in cooperation with the taper portion (230a), and a collar portion (230c) that protrudes outward from the side wall portion (230b), and the ECU (270, 271) is disposed in an attitude in which it is inclined along the taper portion (230a). In accordance with the second aspect, due to the ECU being disposed in an attitude in which it is inclined along the taper portion of the rotating member, it is possible to suppress more effectively upward protrusion of the ECU from the rotating member and suppress more effectively the height of the seat cushion.

Moreover, according to a third aspect of the present invention, in addition to the second aspect, the rotating member (230) has mounted thereon a mounting member (258) that in plan view is disposed further inside than an outer periphery (230d) of the rotating member (230), and the ECU (270, 271) is mounted on the mounting member (258). In accordance with the third aspect, since the ECU is mounted on the mounting member disposed further inside than the outer periphery of the rotating member in plan view and mounted on the rotating member, it is possible to avoid any increase in the size of the vehicle seat device in a direction orthogonal to the rotational axis of the rotating member due to disposition of the mounting member for mounting the ECU.

Furthermore, according to a fourth aspect of the present invention, in addition to the third aspect, the mounting member (258) has an inclined plate portion (258b) that is inclined along the taper portion (230a) and is disposed within the housing part (241), and the ECU (270, 271) is mounted on the inclined plate portion (258b). In accordance with the fourth aspect, since the ECU is mounted on the inclined plate portion possessed by the mounting member and disposed within the housing part, it is possible to easily mount the ECU on the mounting member in an inclined attitude along the taper portion of the rotating member, thus suppressing upward protrusion of the ECU from the rotating member.

Moreover, according to a fifth aspect of the present invention, in addition to the fourth aspect, the mounting member (258) is joined to the collar portion (230c) of the rotating member (230) further forward than a rotational axis (2C) of the rotating member (230), and the ECU (270, 271) is mounted on the inclined plate portion (258b) at a position in which it avoids interference with a cushion-side pressure-receiving member (219) mounted on the seat cushion frame (216) so as to receive a load from above the seat cushion (211a). In accordance with the fifth aspect, since the mounting member is joined to the collar portion of the rotating member further forward than the rotational axis of the rotating member, and the ECU is mounted on the inclined plate portion at a position in which it avoids interference with the cushion-side pressure-receiving member mounted on the seat cushion frame so as to receive a load from above the seat cushion, it is possible to avoid any increase in the vertical dimension of the vehicle seat device.

Furthermore, according to a sixth aspect of the present invention, in addition to the fifth aspect, the ECU (270, 271) is disposed while avoiding a position immediately below a lowest end (219a) of the cushion-side pressure-receiving member (219) when viewed from the side. In accordance with the sixth aspect, since the ECU is not disposed immediately below the lowest end of the cushion-side pressure-receiving member when viewed from the side, it is possible to more easily avoid interference between the ECU and the cushion-side pressure-receiving member.

Moreover, according to a seventh aspect of the present invention, in addition to the first or second aspect, the ECU (270, 271) and an electric motor (253) that exerts power for rotating the rotating member (230) are mounted on the side of one of the base member (229) and the rotating member (230). In accordance with the seventh aspect, since the electric motor and the ECU are mounted on the side of one of the base member and the rotating member, it is possible to easily provide a connection between the electric motor and the ECU.

Furthermore, according to an eighth aspect of the present invention, in addition to the seventh aspect, the electric motor (253) and the ECU (270, 271) are mounted on the side of the one of the base member (229) and the rotating member (230) that has the larger vertical dimension. In accordance with the eighth aspect, since the electric motor and the ECU are mounted on the side of the one of the base member and the rotating member that has the larger vertical dimension, it is possible to easily ensure there is space for disposing the electric motor and the ECU while suppressing any increase in the height of the vehicle seat device.

Moreover, according to a ninth aspect of the present invention, in addition to the seventh or eighth aspect, the electric motor (253) and the ECU (270, 271) are mounted on a mounting member (258) that is disposed further inside than the outer periphery (230d) of the rotating member (230) in plan view and mounted on one of the base member (229) and the rotating member (230). In accordance with the ninth aspect, since the electric motor and the ECU are mounted on the mounting member, which is disposed further inside than the outer periphery of the rotating member in plan view, it is possible to avoid any increase in the dimension of the vehicle seat device in a direction orthogonal to the rotational axis of the rotating member due to disposition of the mounting member for mounting the ECU and the electric motor.

Furthermore, according to a tenth aspect of the present invention, in addition to the ninth aspect, the mounting member (258) is mounted on the rotating member (230). In accordance with the tenth aspect, since the mounting member is mounted on the rotating member, when the rotating member is rotating, the electric motor and the ECU also rotate with respect to the base member, and it is possible to compactly collect together connecting wires between the electric motor and the ECU for controlling operation of the electric motor.

It should be noted here that a second taper portion 230a of an embodiment of the solution means for the third problem, which is described later, corresponds to the taper portion of the present invention, a fourth side wall portion 230b similarly corresponds to the side wall portion of the present invention, a second collar portion 230c similarly corresponds to the collar portion of the present invention, and an electric motor 253 and a blower 265 similarly correspond to electrical equipment of the present invention.

<Solution Means for Fourth Problem and Effects Thereof>

In order to achieve the fourth object, according to a first aspect of the present invention, there is provided a vehicle rotating seat device that includes a seat frame (315) that supports a seat main body (311), a rotating member (330) that supports the seat frame (315), a base member (329) that rotatably supports the rotating member (330) from below, and an electrical component (350, 365, 374, 378) that is mounted on at least one of the seat frame (315) and the rotating member (330), characterized in that an electric wire (359, 369, 376, 380) connected to the electrical component (350, 365, 374, 378) is retained by an electric wire retaining member (360, 384, 386) that is fixedly disposed at a center of rotation (3C) of the rotating member (330). In accordance with the first aspect, since the electric wire connected to the electrical component mounted on at least one of the seat frame and the rotating member is retained by the electric wire retaining member positioned at the center of rotation of the rotating member, it is possible to avoid the occurrence of sagging or damage to the electric wire connected to the electrical component when the seat main body is rotating.

Furthermore, according to a second aspect of the present invention, in addition to the first aspect, a plurality of the electric wires (359, 369, 376, 380) individually connected to a plurality of the electrical components (350, 365, 374, 378) are retained collectively by the single electric wire retaining member (360, 384, 386). In accordance with the second aspect, since the plurality of electric wires individually connected to the plurality of electrical components are retained collectively by the single electric wire retaining member, it is possible to compactly collect together the plurality of electric wires and carry out wiring.

Moreover, according to a third aspect of the present invention, in addition to the first or second aspect, a cushion-side pressure-receiving member (319) that receives a load from above a seat cushion (311a) forming part of the seat main body (311) is mounted on a seat cushion frame (316) that forms part of the seat frame (315) and is supported on the rotating member (330), and the electric wire retaining member (360, 384, 386) is disposed at a position in which the electric wire (359, 369, 376, 380) is retained beneath the cushion-side pressure-receiving member (319). In accordance with the third aspect, since the electric wire retaining member is disposed at a position in which the electric wire is retained beneath the cushion-side pressure-receiving member mounted on the seat cushion frame forming part of the seat frame, it is possible to suppress protrusion of the electric wire retaining member toward the occupant seating face side, thus enabling interference of the electric wire retaining member with an occupant seated on the seating face to be avoided.

Furthermore, according to a fourth aspect of the present invention, in addition to the third aspect, the electric wire retaining member (360) is mounted directly on the cushion-side pressure-receiving member (319). In accordance with the fourth aspect, since the electric wire retaining member is mounted directly on the cushion-side pressure-receiving member while retaining the electric wire beneath the cushion-side pressure-receiving member, it is possible to avoid interference of the electric wire retaining member with an occupant seated on the seating face and also to efficiently dispose the electric wire retaining member at the center of rotation of the rotating member while avoiding any increase in the number of components due to there being no need for newly providing a member for mounting the electric wire retaining member.

Moreover, according to a fifth aspect of the present invention, in addition to the first or second aspect, the cushion-side pressure-receiving member (319), which receives a load from above the seat cushion (311a) forming part of the seat main body (311), is mounted on the cushion frame (316), which forms part of the seat frame (315) and is supported on the rotating member (330), and the electric wire retaining member (360) is mounted directly on the cushion-side pressure-receiving member (319). In accordance with the fifth aspect, since the electric wire retaining member is mounted directly on the cushion-side pressure-receiving member, it is possible to efficiently dispose the electric wire retaining member at the center of rotation of the rotating member while avoiding any increase in the number of components due to there being no need for newly providing a member for mounting the electric wire retaining member.

Furthermore, according to a sixth aspect of the present invention, in addition to the third to fifth aspects, the seat frame (315) comprises the seat cushion frame (316), which is supported on the rotating member (330), and a seat back frame (317) that is tiltably mounted on the seat cushion frame (316) or the rotating member (330) via a support shaft (312), an electric actuator for tilting (378), which is the electrical component, is mounted on a lower part of the seat back frame (317) so that the seat back frame (317) can be driven so as to tilt, and the electric wire (380) connected to the electric actuator for tilting (378) is retained by the electric wire retaining member (360) via an intermediate retaining member (381) mounted on the seat back frame (317) or the rotating member (330) in the vicinity of the support shaft (312). In accordance with the sixth aspect, since the electric actuator for tilting, which is for driving and tilting the seat back frame tiltably mounted on the seat cushion frame or the rotating member via the support shaft, is mounted on the lower part of the seat back frame, and the electric wire connected to the electric actuator for tilting is retained by the electric wire retaining member via the intermediate retaining member mounted on the seat cushion frame or the rotating member in the vicinity of the support shaft, it is possible to prevent the electric wire between the electric wire retaining member and the electric actuator for tilting from sagging or being damaged when the seat main body is rotating or the seat back frame is being tilted.

Moreover, according to a seventh aspect of the present invention, in addition to the third aspect, a retaining member-supporting member (383, 385) is mounted on the base member (329), and the electric wire retaining member (384, 386) is mounted on the retaining member-supporting member (383, 385). In accordance with the seventh aspect, since the electric wire retaining member is mounted on the retaining member-supporting member, which is mounted on the base member, it is possible to easily assemble the electric wire retaining member when assembling the seat-rotating device, thus improving the workability.

Furthermore, according to an eighth aspect of the present invention, in addition to the seventh aspect, the electric wire retaining member (384) retains the electric wires (359, 369, 376, 380) above the retaining member-supporting member (383) and is mounted on the retaining member-supporting member (383). In accordance with the eighth aspect, since the electric wire retaining member retains the electric wire above the retaining member-supporting member, it is possible to carry out wiring by compactly collecting together the electric wires within the seat-rotating device.

Moreover, according to a ninth aspect of the present invention, in addition to the seventh aspect, the electric wire retaining member (386) retains the electric wires (359, 369, 376, 380) beneath the retaining member-supporting member (385) and is mounted on the retaining member-supporting member (385). In accordance with the ninth aspect, since the electric wire retaining member retains the electric wire beneath the retaining member-supporting member, it is possible to carry out operations in a state in which the seat-rotating device is laid sideways when assembling the seat-rotating device, thus enabling the electric wire to be easily retained by the electric wire retaining member and thereby improving the workability.

BRIEF DESCRIPTION OF DRAWINGS

<Explanation of Drawings Showing Embodiments of Solution Means for First Problem>

<Explanation of Drawings Showing Embodiments of Solution Means for Second Problem>

Figure 12:
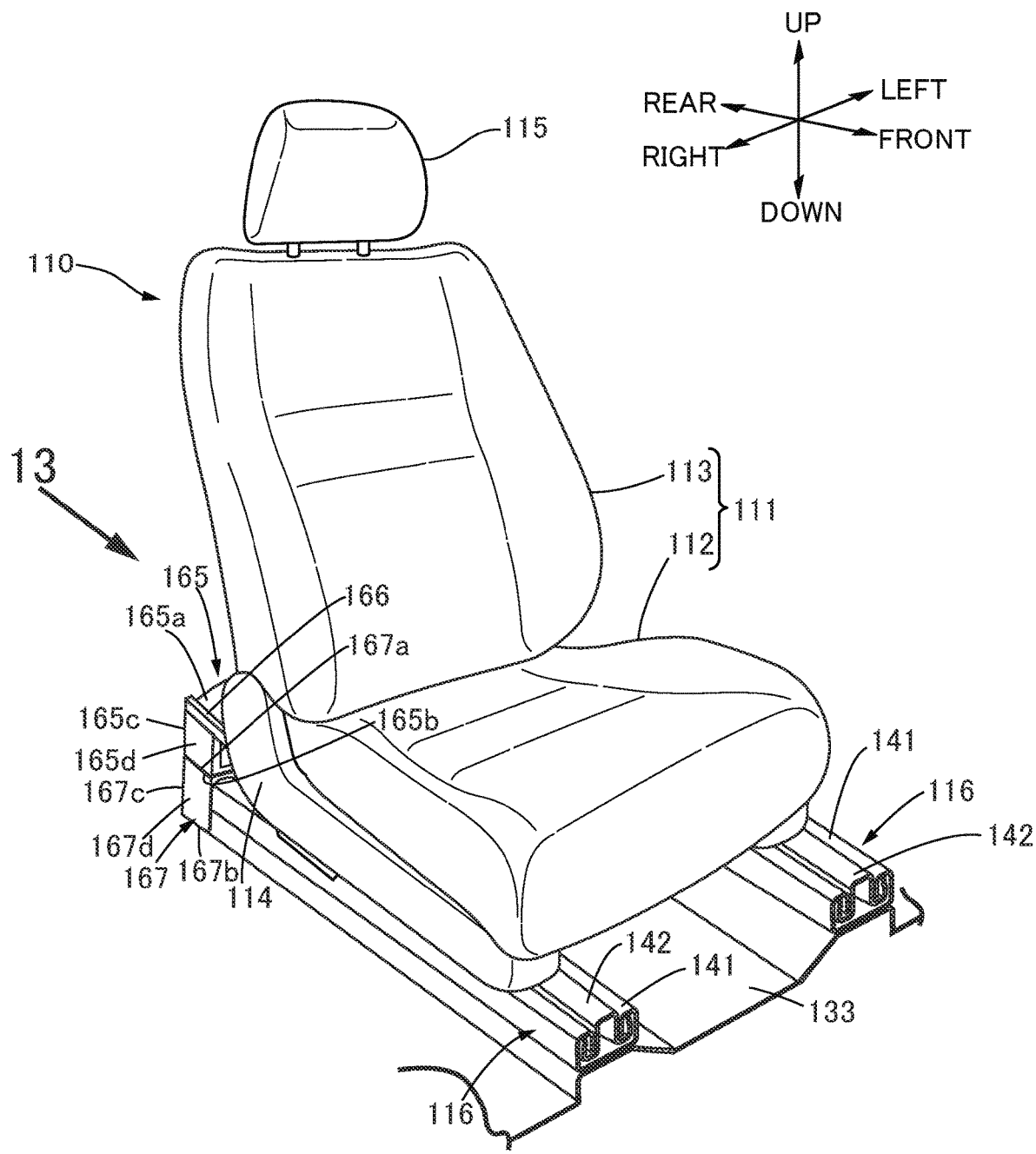

FIG. 12 is a perspective view of a vehicle seat device of a first embodiment.

Figure 13:
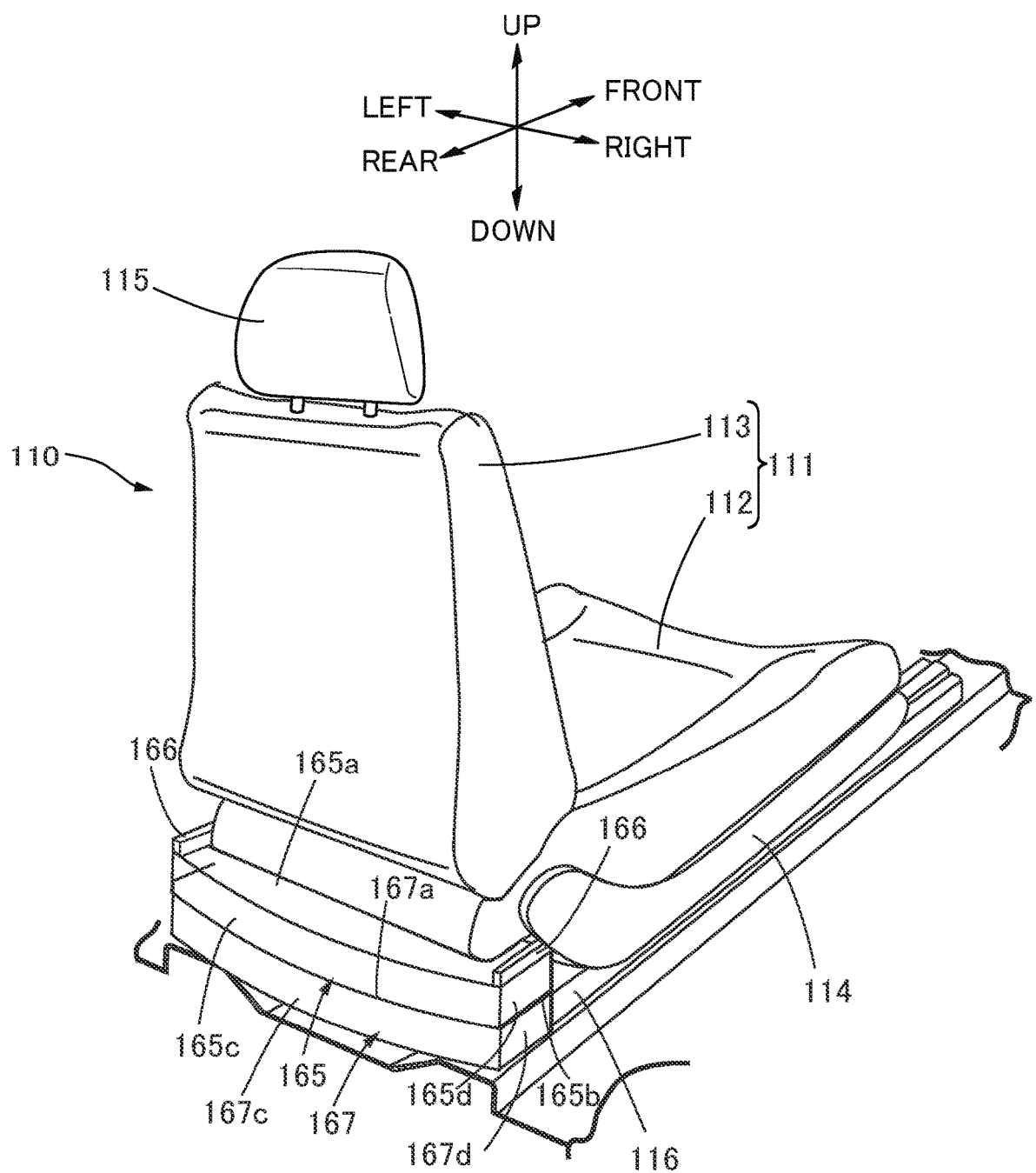

FIG. 13 is a perspective view when viewed from the direction shown by arrow 13 in FIG. 12.

Figure 14:
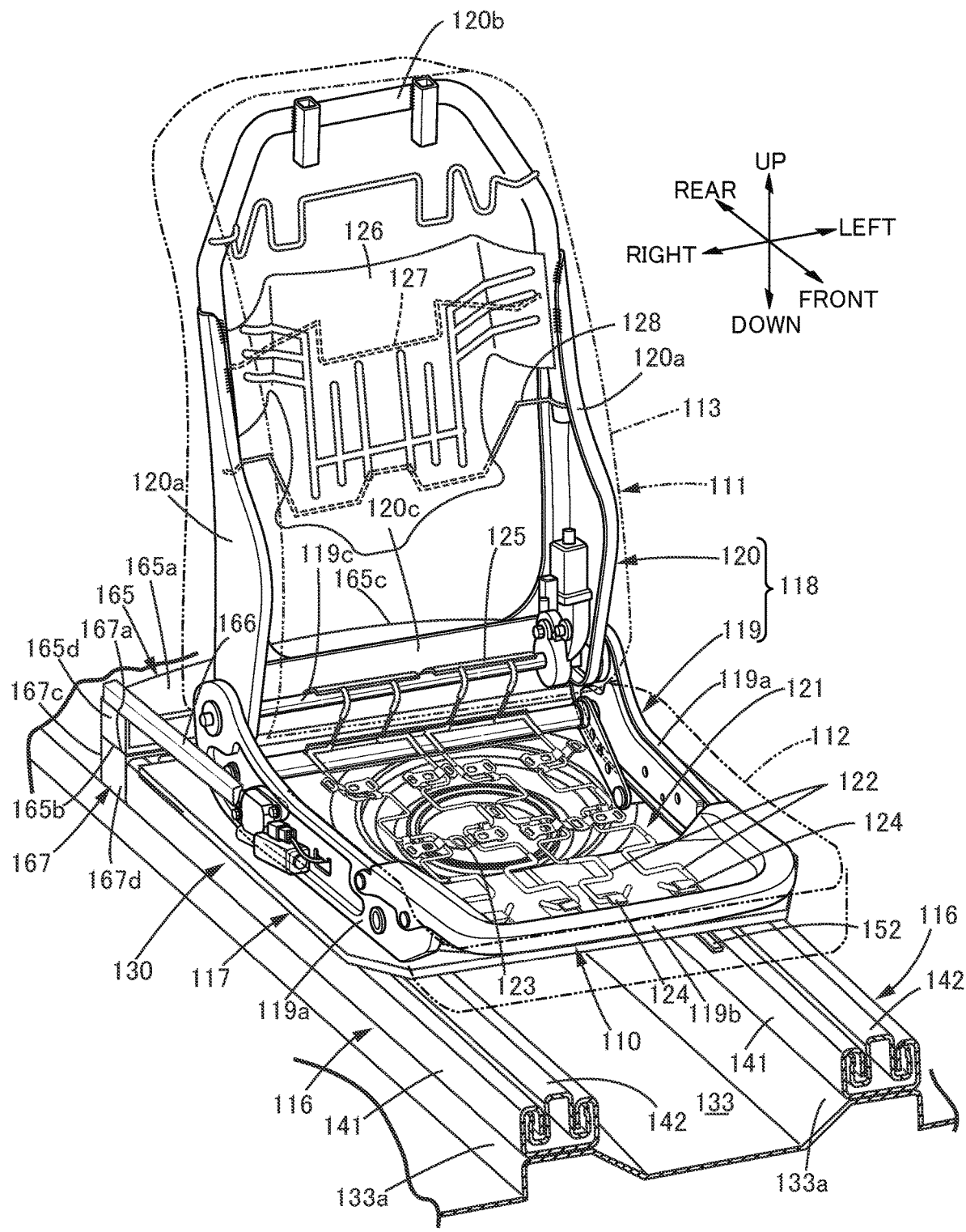

FIG. 14 is a perspective view in state in which a seat cushion, a seat back, and a side cover are removed from FIG. 12.

Figure 15:
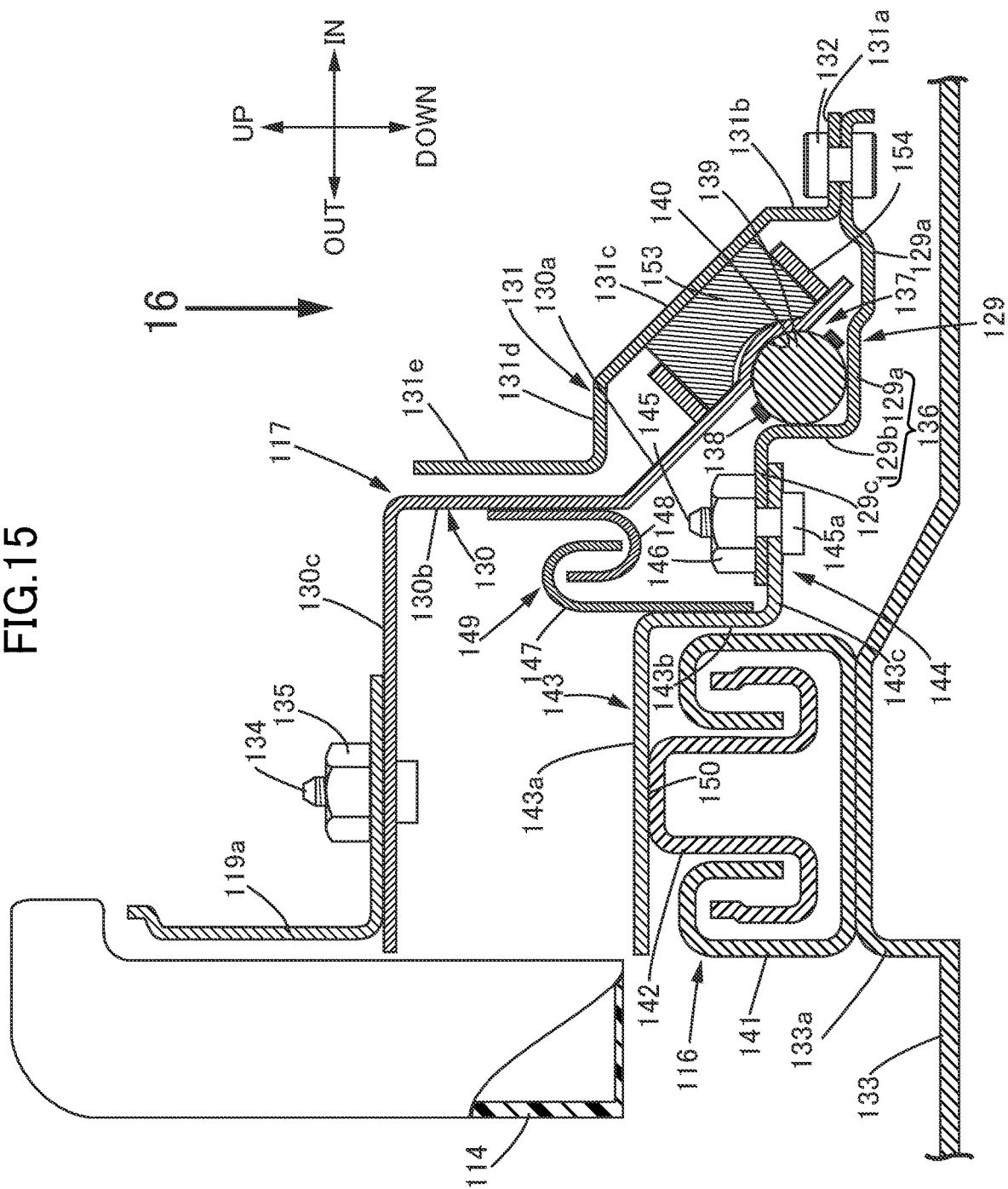
Figure 16:
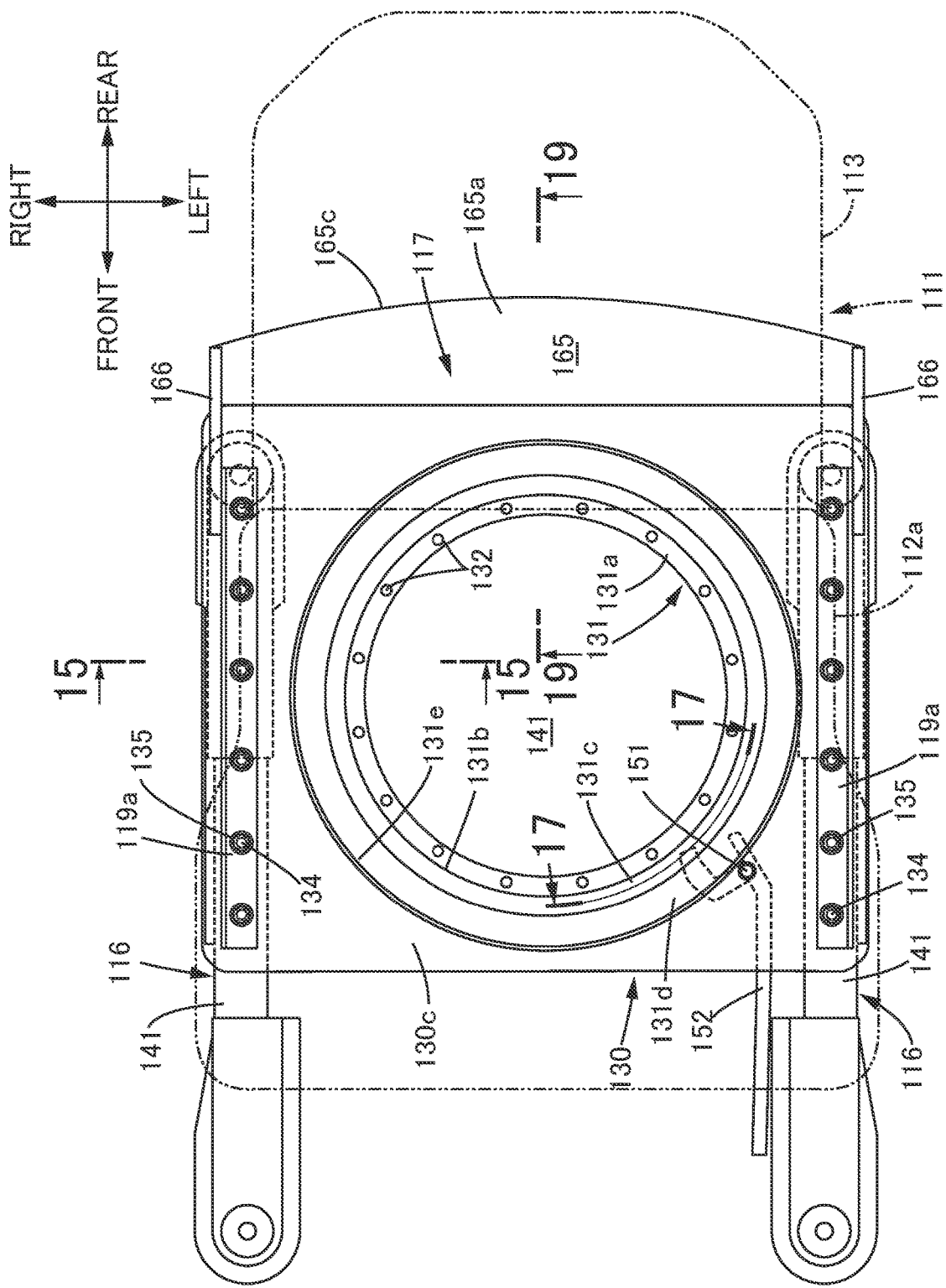

FIG. 15 is a sectional view along line 15-15 in FIG. 16 showing part of a slide rail and a rotation mechanism.

FIG. 16 is a view when the slide rail and the rotation mechanism are viewed from the direction shown by arrow 16 in FIG. 15.

Figure 17A:
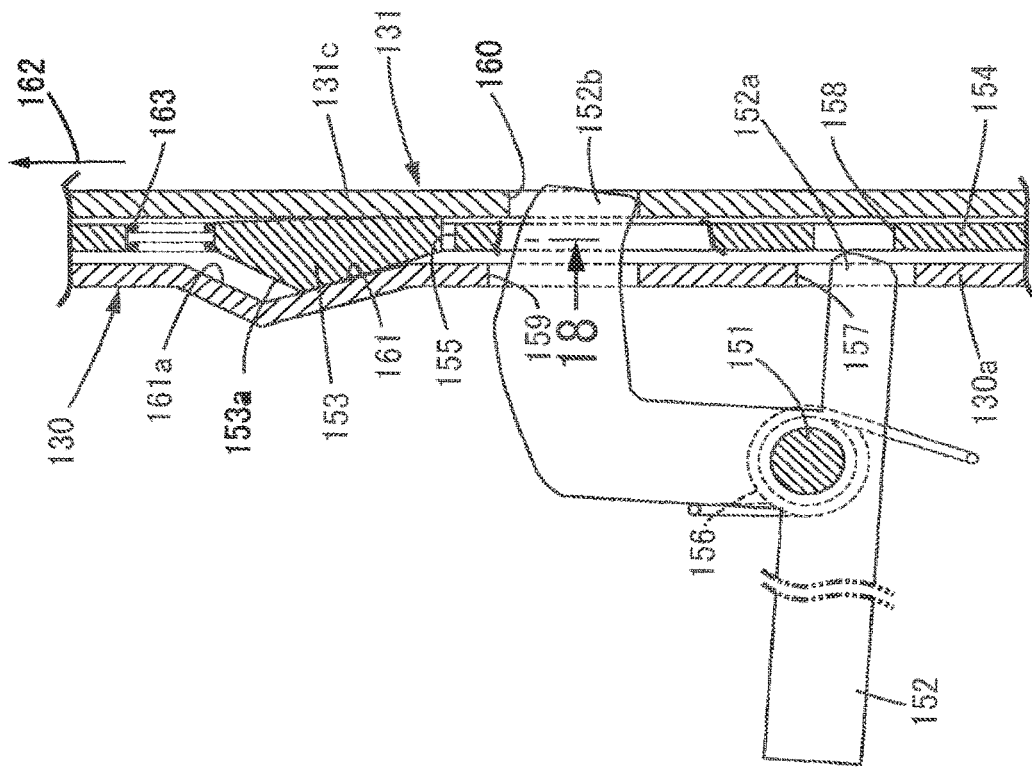

FIG. 17A is a sectional view along line 17-17 in FIG. 16.

Figure 17B:
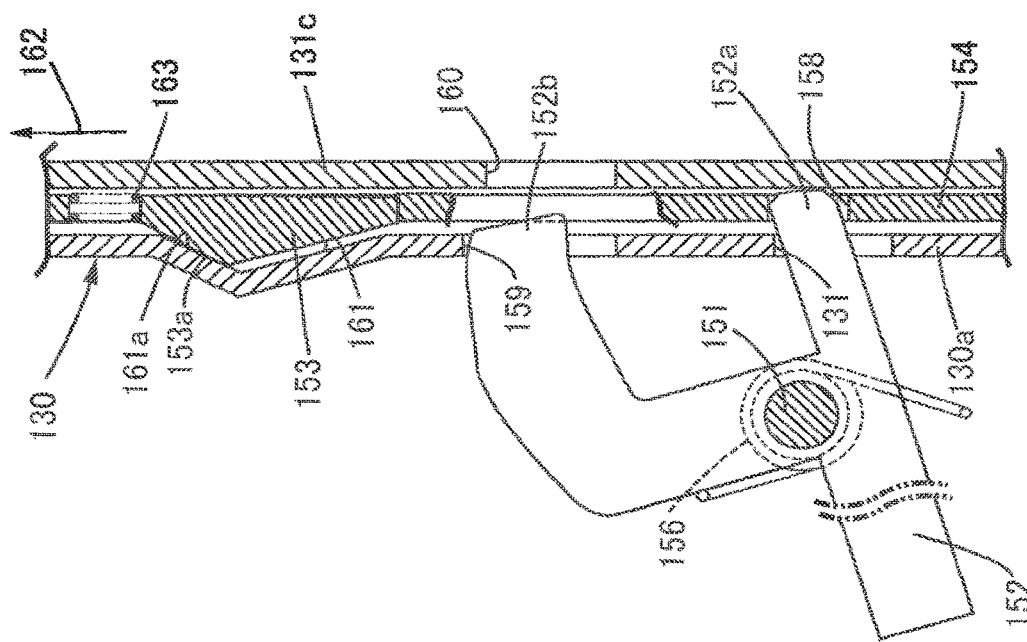

FIG. 17B is another sectional view along line 17-17 in FIG. 16.

Figure 18:
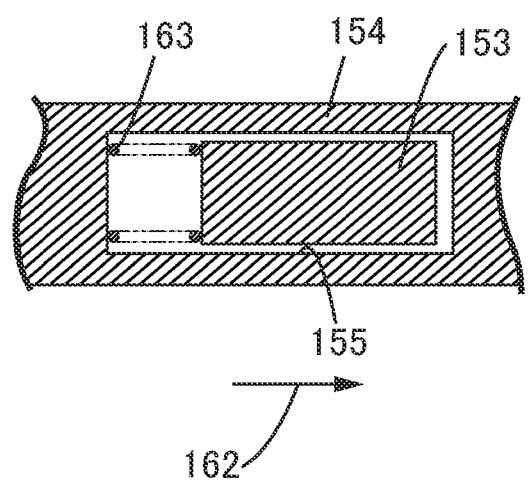

FIG. 18 is a sectional view along line 18-18 in FIG. 17A.

Figure 19:
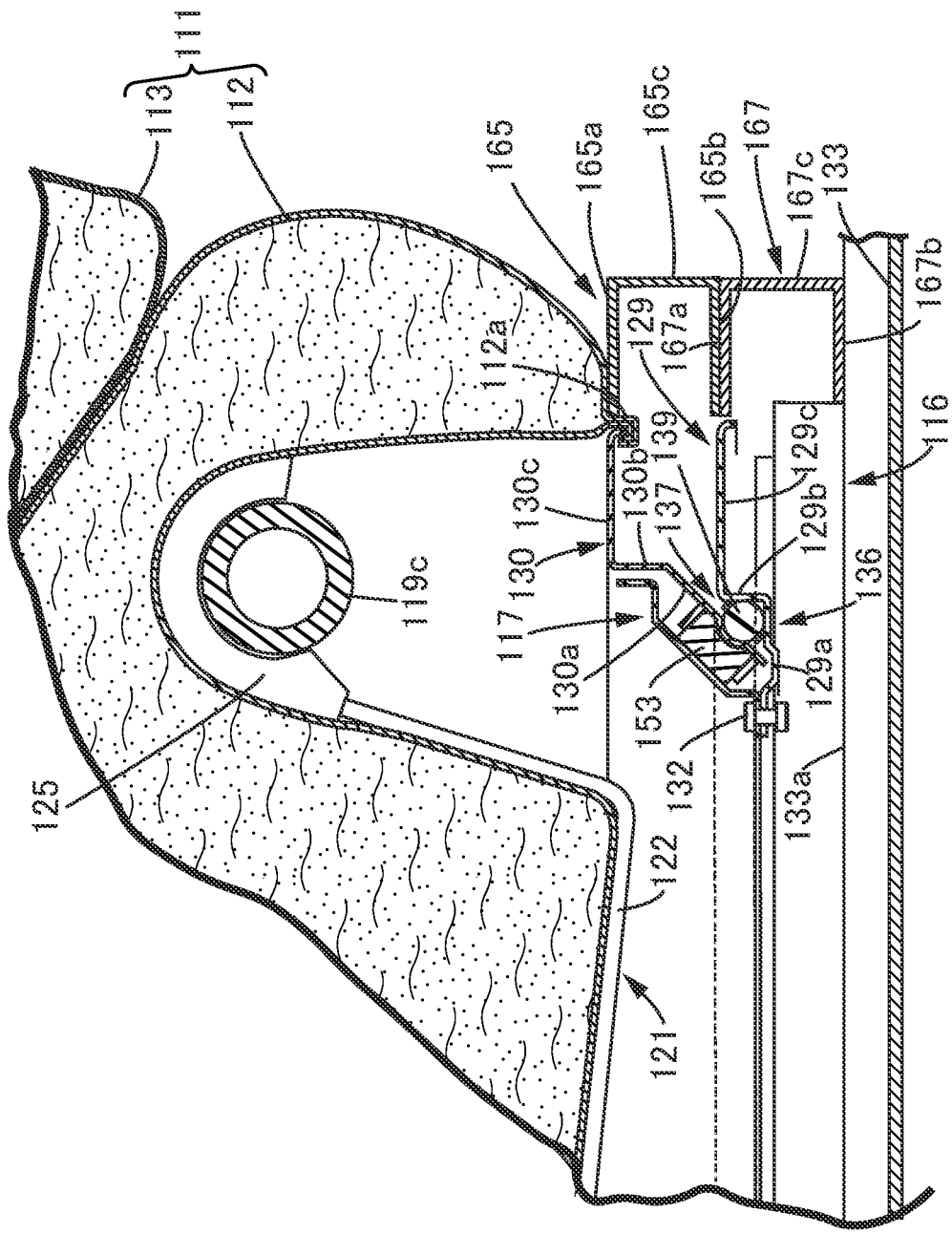

FIG. 19 is a sectional view along line 19-19 in FIG. 16 showing part of the vehicle seat device.

Figure 20:
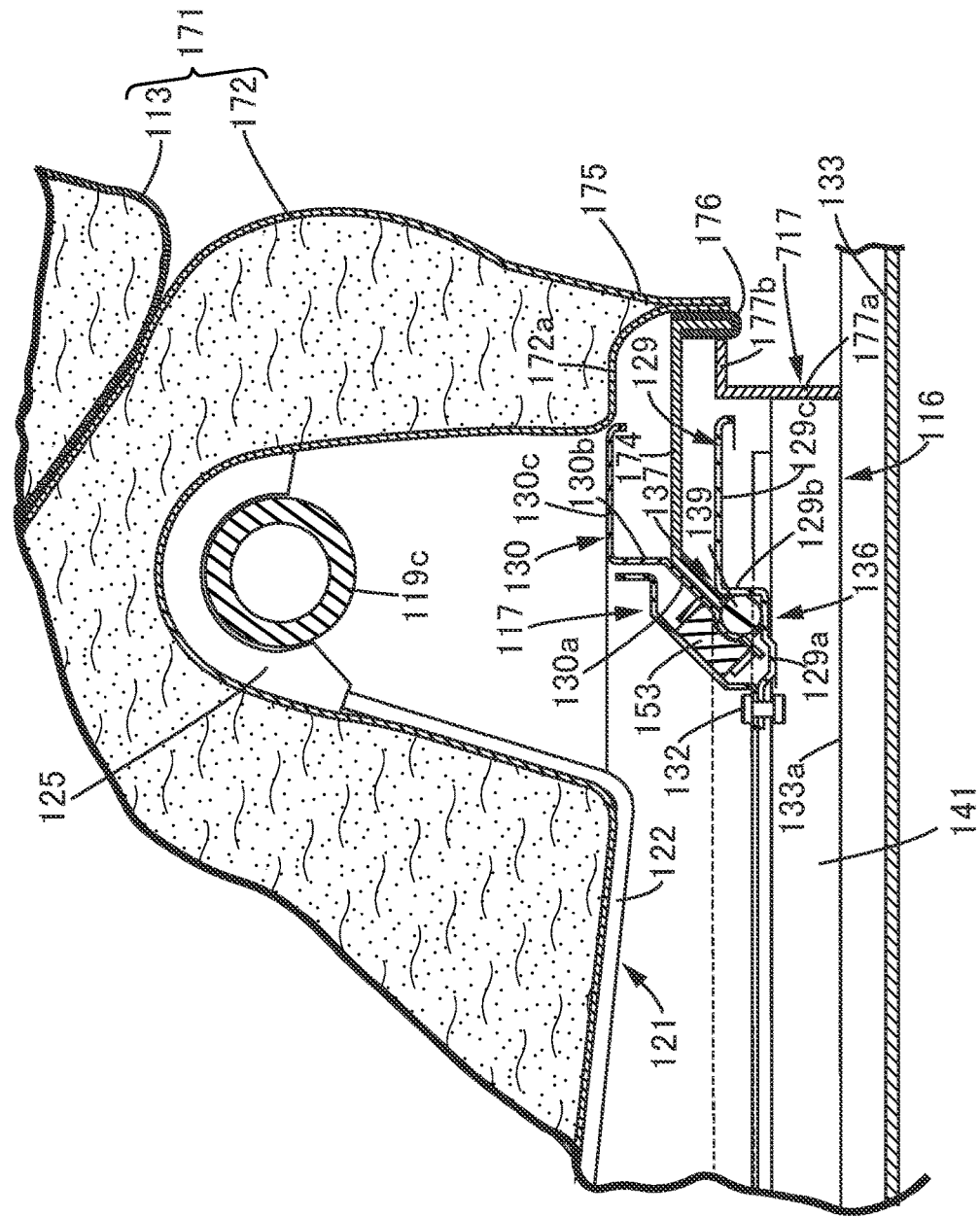

FIG. 20 is a sectional view, corresponding to FIG. 19, of a second embodiment.

Figure 21:
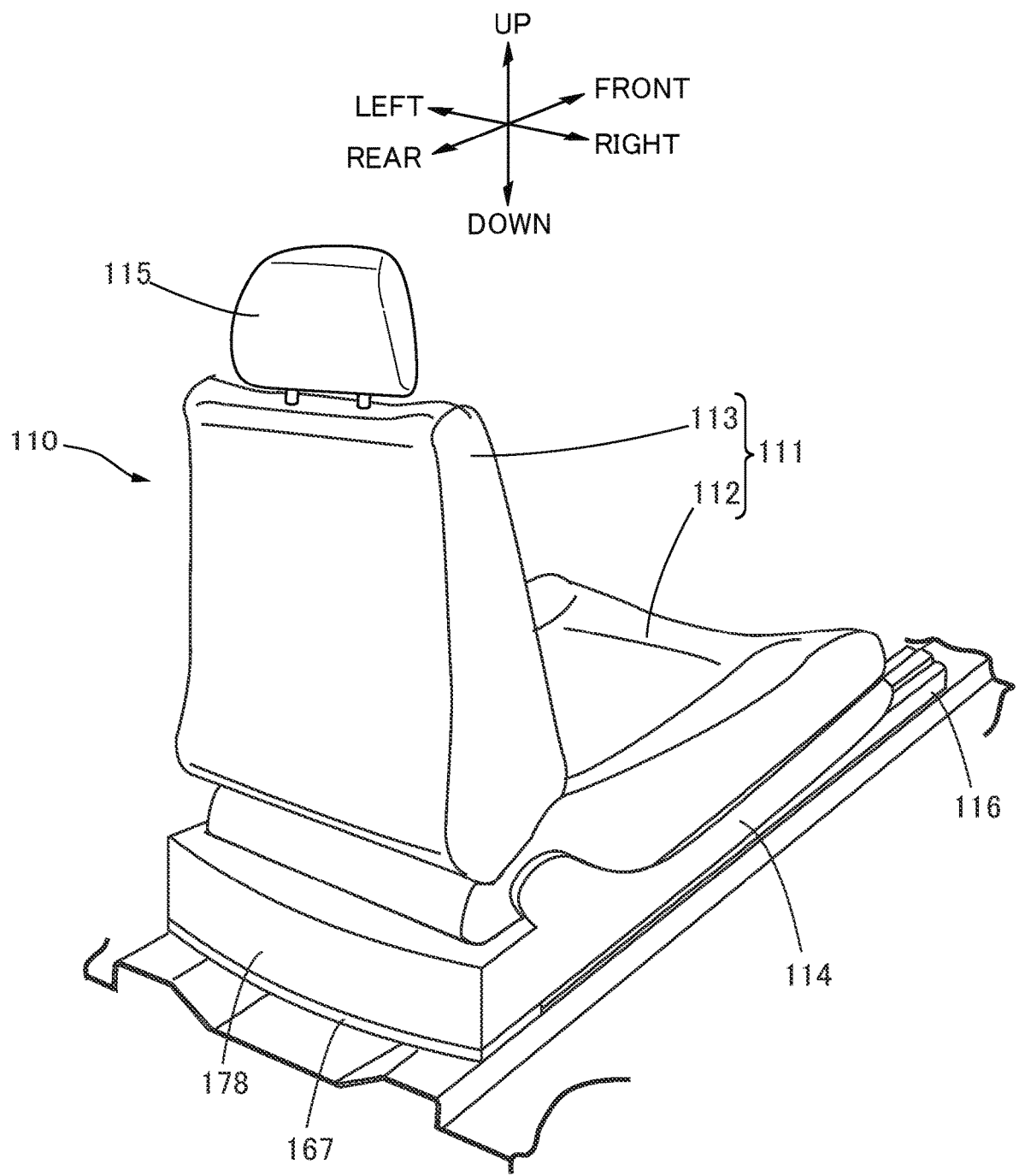

FIG. 21 is a perspective view, corresponding to FIG. 13, of a third embodiment.

<Explanation of Drawings Showing Embodiments of Solution Means for Third Problem>

Figure 22:
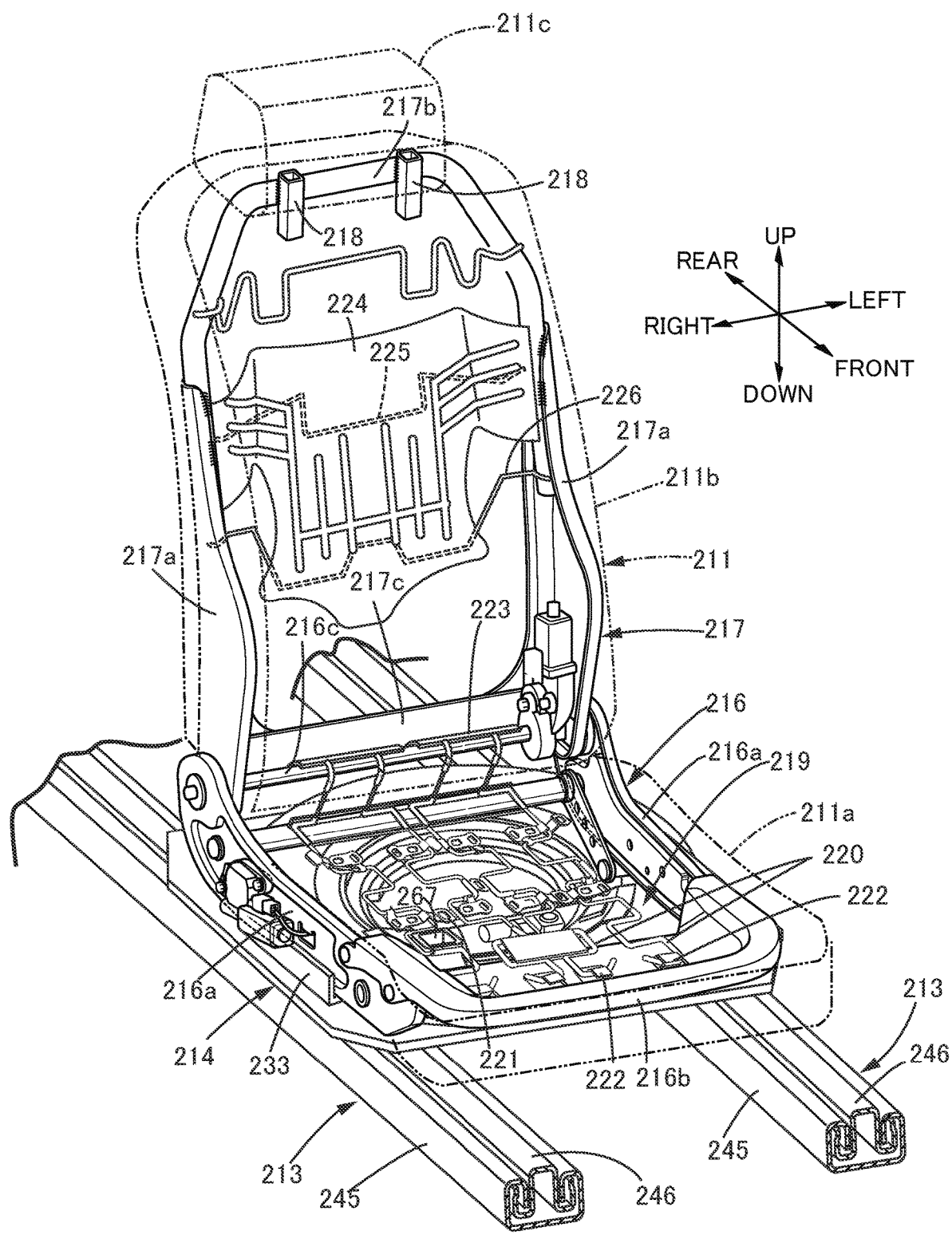

FIG. 22 is a perspective view showing a vehicle seat device in a state in which a seat main body is omitted.

Figure 23:
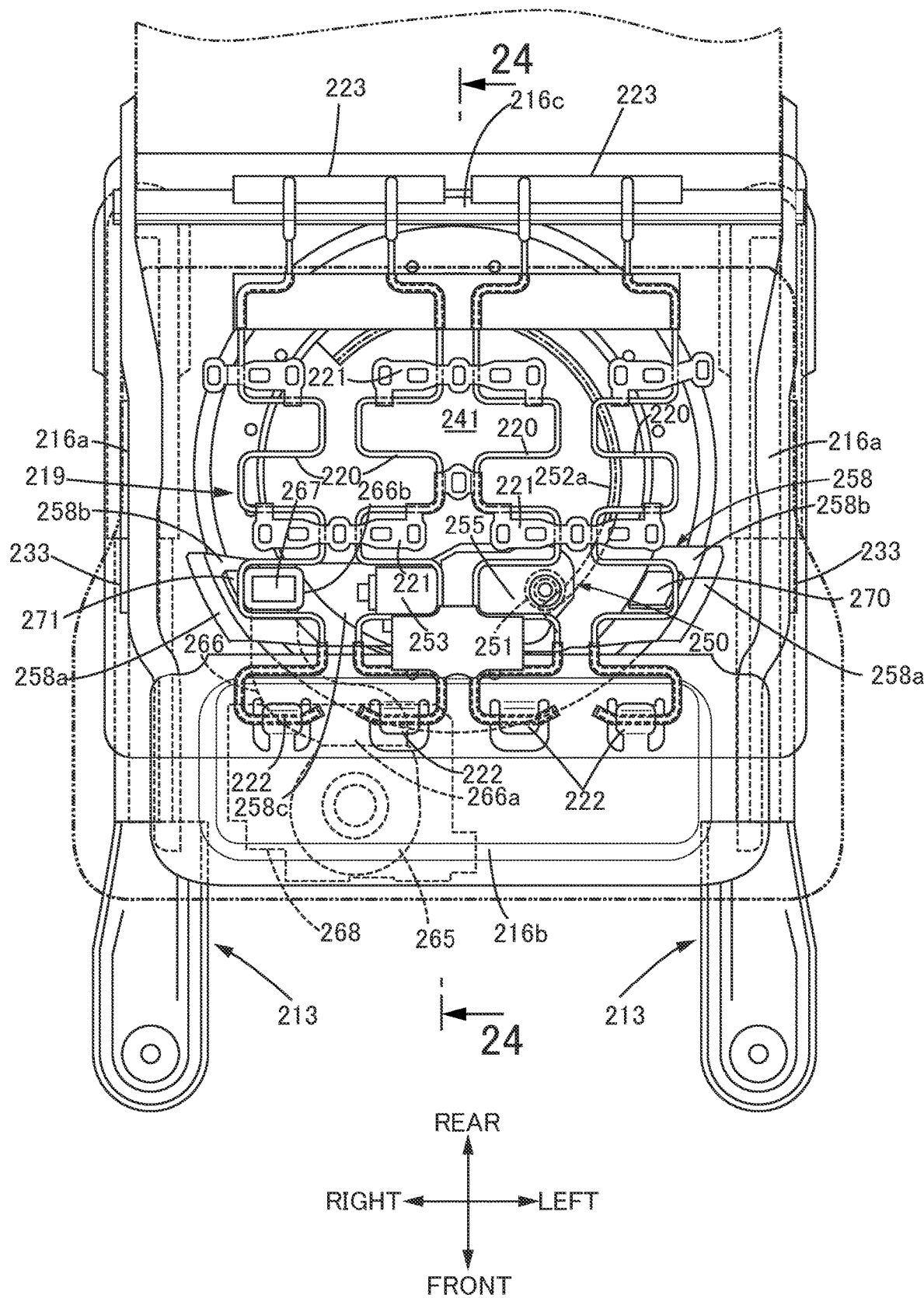

FIG. 23 is a plan view when an essential part of the vehicle seat device is viewed from above.

Figure 24:
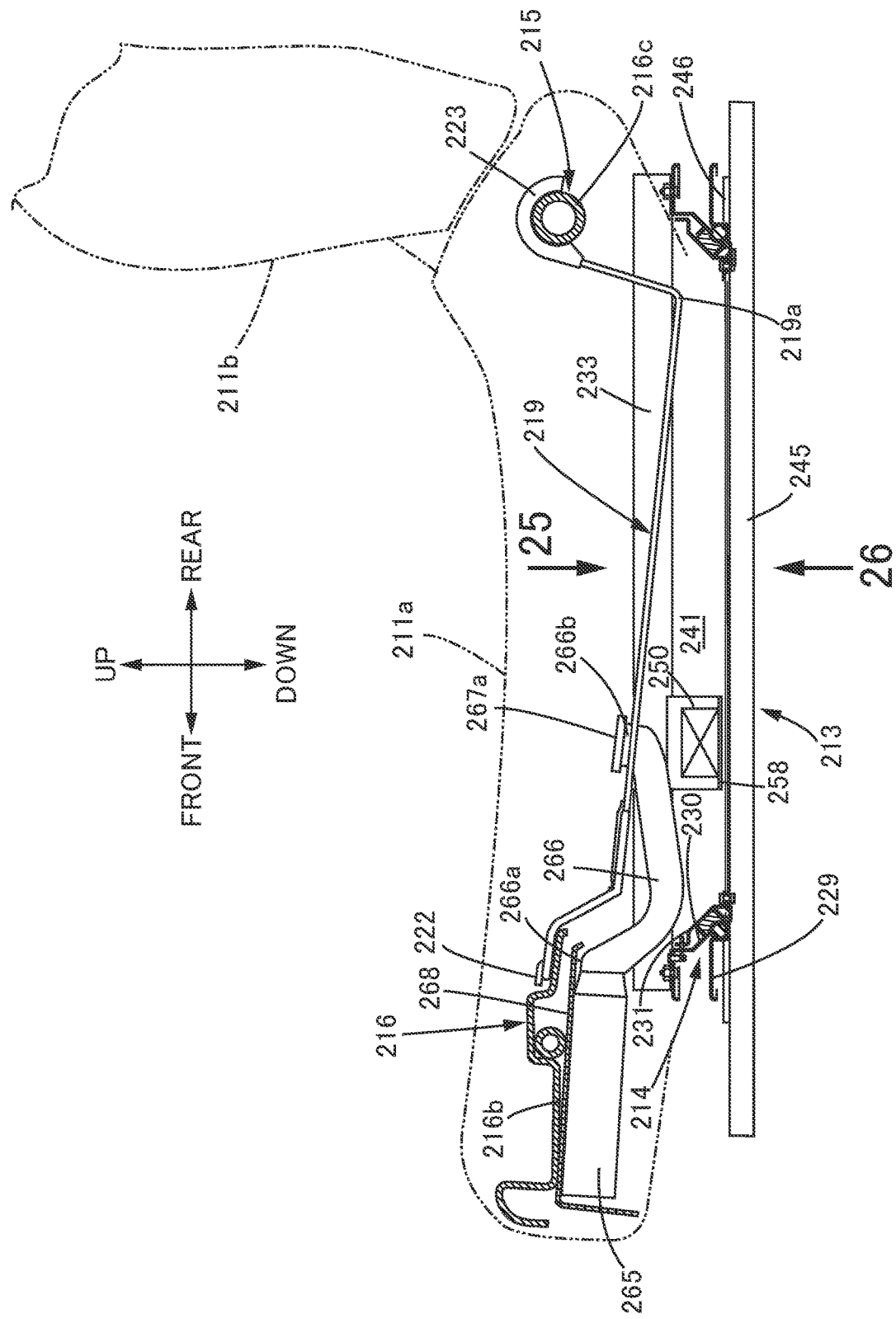

FIG. 24 is a sectional view along line 24-24 in FIG. 23.

Figure 25:
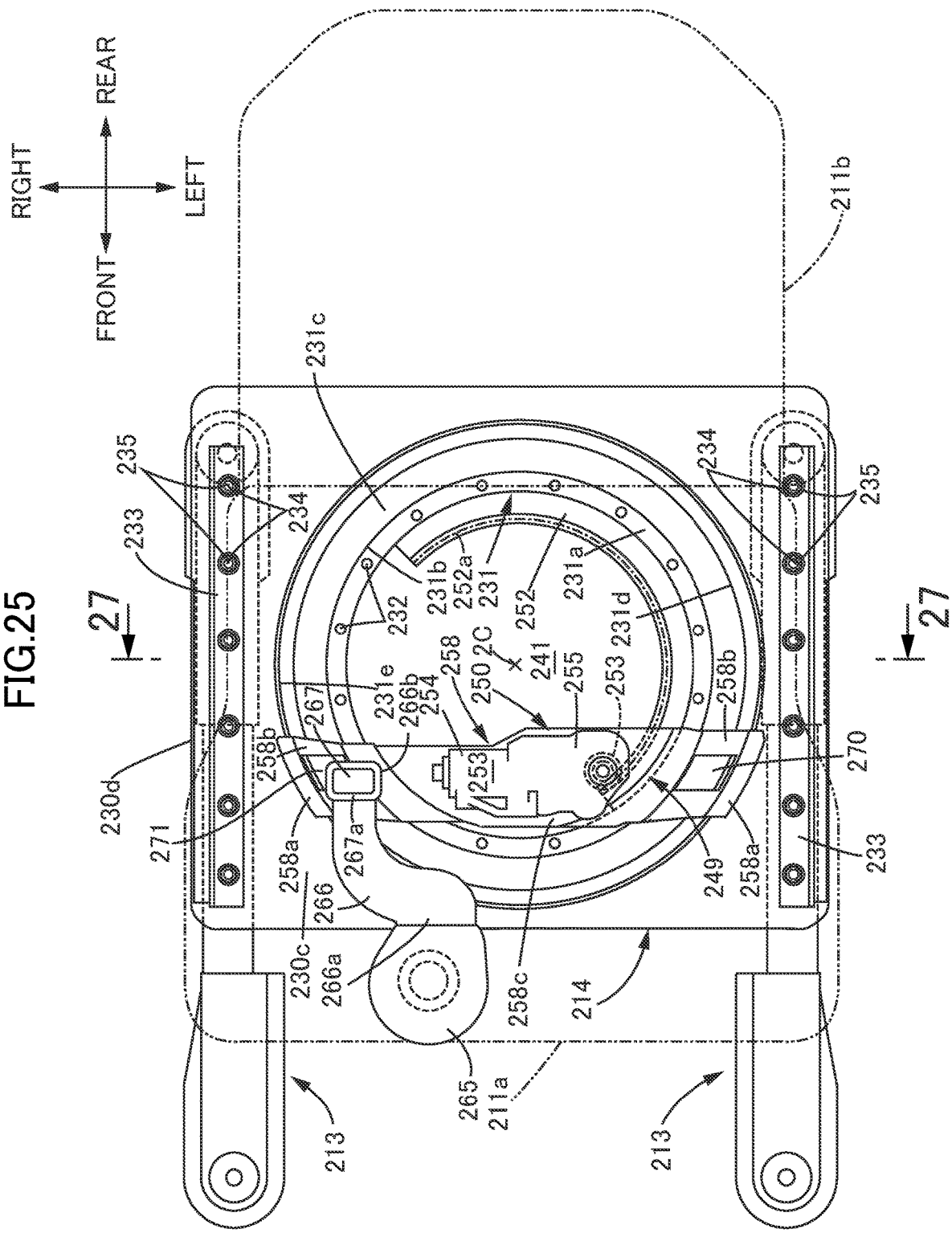

FIG. 25 is a view of a slide rail and a rotation mechanism from the same direction as in FIG. 23.

Figure 26:
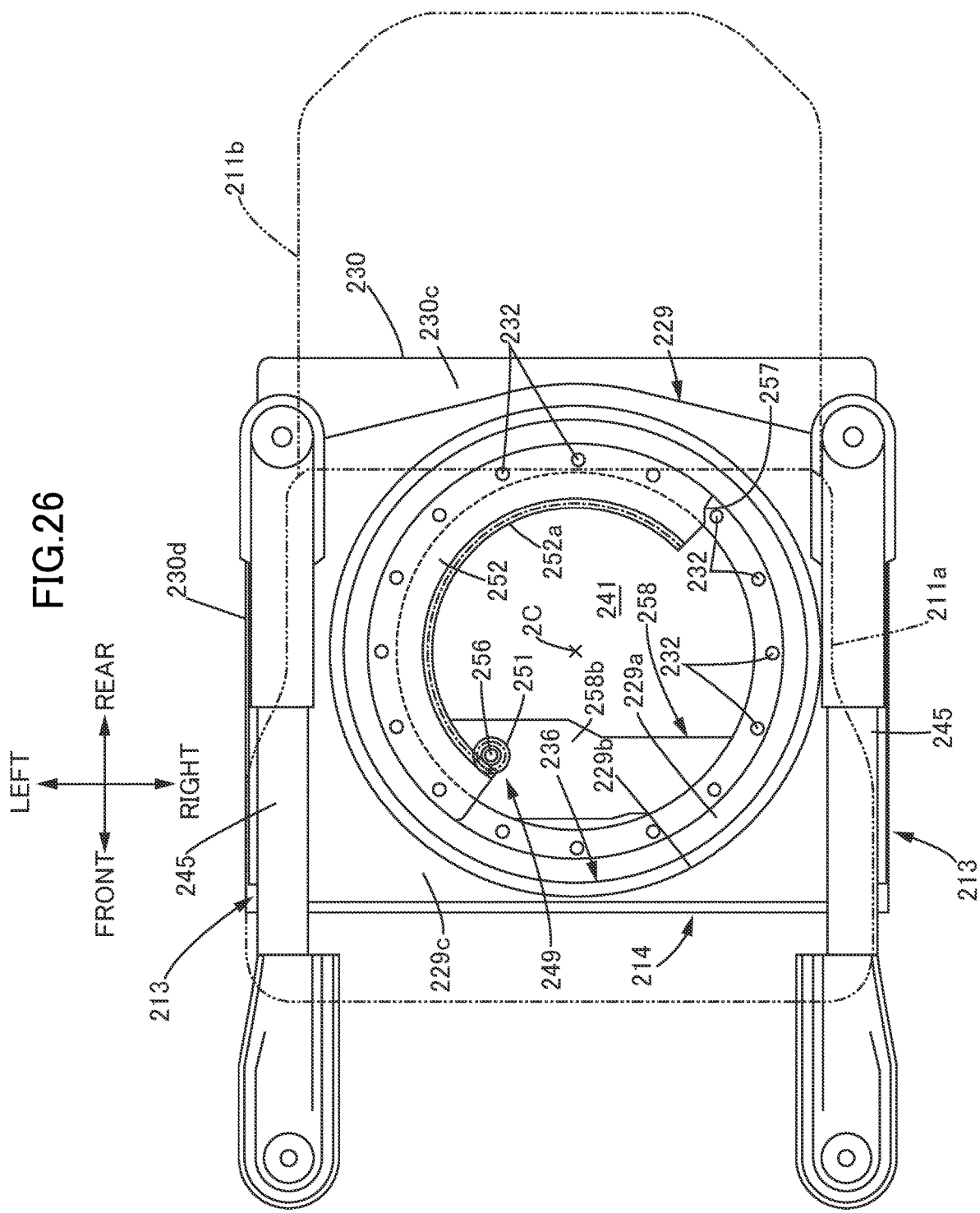

FIG. 26 is a view when the slide rail and the rotation mechanism are viewed from the side opposite to that in FIG. 25.

Figure 27:
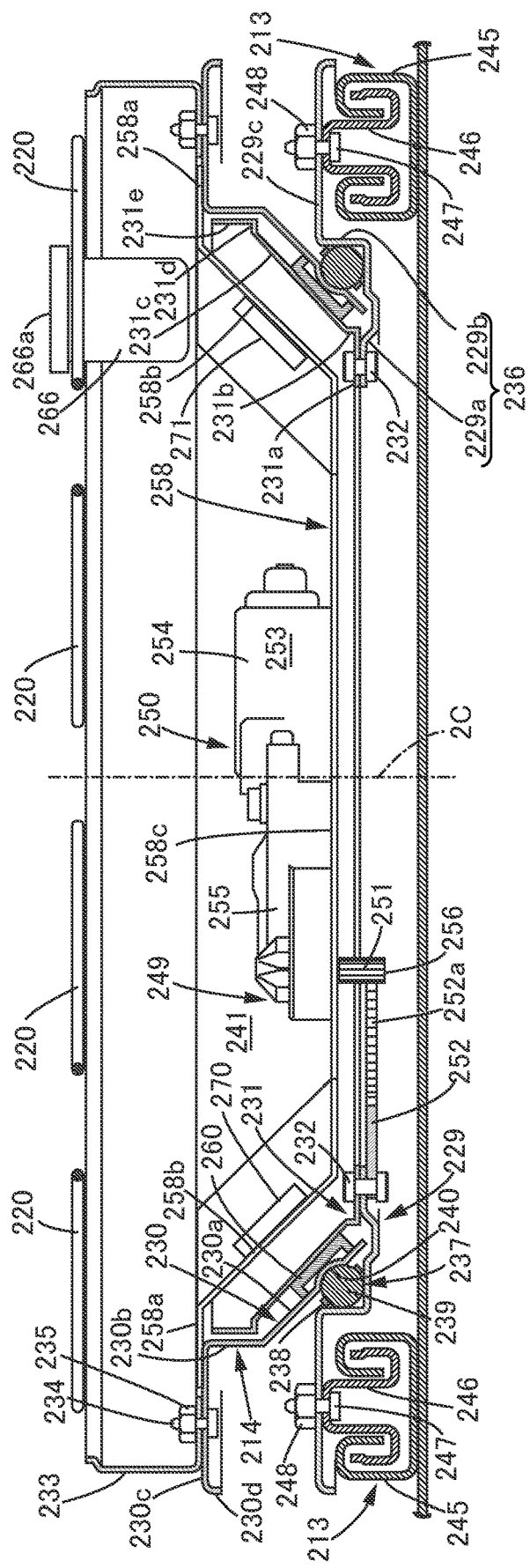

FIG. 27 is a sectional view along line 27-27 in FIG. 25.

<Explanation of Drawings Showing Embodiments of Solution Means for Fourth Problem>

Figure 28:
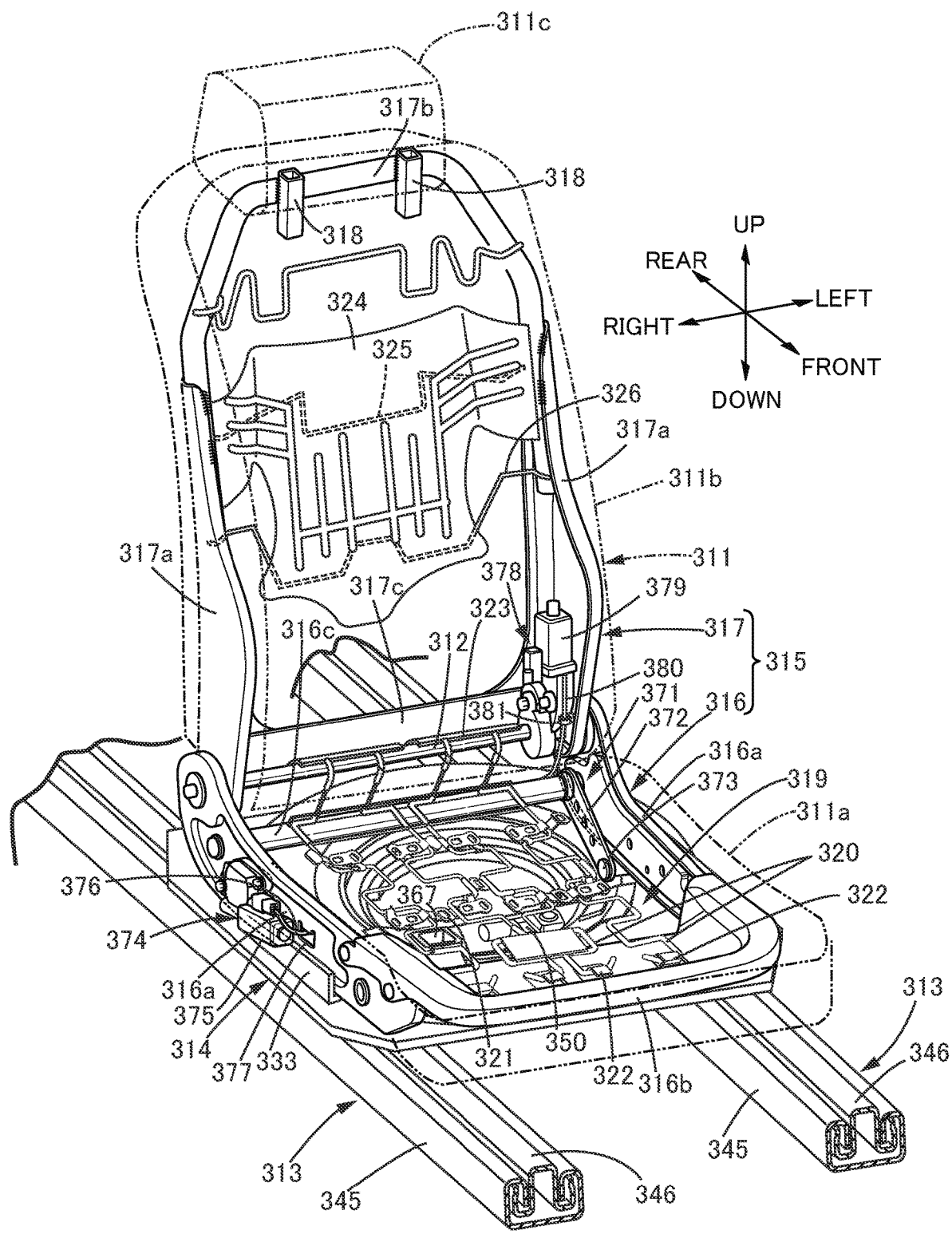

FIG. 28 is a perspective view showing a vehicle seat-rotating device of a first embodiment in a state in which a seat main body is omitted.

Figure 29:
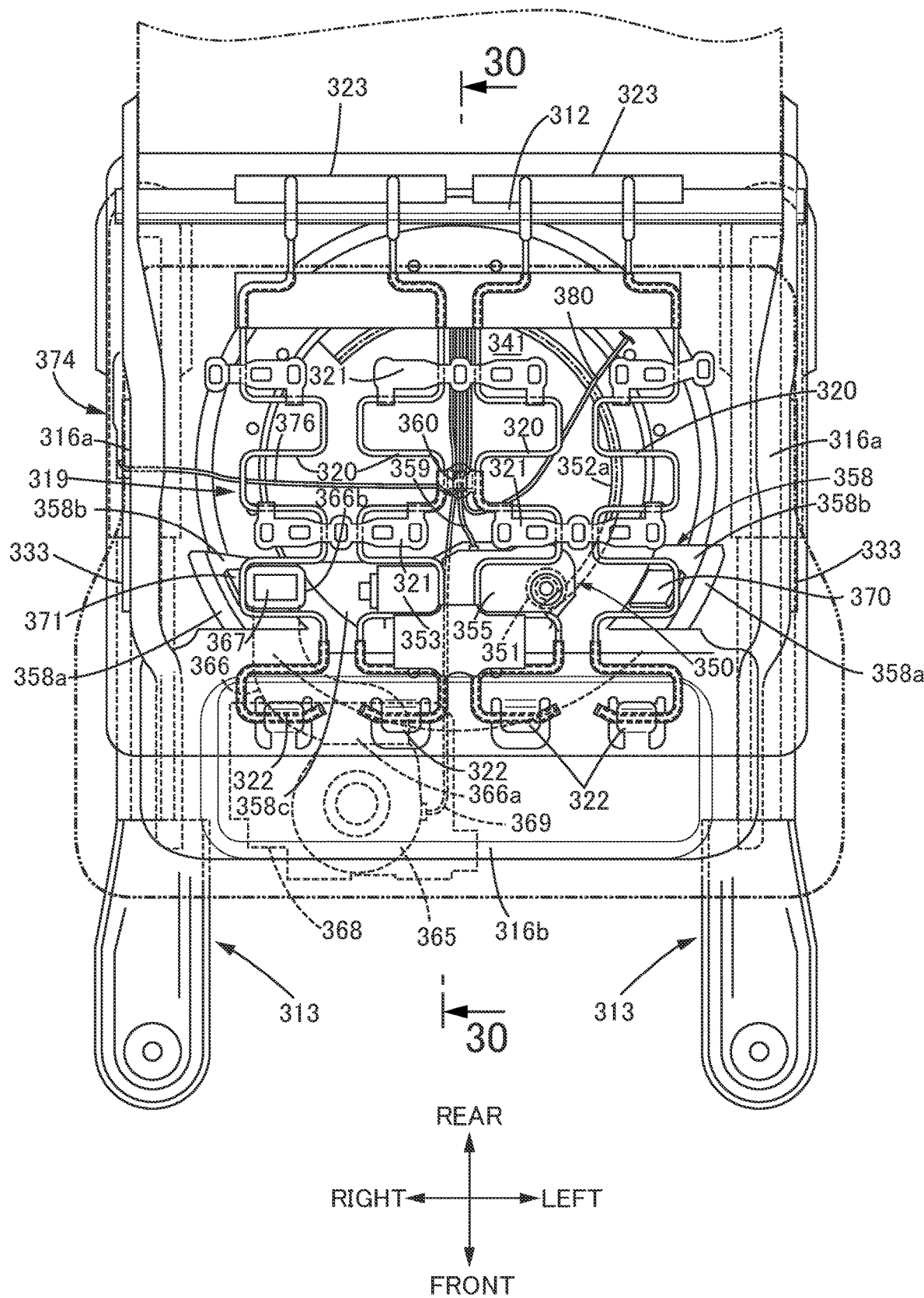

FIG. 29 is a plan view when an essential part of the vehicle seat-rotating device is viewed from above.

Figure 30:
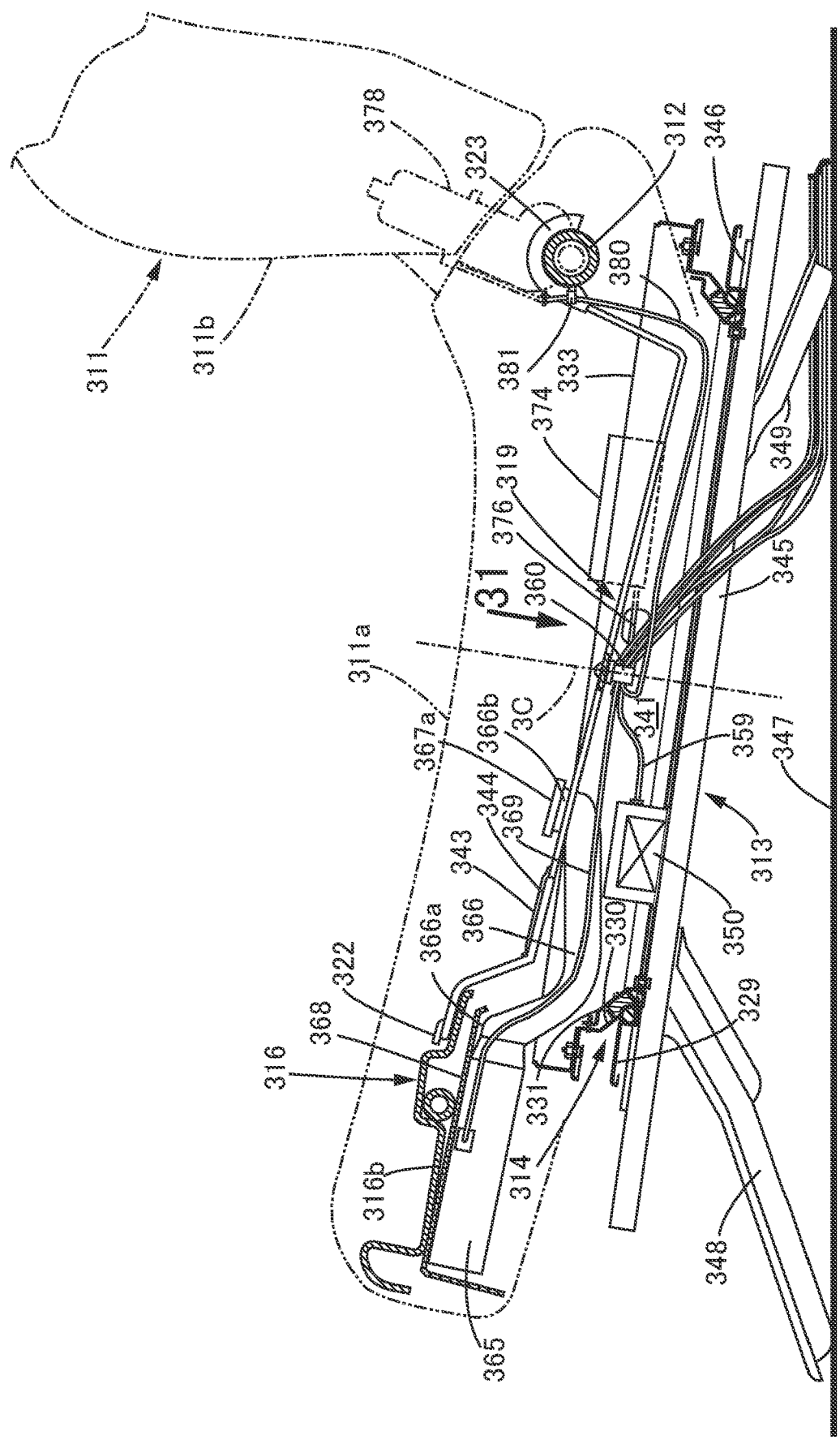

FIG. 30 is a sectional view of the seat-rotating device along line 30-30 in FIG. 29.

Figure 31:
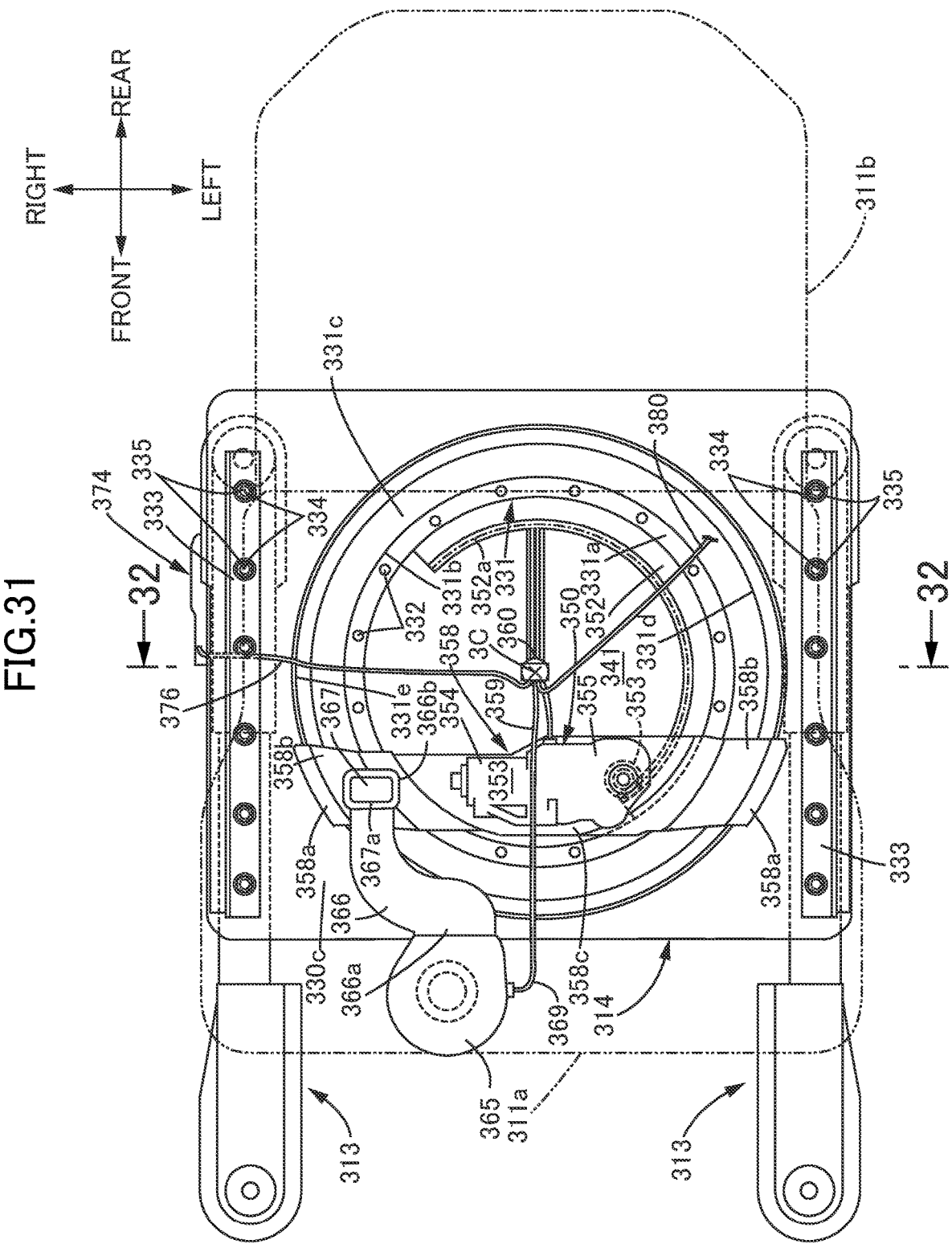

FIG. 31 is a view in the direction of arrow 31 in FIG. 30 in a state in which a seat cushion frame and a cushion-side pressure-receiving member are omitted.

Figure 32:
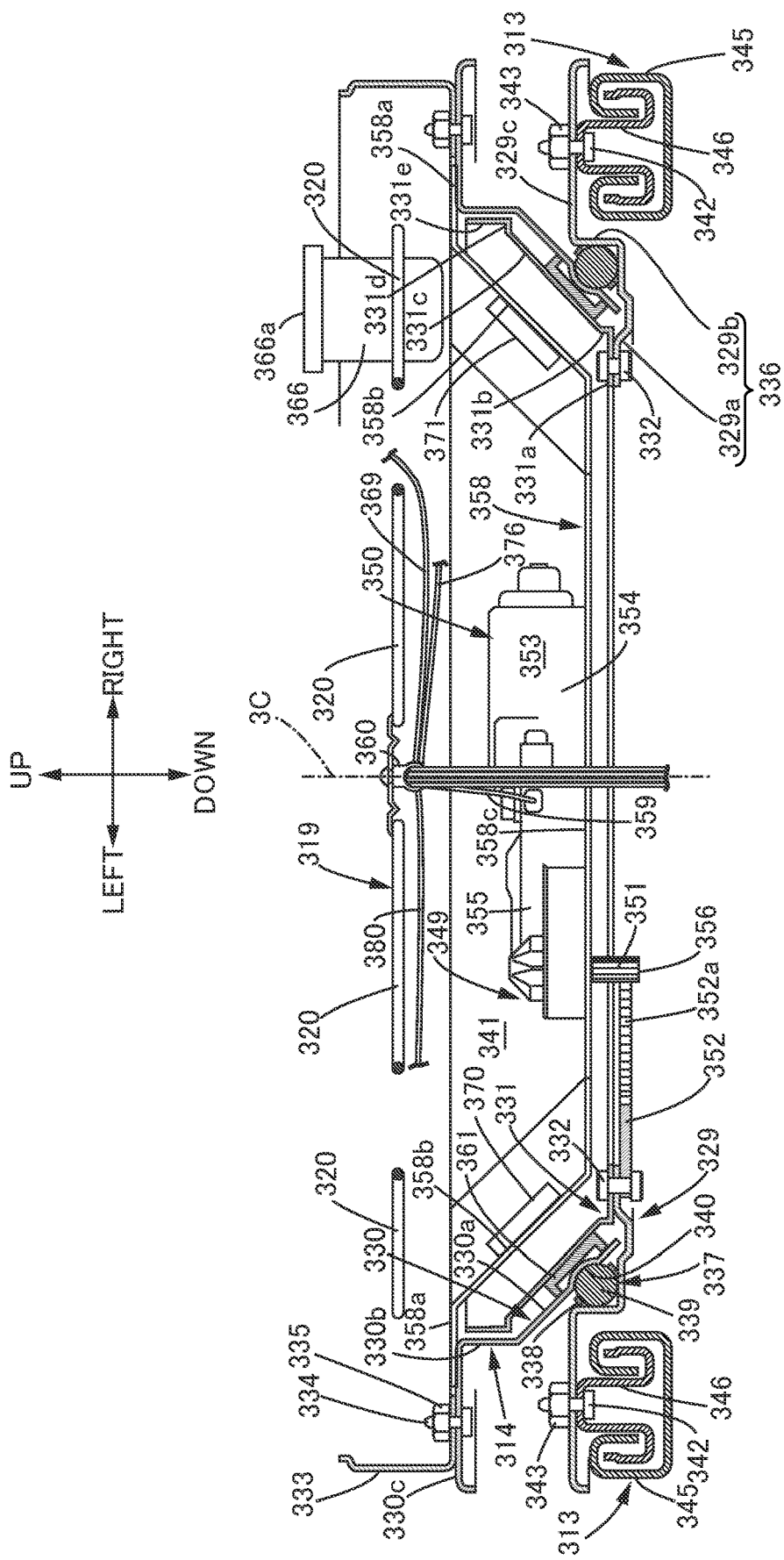

FIG. 32 is a sectional view of the seat-rotating device along line 32-32 in FIG. 31.

Figure 33:
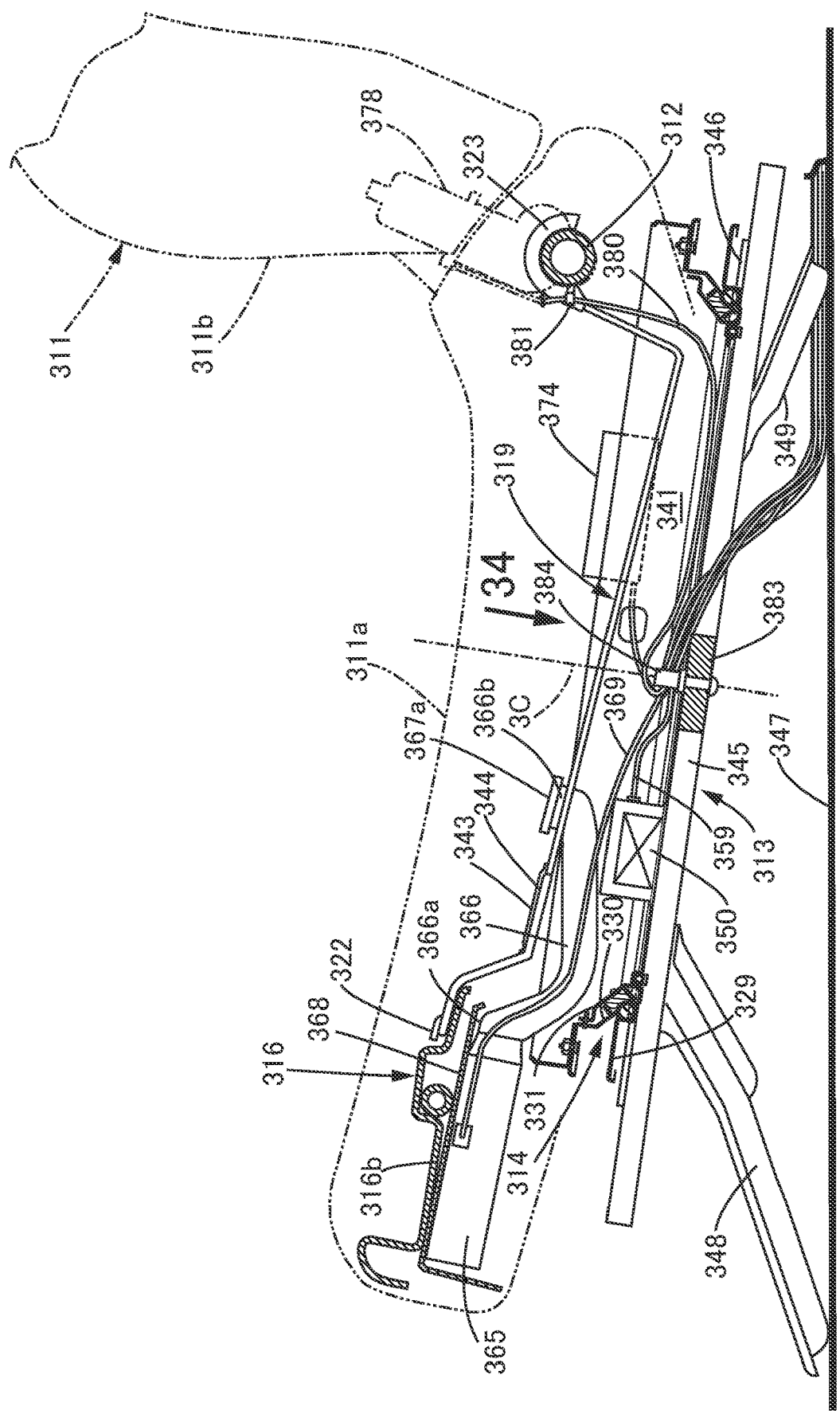

FIG. 33 is a sectional view, corresponding to FIG. 30, of a second embodiment.

Figure 34:
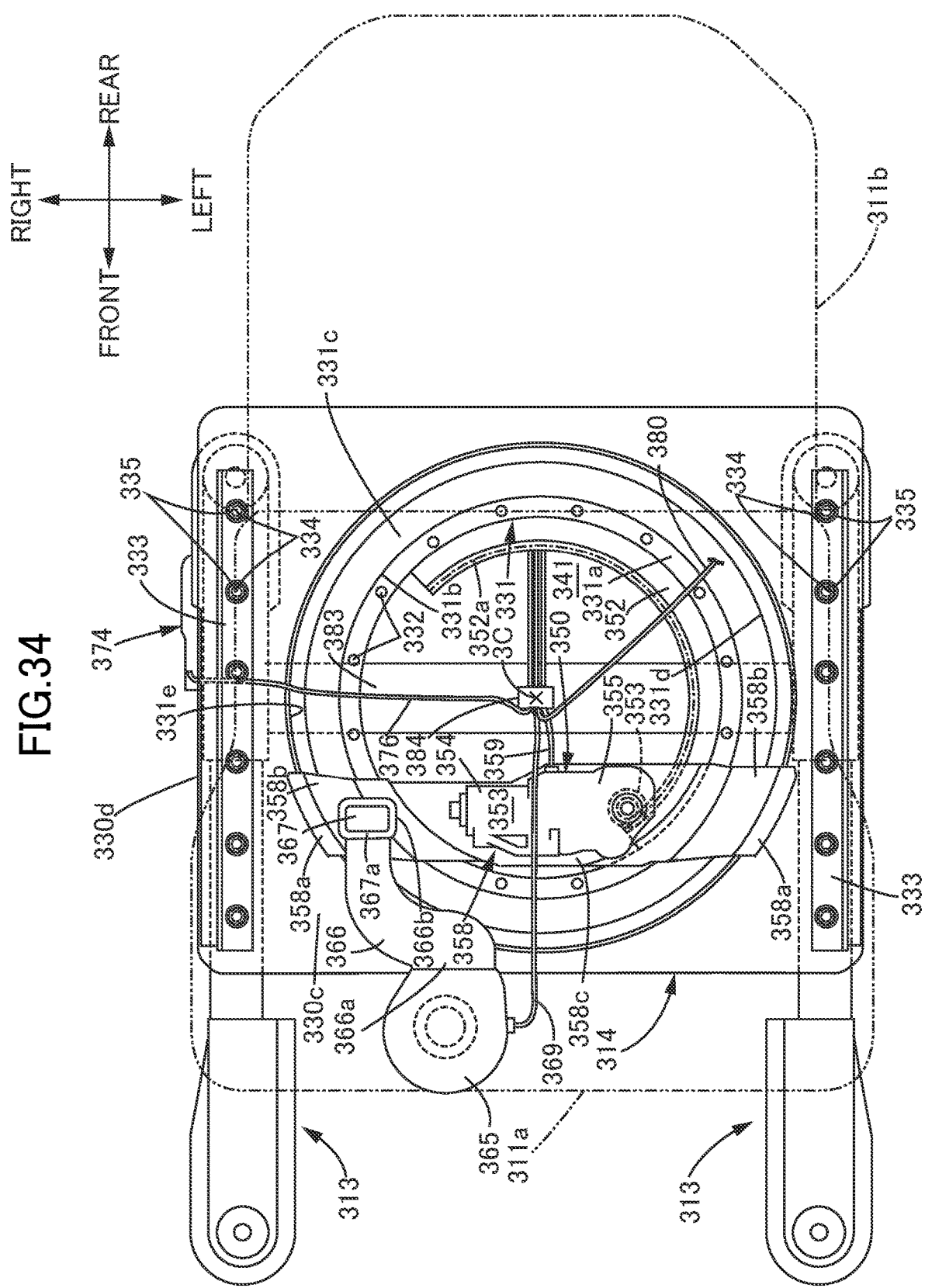

FIG. 34 is a view in the direction of arrow 34 in FIG. 33 in a state in which a seat cushion frame and a cushion-side pressure-receiving member are omitted.

Figure 35:
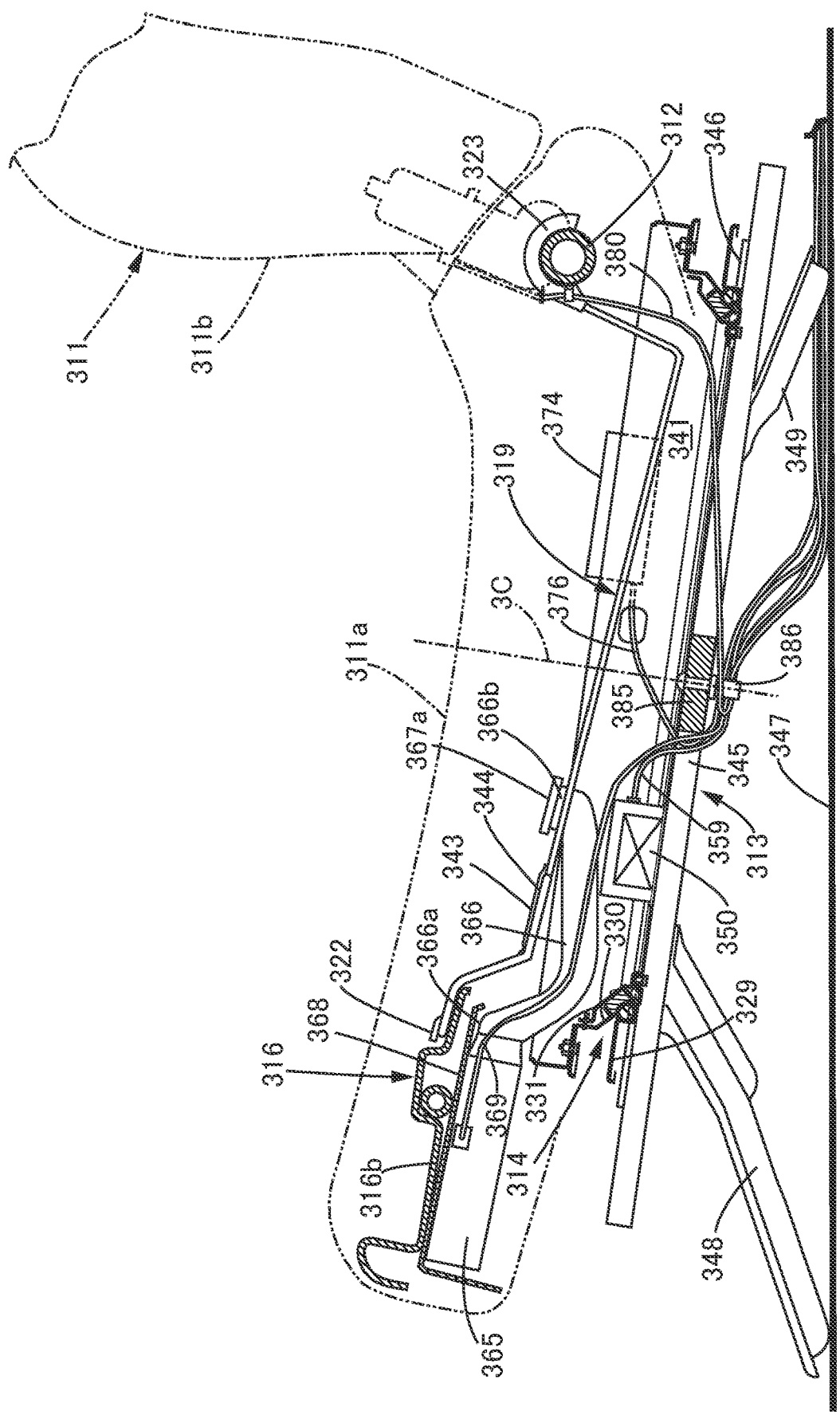

FIG. 35 is a sectional view, corresponding to FIG. 30, of a third embodiment.

EXPLANATION OF REFERENCE NUMERALS AND SYMBOLS

<Explanation of Reference Numerals and Symbols of Drawings Showing Embodiment of Solution Means for First Problem>

11 Vehicle seat, which is a vehicle interior item
12 Seat cushion
13 Seat back
15 Seat cushion frame
17 Reclining lever
18 Side frame
19 Pan frame, which is a linking frame
20 Rear pipe, which is a linking frame
22 Base member
23 Rotating member
30 Rotation support part
35 Vehicle floor
36 Movement means
45 Rotation-locking means
62 Latching means
63 Engagement means
66 Shaft support member
66a Shaft support wall portion
66b Extending wall portion
67 Shaft member
69 Hook member
70 Striker
71 Striker support member
74 Second coil spring, which is an urging member <Explanation of Reference Numerals and Symbols of Drawings Showing Embodiments of Solution Means for Second Problem>

110 Vehicle seat device
112 Seat cushion
112a Skin
114 Side cover
117 Rotation mechanism
119 Seat cushion frame
119a Side frame
129 Base member
130 Rotating member
165, 175, 178 Cover
167, 177 Fixed cover member <Explanation of Reference Numerals and Symbols of Drawings Showing Embodiment of Solution Means for Third Problem>
211a Seat cushion
214 Rotation mechanism
216 Seat cushion frame
219 Cushion-side pressure-receiving member
219a Lowest end of cushion-side pressure-receiving member
229 Base member
230 Rotating member
230a Taper portion
230b Side wall portion
230c Collar portion
230d Outer periphery of rotating member
241 Housing part
253 Electric motor, which is electrical equipment
258 Mounting member
258b Inclined plate portion
265 Blower, which is electrical equipment
270, 271 ECU
2C Rotational axis <Explanation of Reference Numerals and Symbols of Drawings Showing Embodiments of Solution Means for Fourth Problem>
311 Seat main body
311a Seat cushion
312 Support shaft
315 Seat frame
316 Seat cushion frame
317 Seat back frame
319 Cushion-side pressure-receiving member
329 Base member
330 Rotating member
350 Electric actuator for rotation, which is an electrical component
359, 369, 376, 380 Electric wire
360, 384, 386 Electric wire retaining member
365 Blower, which is an electrical component
374 Electric actuator for raising/lowering, which is an electrical component
378 Electric actuator for tilting, which is an electrical component
381 Intermediate retaining member
383, 385 Retaining member-supporting member
3C Center of rotation

MODES FOR CARRYING OUT THE INVENTION

<Embodiment of Solution Means for First Problem>

An embodiment of the present invention is explained below by reference to the attached drawings. In the explanation below, 'fore and aft', 'left and right' and 'up and down' refer to directions viewed by an occupant when a vehicle seat is in an attitude in which the occupant seated thereon faces forward.

Figure 1:
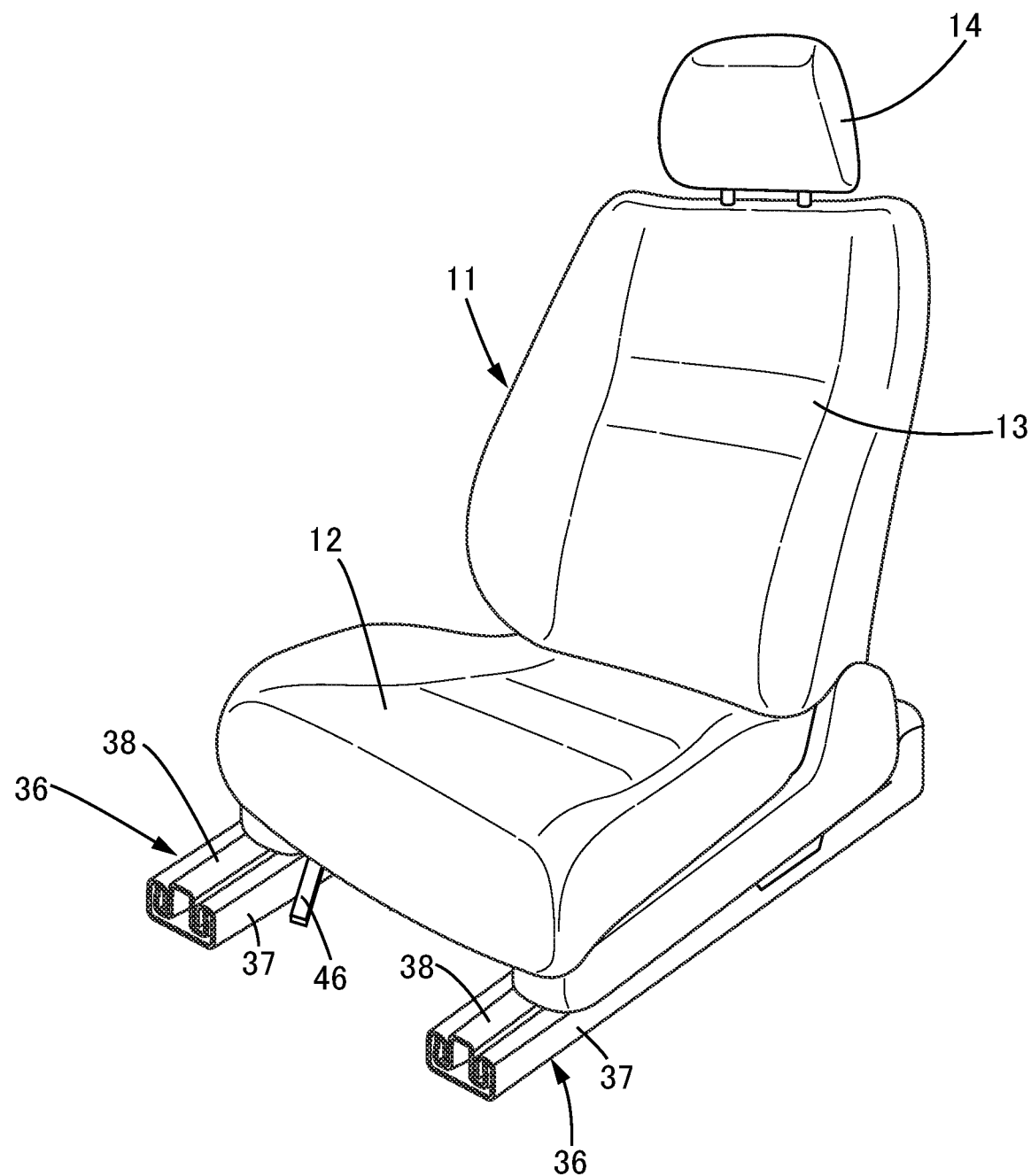
FIG. 1 is a perspective view of a rotating device for a vehicle seat.

First, in FIG. 1, a vehicle seat 11, which is a vehicle interior item, includes a seat cushion 12 for an occupant to be seated on, a seat back 13 supporting the back of the occupant seated on the seat cushion 12, and a headrest 14 provided on an upper part of the seat back 13 so that the up-and-down position of the headrest 14 can be adjusted.

Figure 2:
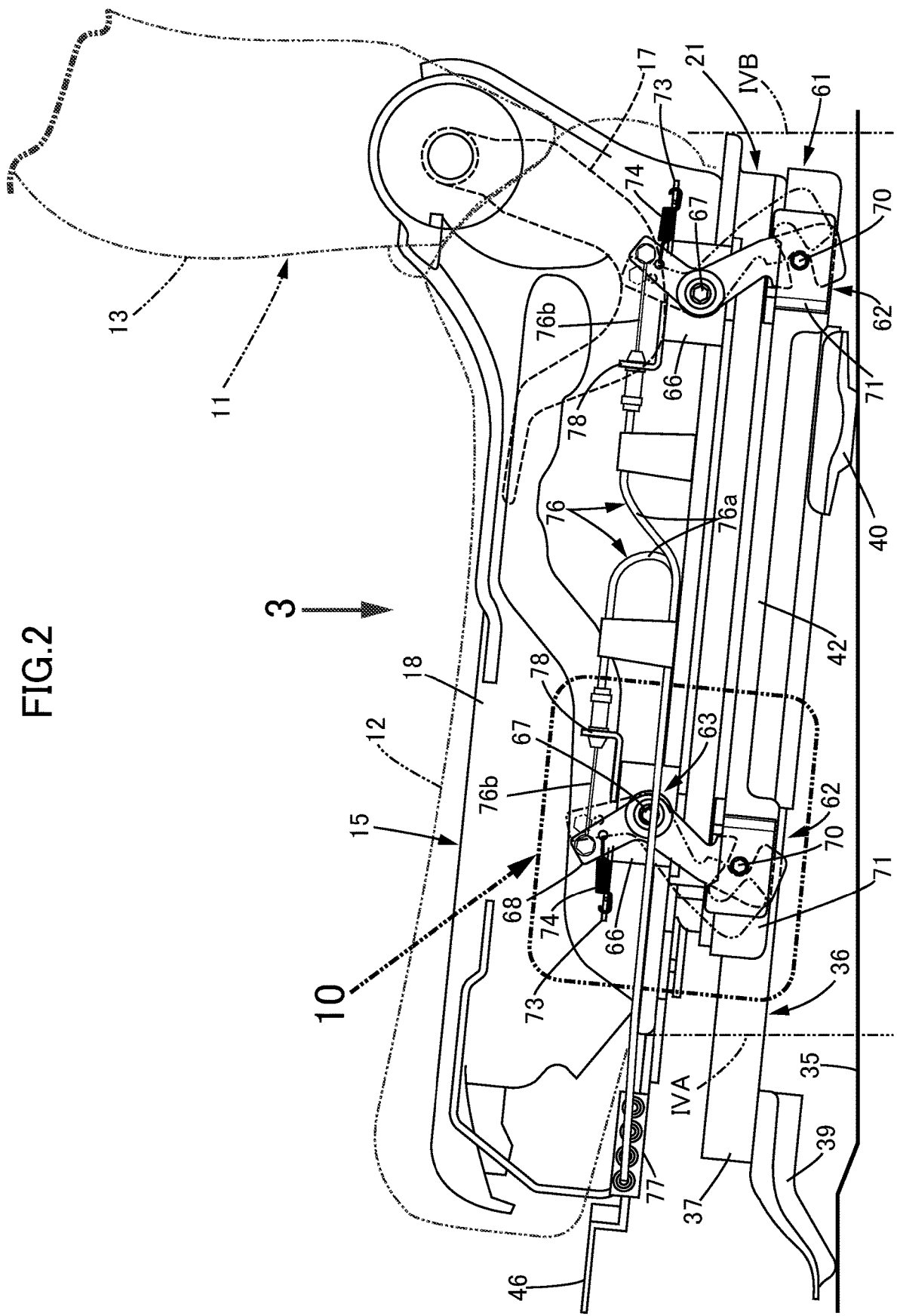
FIG. 2 is a side view of the rotating device for a vehicle seat in which the vehicle seat is omitted.
Figure 3:
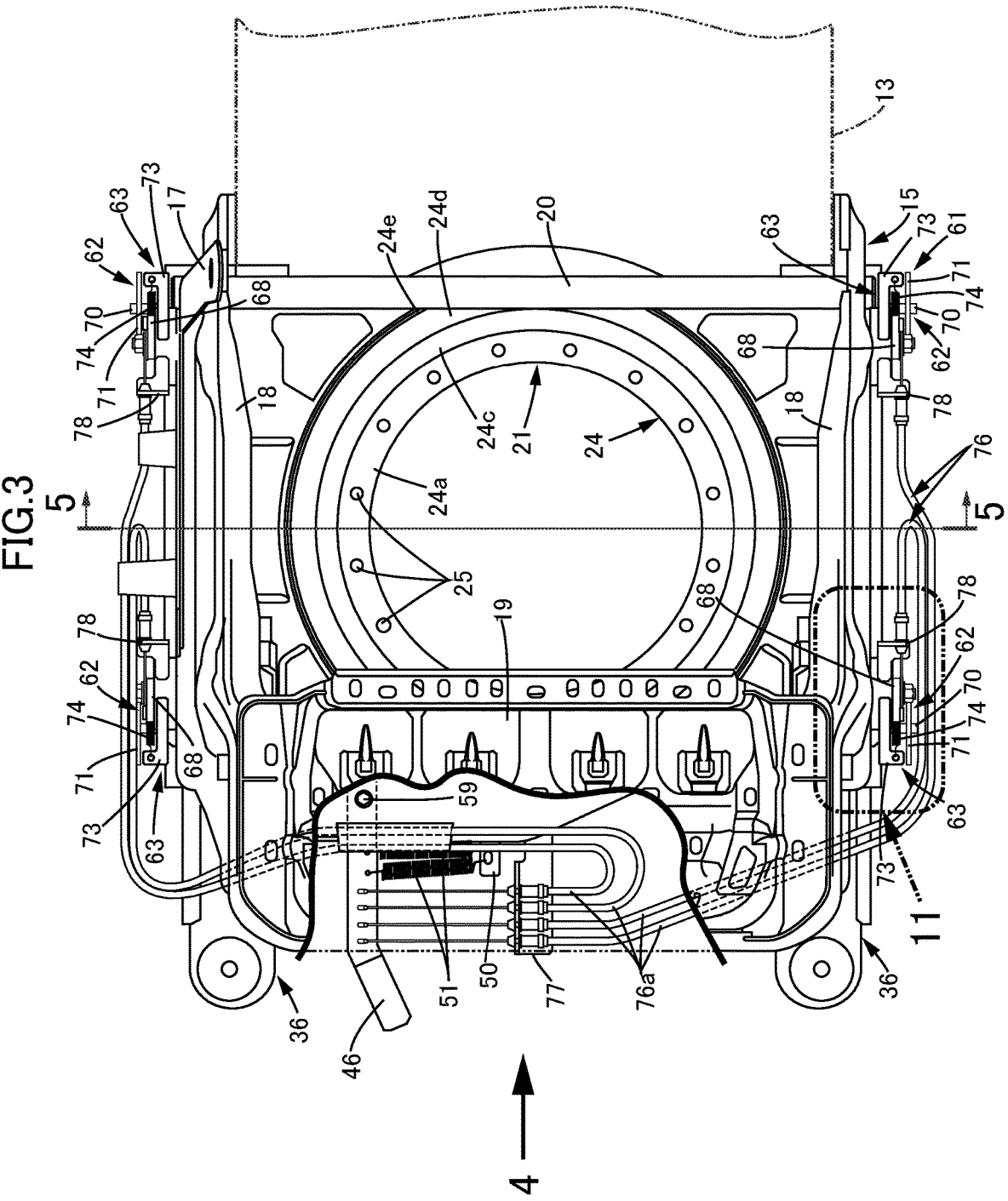
FIG. 3 is a view in the direction of arrow 3 in FIG. 2 in a state in which a seat cushion is omitted.
Figure 4:
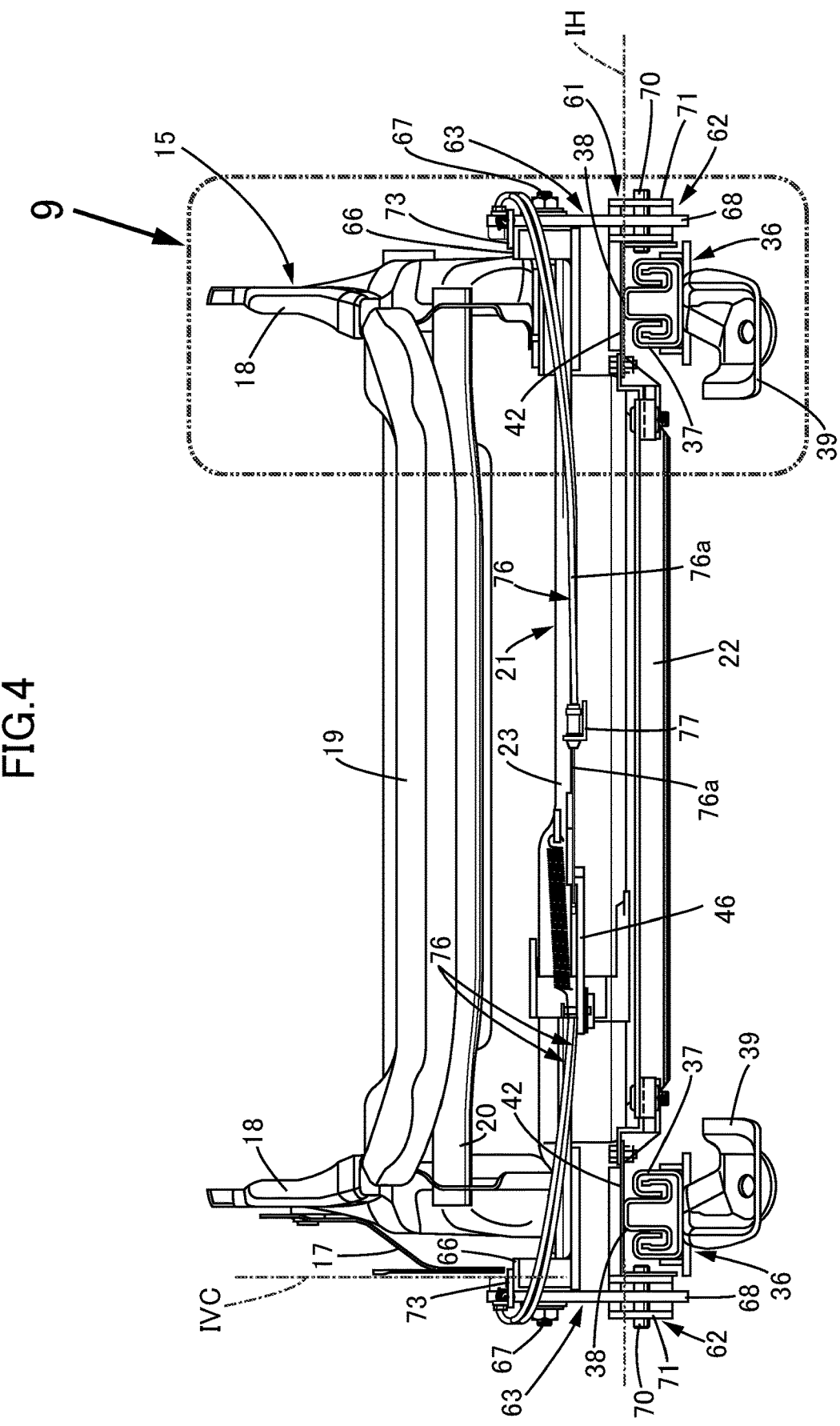
FIG. 4 is a view in the direction of arrow 4 in FIG. 3.

Referring in addition to FIG. 2 to FIG. 4, the seat cushion 12 is supported by a seat cushion frame 15, and the seat back 13 is supported by a seat back frame (not illustrated) that is tiltably linked, via a reclining mechanism (not illustrated), to a rear part of the seat cushion frame 15 when the vehicle seat 11 is in a state in which the vehicle seat 11 faces a reference direction, that is, in a state in which an occupant seated on the seat cushion 12 faces forward in the vehicle fore-and-aft direction.

The seat cushion frame 15 is formed from a pair of side frames 18 that are arranged at positions spaced from each other and extend linearly in the vehicle fore-and-aft direction, and a pair of linking frames that provide a link between opposite end parts of the side frames 18; in this embodiment one of the pair of linking frames is a pan frame 19 that provides a link between front end parts of the pair of side frames 18 in a state in which the vehicle seat 11 faces the reference direction, and the other linking frame is a rear pipe 20 that provides a link between rear end parts of the side frames 18.

A reclining lever 17 for operating the reclining mechanism is disposed, among the pair of side frames 18, outside one side frame 18 in plan view, in this embodiment on the outside in plan view of the side frame 18 disposed on the left side in a state in which the vehicle seat 11 faces the reference direction.

Figure 5:
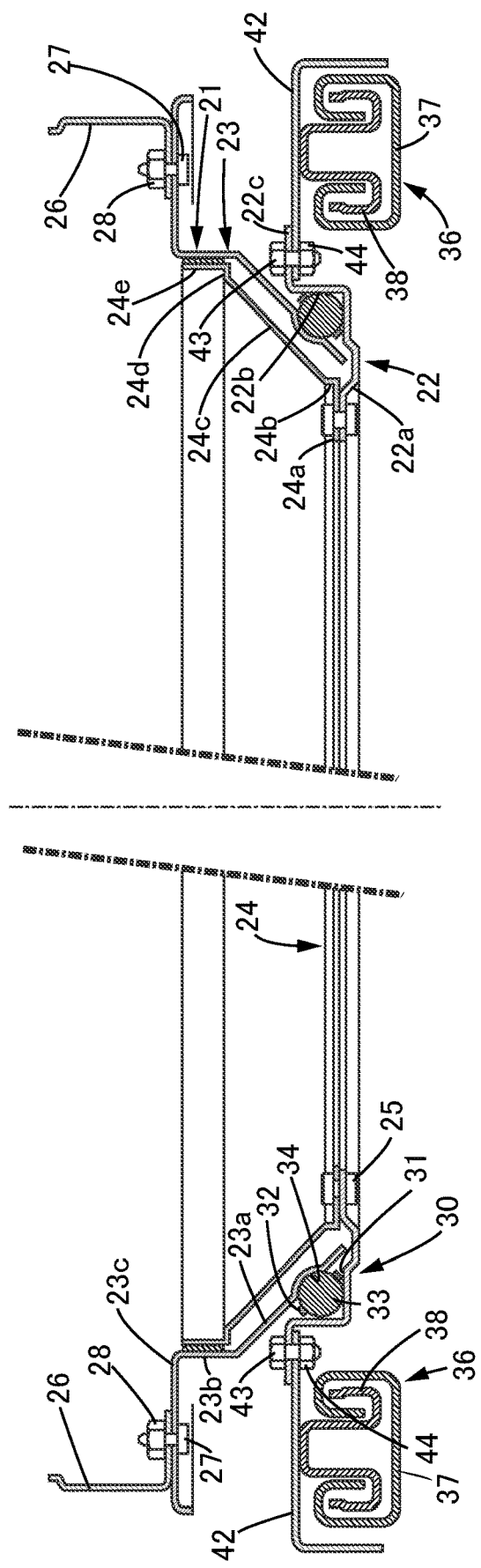
FIG. 5 is a sectional view along line 5-5 in FIG. 3.

Referring in addition to FIG. 5, the seat cushion frame 15 is provided on a rotation mechanism 21, the rotation mechanism 21 including a base member 22, an annular rotating member 23 that supports the seat cushion frame 15 and is rotatably supported by the base member 22, and a cover member 24 that covers part of the rotating member 23 from above and is fixed to the base member 22.

The base member 22 has an annular first bottom wall portion 22a, a cylindrical first side wall portion 22b that rises upward from an outer peripheral part of the first bottom wall portion 22a, and a first collar portion 22c that protrudes outward from an upper end part of the first side wall portion 22b, the first collar portion 22c being formed into a rectangular shape.

The cover member 24 has an annular second bottom wall portion 24a that abuts against the first bottom wall portion 22a of the base member 22 from above, a cylindrical second side wall portion 24b that rises slightly upward from the outer periphery of the second bottom wall portion 24a, a first taper portion 24c that is formed so as to have a larger diameter in going upward and is connectedly provided on an upper end part of the second side wall portion 24b, an annular first flat wall portion 24d that is connected to an upper end part of the first taper portion 24c, and a cylindrical third side wall portion 24e that rises upward from the outer periphery of the first flat wall portion 24d, the second bottom wall portion 24a being joined to the first bottom wall portion 22a of the base member 22 by a plurality of rivets 25.

The rotating member 23 has a second taper portion 23a that is disposed at a position opposing the first taper portion 24c of the cover member 24 from the outside and is formed so as to have a larger diameter in going upward, a cylindrical fourth side wall portion 23b that rises upward from an upper end part of the second taper portion 23a so as to oppose the third side wall portion 24e of the cover member 24 from the outside, and a second collar portion 23c that protrudes outward from the fourth side wall portion 23b, the second collar portion 23c being formed into a rectangular shape. A frame support plate 26 is fastened to opposite sides of the second collar portion 23c in the vehicle width direction by means of pluralities of first bolts 27 and first nuts 28, and the side frame 18 of the seat cushion frame 15 is mounted on the frame support plate 26.

The rotating member 23 is rotatably supported on an annular rotation support part 30 of the base member 22 via a bearing 31, and the rotation support part 30 is formed into an annular shape from the first bottom wall portion 22a and the first side wall portion 22b of the base member 22 so that its cross-sectional shape is substantially L-shaped.

The bearing 31 is formed by retaining balls 33 at a plurality of locations in the peripheral direction of an annular retainer 32, and an annular recess part 34 for the balls 33 to roll in is formed in the second taper portion 23a of the rotating member 23.

The base member 22 can be made to move in the vehicle fore-and-aft direction by movement means 36, the movement means 36 being disposed between a vehicle floor 35 and the base member 22.

The movement means 36 includes a pair of left and right fixed rails 37 that extend in the vehicle fore-and-aft direction while being spaced in the left-and-right direction, and a pair of left and right movable rails 38 that are slidably fitted to the fixed rails 37; the fixed rails 37 are fixed to the vehicle floor 35 via a front rail support member 39 and rear rail support member 40 that are disposed so as to be spaced in the vehicle fore-and-aft direction, and due to the front rail support member 39 being formed so as to be higher than the rear rail support member 40 the fixed rails 37 are supported on the vehicle floor 35 in an attitude in which they are inclined downward to the rear.

As is clearly shown in FIG. 5, the movable rail 38 has secured thereto by welding, etc. support brackets 42, and these support brackets 42 are fastened to opposite sides in the vehicle width direction of the first collar portion 22c of the base member 22 by means of pluralities of second bolts 43 and second nuts 44. That is, the base member 22 is supported on the vehicle floor 35 via the support bracket 42 and the movement means 36.

Figure 6A:
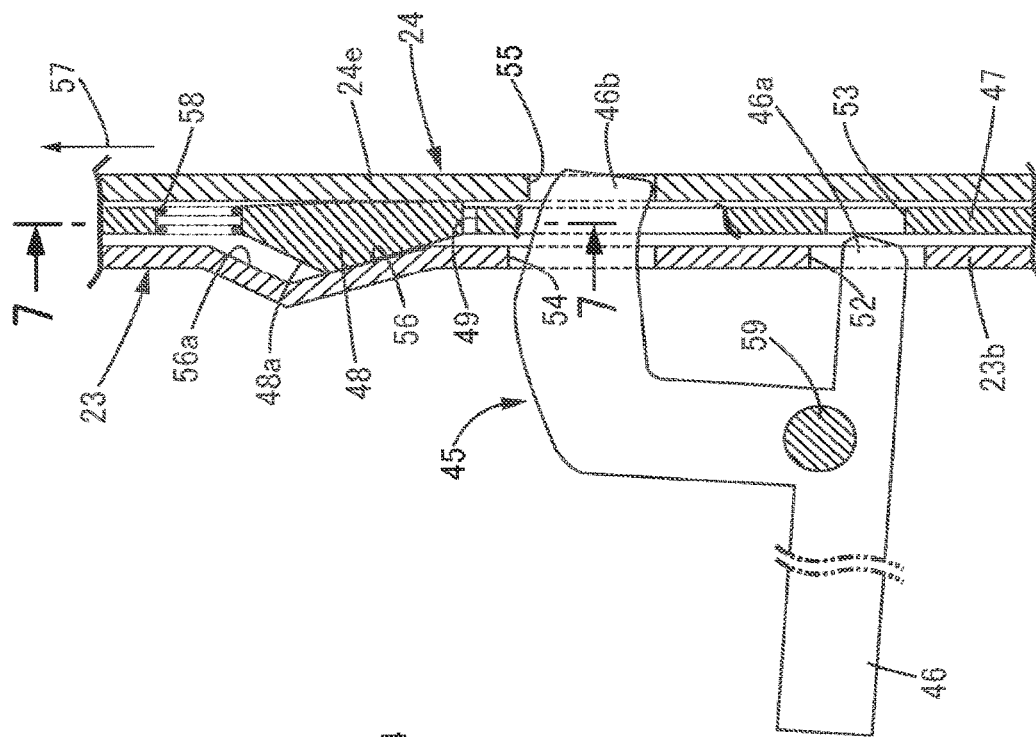
FIG. 6A is a sectional view showing the arrangement of a rotation locking mechanism separately in a locked state.
Figure 6B:
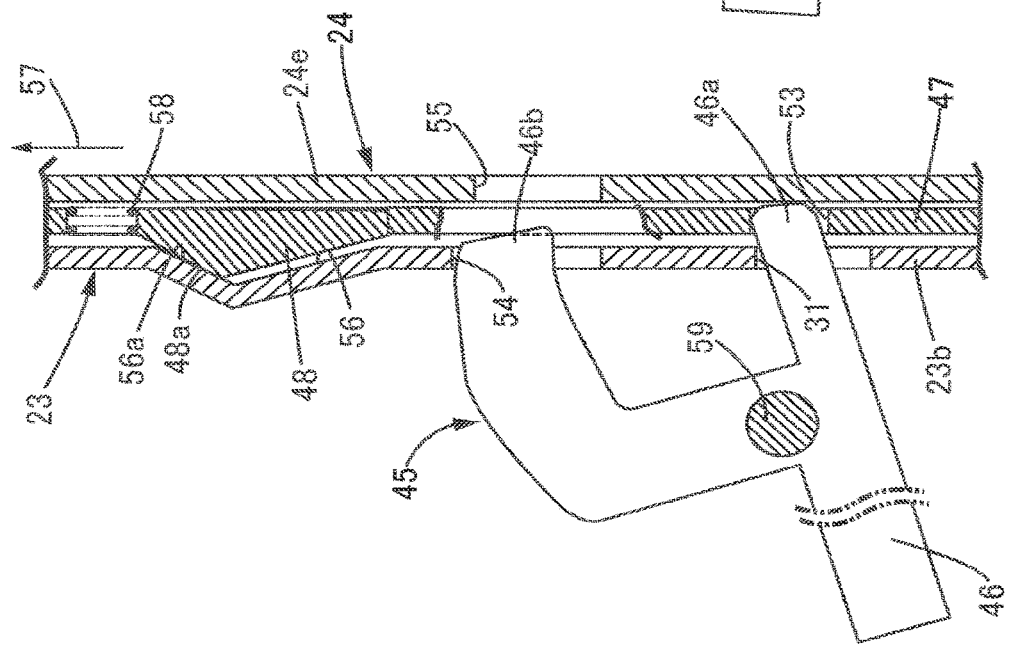
FIG. 6B is a sectional view showing the arrangement of a rotation locking mechanism separately in a lock release state.
Figure 7:
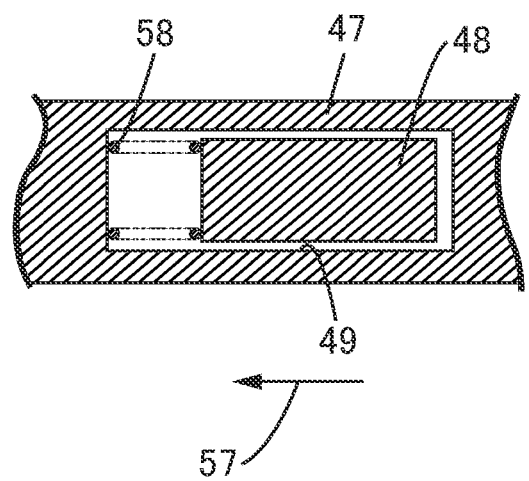
FIG. 7 is a sectional view along line 7-7 in FIG. 6A.

Referring in addition to FIG. 6 and FIG. 7, a rotatable state and a non-rotatable state of the rotating member 23 can be switched between by rotation-locking means 45, the rotation-locking means 45 including a lock member 46 supported on the rotating member 23, an annular push-out member 47 disposed between the third side wall portion 24e of the cover member 24 and the fourth side wall portion 23b of the rotating member 23 and operating in association with operation of the lock member 46, and a rattle-suppressing member 48 disposed at a plurality of locations spaced in the peripheral direction of the push-out member 47.

Provided at a plurality of locations, spaced in the peripheral direction, of the push-out member 47 are housing holes 49 extending lengthwise in the peripheral direction of the push-out member 47. The rattle-suppressing member 48 is housed in the housing hole 49.

On the other hand, the lock member 46 having part thereof protruding outward from the pan frame 19 is pivotably supported on the second collar portion 23c of the rotating member 23 via a shaft 59. The lock member 46 can pivot between a locked position in which as shown in FIG. 6A it engages with the third side wall portion 24e of the cover member 24 so as to disable rotation of the rotating member 23, and a lock release position in which as shown in FIG. 6B the engagement with the third side wall portion 24e is released and rotation of the rotating member 23 is enabled. Moreover, as is clearly shown in FIG. 3 the lock member 46 is pivotingly urged toward the locked position side by means of a spring 51 provided between the lock member 46 and a first spring support member 50 fixed to the second collar portion 23c, and in this embodiment the spring 51 is a coil spring and two springs 51 are provided so as to stretch between the lock member 46 and the first spring support member 50.

A link arm portion 46a of the lock member 46 is inserted through a through hole 52 formed in the fourth side wall portion 23b of the rotating member 23, and an extremity part of the link arm portion 46a can be inserted into a link hole 53 formed in the push-out member 47; inserting the extremity part of the link arm portion 46a into the link hole 53 links the lock member 46 to the push-out member 47. The link arm portion 46a is linked to the link hole 53 when the lock member 46 attains the lock release position as shown in FIG. 6B, and the link arm portion 46a applies a pushing force to the push-out member 47 in the pivoting direction.

An engagement arm portion 46b of the lock member 46 engages with a first through hole 54 formed in the fourth side wall portion 23b of the rotating member 23 and a second through hole 55 formed in the third side wall portion 24e of the cover member 24 when the lock member 46 is at the locked position shown in FIG. 6A, but disengages from the second through hole 55 to thus release engagement with the cover member 24 when it is at the lock release position shown in FIG. 6B. The engagement arm portion 46b operates between the locked position and the lock release position so as to straddle the push-out member 47.

Formed in the fourth side wall portion 23b of the rotating member 23 is a recess part 56 that houses part of the rattle-suppressing member 48 and enables the rattle-suppressing member 48 to be closely fitted thereinto.

The rattle-suppressing member 48 is formed into a wedge shape so as to have an inclined face 48a whose height gradually decreases as the push-out member 47 moves in a direction of movement 57 in response to the lock member 46 operating from the lock release position toward the locked position side, and the recess part 56, which enables the rattle-suppressing member 48 to be closely fitted therein, is formed into a triangular shape so as to house part of the rattle-suppressing member 48 while having a recess part-side inclined face 56a opposing the inclined face 48a.

A first coil spring 58 is provided in a compressed state between the rattle-suppressing member 48 and, among longitudinally opposite end parts of the housing hole 49 formed in the push-out member 47, a front end part along the direction of movement. The rattle-suppressing member 48 is urged in a direction opposite to the direction of movement 57 by a spring force exerted by the first coil spring 58.

When the lock member 46 is at the locked position, as shown in FIG. 6A the inclined face 48a of the rattle-suppressing member 48 abuts closely against the recess part-side inclined face 56a of the recess part 56 to thus put the rattle-suppressing member 48 in close contact with the rotating member 23 and the cover member 24, thereby preventing the rotating member 23 from rattling.

When the lock member 46 attains the lock release position, as shown in FIG. 6B, among the longitudinally opposite end parts of the housing hole 49, a rear end part along the direction of movement 57 abuts against the rattle-suppressing member 48, the rattle-suppressing member 48 is pushed in the direction of movement against the urging force of the first coil spring 58, and the rattle-suppressing member 48 moves toward the side on which the inclined face 48a of the rattle-suppressing member 48 moves away from the recess part-side inclined face 56a, thus releasing the state in which rattling is prevented.

Figure 8:
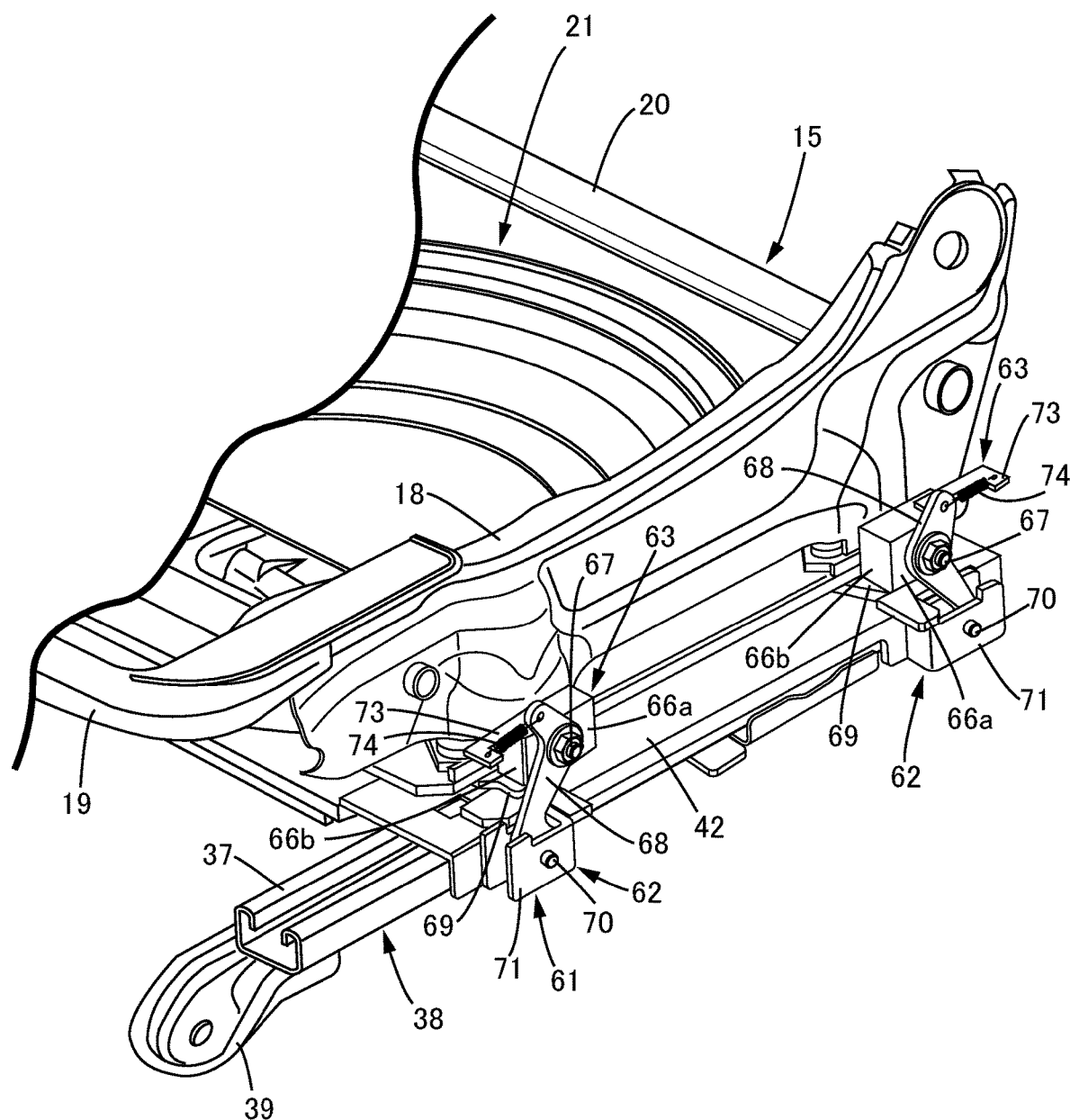
FIG. 8 is a perspective view showing an essential part of a vehicle seat device.

Referring in addition to FIG. 8, detachment of the rotating member 23 from the base member 22 due to a load acting on the rotating member 23 in a non-rotatable state is suppressed by a detachment suppression mechanism 61. The detachment suppression mechanism 61 includes latching means 62 provided on the base member 22 side and engagement means 63 provided on the rotating member 23 side, the engagement means 63 being capable of switching between a state in which it engages with the latching means 62 when the rotating member 23 is in a non-rotating state and suppresses detachment of the rotating member 23 from the base member 22 and a state in which engagement with the latching means 62 is released when the rotating member 23 attains a rotatable state.

Four of the latching means 62 are disposed on the base member 22 side, a pair being disposed on each of opposite sides along the vehicle width direction of the base member 22 so as to be spaced in the fore-and-aft direction, and four of the engagement means 63 are provided on the rotating member 23 side, the engagement means 63 being capable of engaging with the latching means 62. The latching means 62 and the engagement means 63 are spaced in the vehicle fore-and-aft direction and are disposed further rearward than the front end and further forward than the rear end of the rotating member 23 when viewed from the side in the vehicle width direction (see FIG. 2). That is, the latching means 62 and the engagement means 63 are disposed between a first imaginary vertical plane IVA passing the front end of the rotating member 23 (see FIG. 2) and a second imaginary vertical plane IVB passing the rear end of the rotating member 23 (see FIG. 2). Moreover, as is clearly shown in FIG. 3 the latching means 62 and the engagement means 63 are disposed further outside than the rotating member 23 at least in a plan view when the rotating member 23 is in the non-rotating state.

Figure 9:
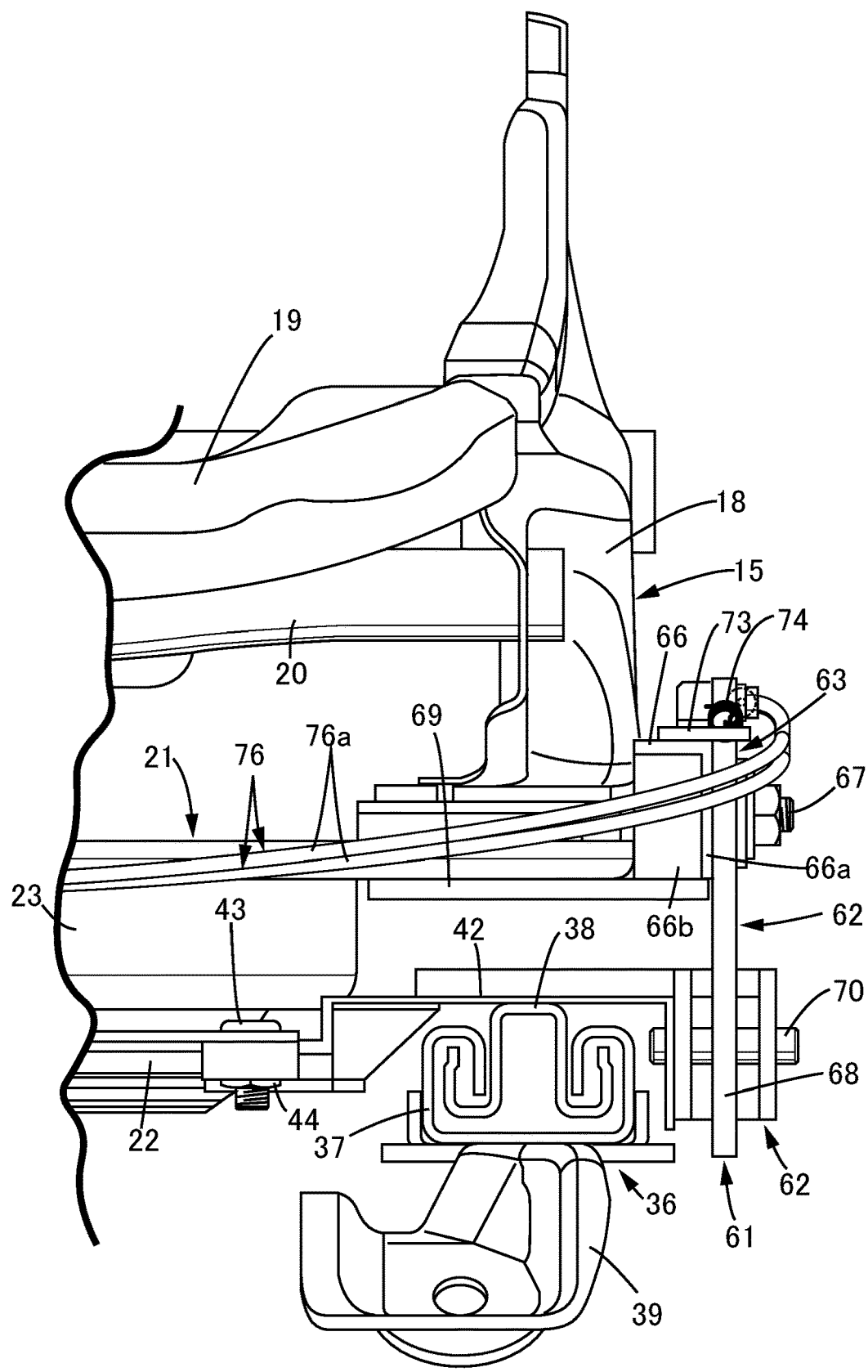
FIG. 9 is an enlarged view of a part shown by arrow 9 in FIG. 4.
Figure 10:
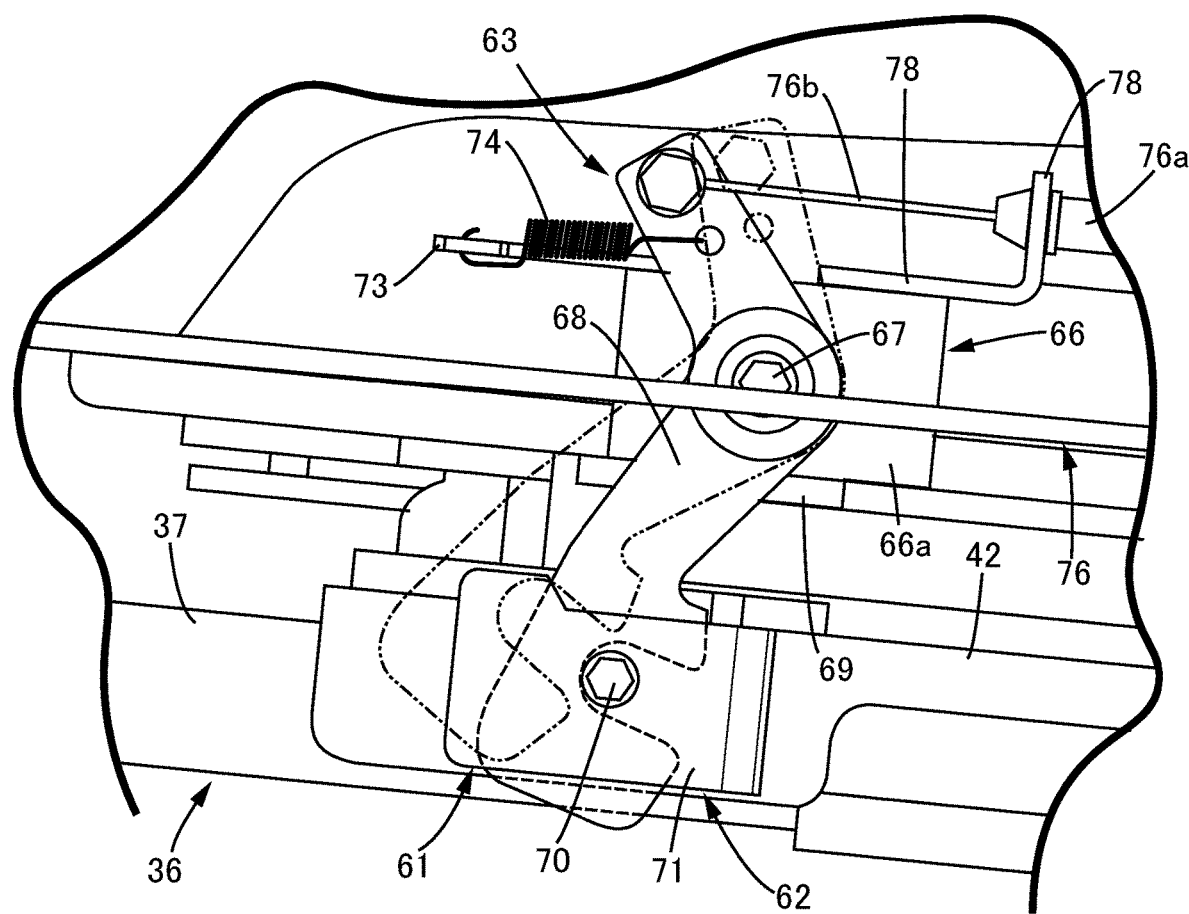
FIG. 10 is an enlarged view of a part shown by arrow 10 in FIG. 2.
Figure 11:
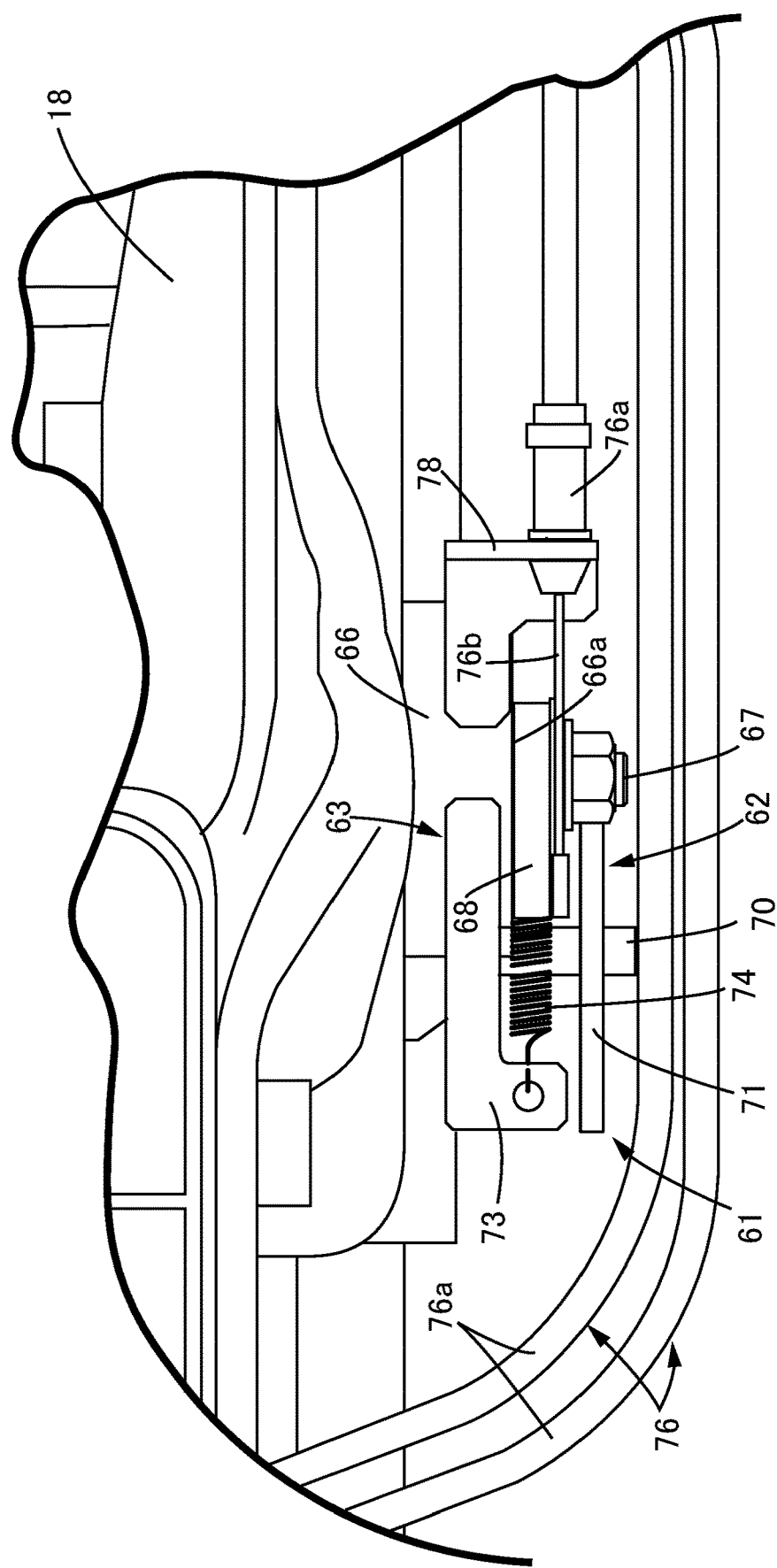
FIG. 11 is an enlarged view of a part shown by arrow 11 in FIG. 3.

Referring in addition to FIG. 9 to FIG. 11, the engagement means 63 includes a shaft support member 66 that is fixed directly or indirectly to the rotating member 23, a shaft member 67 that is supported by the shaft support member 66, and a hook member 68 that is pivotably and axially supported by the shaft member 67.

The shaft support member 66 includes a shaft support wall portion 66a that is disposed outside the rotating member 23 in plan view while having fixed thereto the shaft member 67, and a pair of extending wall portions 66b that are connectedly provided on the shaft support wall portion 66a at positions sandwiching the shaft member 67 therebetween and extend toward the rotating member 23 side. The extending wall portion 66b is fixed directly or indirectly to the rotating member 23, and in this embodiment the extending wall portion 66b is fixed by welding, etc. to a support plate 69 fixed by welding, etc. to a lower face of the second collar portion 23c of the rotating member 23. The hook member 68 is disposed outside the shaft support wall portion 66a and pivotably supported on the shaft member 67.

The engagement means 63 is disposed at a position in which at least part of (part in this embodiment) of the engagement means 63 overlaps the rotating member 23 when viewed from the side, and is disposed at a position in which it avoids the movement means 36 in plan view and, in particular, is disposed outside the movement means 36 in plan view. As shown in FIG. 2, the engagement means 63 is disposed at a position in which at least the upper part of the engagement means 63 overlaps the seat cushion 12 when viewed from the side and at least part of (part in this embodiment) of the engagement means 63 overlaps the side frame 18 when viewed from the side.

The engagement means 63 are arranged so that they release engagement with the latching means 62 by pivoting toward the side on which, among the engagement means 63, a lower part of the hook member 68 of the engagement means 63 disposed on the front side in the vehicle fore-and-aft direction of the rotating member 23 and a lower part of the hook member 68 of the engagement means 63 disposed on the rear side in the vehicle fore-and-aft direction of the rotating member 23 move away from each other.

On the other hand, the latching means 62 are disposed on opposite sides in the vehicle width direction of the base member 22 while being spaced in the vehicle fore-and-aft direction, and include a rod-shaped striker 70 that the hook member 68 can engage with and a striker support member 71 that supports the striker 70 and is fixed directly or indirectly to the base member 22, in this embodiment the striker support member 71 being fixed to the base member 22 via the support bracket 42.

The second latching means 62 includes the striker 70, with which the hook member 68 can engage, and a second striker support member 71 that supports the striker 70 and is fixed directly or indirectly to the base member 22, and in this embodiment the second striker support member 71 is fixed to the base member 22 via the support bracket 42.

The first striker support member 71 is formed so as to have a substantially U-shaped cross-sectional shape while enabling the hook member 68 to be inserted into and disengaged therefrom, and the striker 70 is fixed to the striker support member 71 so as to straddle the striker support member 71.

Among the latching means 62, the striker support member 71 of the latching means 62 disposed on the front side in the vehicle fore-and-aft direction of the base member 22 is fixed to the base member 22 in an attitude in which it opens forward in the vehicle fore-and-aft direction, and the striker support member 71 of the latching means 62 disposed on the rear side in the vehicle fore-and-aft direction of the base member 22 is fixed to the base member 22 in an attitude in which it opens rearward in the vehicle fore-and-aft direction.

The striker 70 is disposed at a position lower than the lower end of the rotating member 23 when viewed from the side. That is, as is clearly shown in FIG. 4 the striker 70 is disposed at a position lower than an imaginary horizontal plane IH passing the lower end of the rotating member 23.

A second spring support member is secured to each of opposite end parts in the fore-and-aft direction on opposite sides in the vehicle width direction of the second collar portion 23c of the rotating member 23, and a second coil spring 74 is provided between the second spring support member and the hook member 68 of the engagement means 63, the second coil spring 74 being an urging member that pivotingly urges the hook member 68 in a direction in which it engages with the striker 70.

The striker support member 71 is disposed on the outside in the vehicle width direction of the fixed rail 37 of the movement means 36, and the striker support member 71 is secured to a mounting member 75 secured to the support bracket 42 by welding, etc.

Since the hook member 68 is disposed outside the shaft support member 66, the part of the hook member 68 that is engaged with the striker 70 is set outside the shaft support member 66 in plan view.

The latching means 62 is fixed via the support bracket 42 to the base member 22 at a position in which the base member 22 overlaps at least part (part in this embodiment) of the latching means 62 when viewed from the side, and in plan view as shown in FIG. 3 it is disposed further outside than the movement means 36.

At least part (a lower part in this embodiment) of a specific one among the engagement means 63, in this embodiment the engagement means 63 disposed on the rear side in the vehicle fore-and-aft direction among the engagement means 63, is disposed so as to overlap the reclining lever 17 when viewed from the side as shown in FIG. 2. Moreover, as is clearly shown in FIG. 3, at least part of the specific engagement means 63 is disposed further outside than the reclining lever 17 in plan view. That is, at least part of the specific engagement means 63 is disposed further outside than a third imaginary vertical plane IVC that passes an end part, on the side opposite to the vehicle seat 11, of the reclining lever 17 and extends in the fore-and-aft direction.

The hook member 68 of the engagement means 63 pivots in response to operation of the lock member 46 of the rotation-locking means 45. Four cables 76 are provided between the lock member 46 and the hook member 68, the cables 76 transmitting to the hook member 68 power for pivoting the hook member 68 against the spring force of the second coil spring 74 when the lock member 46 is pivoted from the locked position to the lock release position side.

The cable 76 is formed by movably inserting an inner cable 76b through the interior of an outer cable 76a. One end part of four outer cables 76a is fixed to a common cable retaining member 77 fixed to the second collar portion 23c of the rotating member 23 so as to oppose the lock member 46, and one end part of the inner cable 76b protruding via the one end part of each outer cable 76a is linked to the lock member 46. Individual retaining members 78 of the cables are fixed to parts, corresponding to the four engagement means 63, of the second collar portion 23c of the rotating member 23, and the other end parts of the outer cables 76a are fixed to the individual retaining members 78. The other end part of the inner cable 76b protruding via the other end part of each outer cable 76a is linked to the respective hook member 68.

The operation of this embodiment is now explained. Since the latching means 62, which is provided on the base member 22 side having the rotation support part 30 rotatably supporting the rotating member 23 supporting the vehicle seat 11, and the engagement means 63, which is provided on the rotating member 23 side so as to be capable of switching between a state in which it engages with the latching means 62 when the rotating member 23 is a non-rotating state and suppresses detachment of the rotating member 23 from the base member 22 and a state in which engagement with the latching means 62 is released when the rotating member 23 attains a rotatable state, are disposed further outside than the rotating member 23 in plan view at least when the rotating member 23 is in a non-rotating state, the latching means 62 and the engagement means 63 do not overlap the rotating member 23 in the height direction, and it is possible to form the rotating device compactly in the height direction while enabling detachment of the rotating member 23 to be suppressed by the latching means 62 and the engagement means 63.

Furthermore, since the engagement means 63 is disposed at a position in which at least part of the engagement means 63 overlaps the rotating member 23 when viewed from the side, it is possible to suppress any increase in the height of the rotating device due to disposition of the engagement means 63.

Moreover, since the latching means 62 is fixed to the base member 22 at a position in which at least part of the latching means 62 overlaps the base member 22 supported on the vehicle floor 35 when viewed from the side, it is possible to mount the base member 22 on the latching means 62 in advance when assembling the rotating device onto the vehicle floor 35, thus enhancing the ease of assembly and also suppressing any increase in the height of the rotating device due to disposition of the latching means 62.

Furthermore, since the engagement means 63 includes the shaft support member 66 fixed directly or indirectly to the rotating member 23, the shaft member 67 supported by the shaft support member 66, and the hook member 68 pivotably and axially supported by the shaft member 67, the latching means 62 includes the striker 70, with which the hook member 68 can engage, and the striker support member 71 supporting the striker 70 and directly or indirectly fixed to the base member 22, and the part of the hook member 68 that engages with the striker 70 is set outside the shaft support member 66 in plan view, it is possible to make it easy for the striker 70 to receive a load when a detachment load is acting.

Moreover, since the striker 70 is disposed at a position lower than the lower end of the rotating member 23 when viewed from the side, it is possible to prevent the rotating member 23 from interfering with the striker 70 when the rotating member 23 is rotating while suppressing any increase in the height of the rotating device.

Furthermore, since the shaft support member 66 includes the shaft support wall portion 66a disposed outside the rotating member 23 in plan view while the shaft member 67 is fixed thereto, and the pair of extending wall portions 66b connectedly provided on the shaft support wall portion 66a at a position in which the shaft member 67 is sandwiched therebetween and extending to the rotating member 23 side, and the extending wall portions 66b are fixed directly or indirectly to the rotating member 23, it is possible to enhance the bracing strength of the shaft support member 66 when a load is acting on the rotating member 23.

Moreover, since the movement means 36, which can move the base member 22 in the vehicle fore-and-aft direction, is provided, and the engagement means 63 is disposed at a position in which it avoids the movement means 36 in plan view, it is possible to suppress any increase in the height of the rotating device by preventing the movement means 36 and the engagement means 63 from overlapping each other in the height direction.

Furthermore, since the engagement means 63 is disposed outside the movement means 36 in plan view, the engagement means 63 is disposed on the part of the rotating device that is closer to the outside, and it is possible to receive a load from the vehicle seat 11 via part of the base member 22 that is further outside.

Moreover, since the movement means 36 is disposed between the vehicle floor 35 and the base member 22, and the latching means 62 is disposed further outside than the movement means 36 in plan view, it is possible for a load from the vehicle seat 11 to be received by part of the base member 22 that is further outside while disposing the latching means 62 so as to avoid interference with the movement means 36.

Furthermore, since the second coil spring 74, which pivotingly urges the hook member 68 in a direction in which it engages with the striker 70, is provided between the shaft support member 66 and the hook member 68, it is possible to retain a state of engagement between the hook member 68 and the striker 70.

Moreover, since the latching means 62 and the engagement means 63 are disposed at two locations on opposite sides of the base member 22 and the rotating member 23 in the vehicle width direction while being spaced in the vehicle fore-and-aft direction and disposed further rearward than the front end and further forward than the rear end of the rotating member 23 when viewed from the side in the vehicle width direction, it is possible to compactly dispose the latching means 62 and the engagement means 63 by disposing them further rearward than the front end and further forward than the rear end of the rotating member 23 while enabling the vehicle seat 11 to be retained in two attitudes that are rotated through 180 degrees.

Furthermore, since the pair of engagement means 63 disposed so as to be spaced in the vehicle fore-and-aft direction are formed with a structure that enables the hook members 68 to disengage from the strikers 70, with which they have individually engaged, by pivoting lower end parts of the hook members 68 of the engagement means 63 toward the side on which they are moved away from each other in a state in which the vehicle seat 11 cannot rotate, it is possible to prevent the hook members 68 from interfering with each other when releasing engagement with the striker 70 in the non-rotatable state.

Moreover, since the engagement means 63 is disposed at a position in which at least an upper part of the engagement means 63 overlaps the seat cushion 12 of the vehicle seat 11 when viewed from the side, it is possible to suppress any increase in the height of the vehicle seat 11.

Furthermore, since at least part of the specific engagement means 63, which is at least one among the plurality of engagement means 63, is disposed so that when viewed from the side it overlaps the reclining lever 17, which operates so as to switch between a state in which the seat back 13, which is tiltable with respect to the seat cushion 12, can tilt and a state in which tilting is restricted, it is possible to suppress any increase in the height of the rotating device for the vehicle seat 11, which includes the reclining lever 17.

Moreover, since the seat cushion frame 15 supporting the seat cushion 12 is formed from the pair of side frames 18 positioned so as to be spaced from each other and extending linearly, and the pan frame 19 and rear pipe 20 providing a link between opposite end parts of the side frames 18, and at least part of the engagement means 63 is disposed at a position in which it overlaps the side frame 18 when viewed from the side, it is possible to suppress any increase in the height of the rotating device for the vehicle seat 11.

Furthermore, since the reclining lever 17 is disposed on the outside, in plan view, of one side frame 18 of the pair of side frames 18, and at least part of the specific engagement means 63 is disposed further outside than the reclining lever 17 in plan view, it is possible for a load acting from the vehicle seat 11 to be received by part of the base member 22 that is further outside.

An embodiment of the present invention is explained above, but the present invention is not limited to the embodiment and may be modified in a variety of ways as long as the modifications do not depart from the subject matter thereof.

In the above embodiment, the vehicle seat 11 is explained as a vehicle interior item, but it is not limited to the vehicle seat 11.

<Embodiments of Solution Means for Second Problem>

Embodiments of the present invention are explained by reference to the attached drawings. In the explanation below, 'fore and aft', 'left and right' and 'up and down' refer to directions viewed by an occupant when a vehicle seat is in an attitude in which the occupant seated thereon faces forward.

A first embodiment of the present invention is explained below by reference to FIG. 12 to FIG. 19. First, in FIG. 12 and FIG. 13, a seat 111 of a vehicle seat device 110 mounted in a vehicle includes a seat cushion 112 that forms a seat part for an occupant and a seat back 113 that is disposed above the seat cushion 112, a side cover 114 is disposed on each of opposite sides of the seat cushion 112, and a headrest 115 for receiving a head part of the occupant is disposed on an upper part of the seat back 113.

Referring in addition to FIG. 14, the vehicle seat device 110 includes a pair of slide rails 116 that are arranged in parallel to each other while being spaced in the left-and-right direction in order to make the seat 111 slidable and that extend linearly, and a rotation mechanism 117 that can move along the slide rail 116 while rotatably supporting the seat 111.

A seat frame 118 of the vehicle seat device 110 includes a seat cushion frame 119 that supports the seat cushion 112 and a seat back frame 120 that is linked to the seat cushion frame 119 so as to support the seat back 113 disposed above the seat cushion 112.

The seat cushion frame 119 has a pair of side frames 119a that are disposed so as to extend linearly in the fore-and-aft direction at positions spaced from each other in the left-and-right direction, a pan frame 119b that provides a link between front end parts of the side frames 119a, and a rear pipe 119c that provides a link between rear end parts of the pair of side frames 119a.

A cushion-side pressure-receiving member 121 bridges between the pan frame 119b and the rear pipe 119c. The cushion-side pressure-receiving member 121 has a plurality (four in this embodiment) of seat springs 122 that are formed by curving a metal wire in a zig-zag so as to snake to the left and right, these seat springs 122 being disposed so that adjacent seat springs 122 have lateral symmetry and the adjacent seat springs 122 being linked to each other by means of a plurality of intermediate linking members 123 that are made of a resin and molded by insertion molding so as to be integral with the seat spring 122.

Front end parts of the plurality of seat springs 122 are each engaged with latching parts 124 provided on the pan frame 119b of the seat frame 118. Rear end parts of the mutually adjacent seat springs 122 are engaged with the rear pipe 119c of the seat frame 118 and are linked by means of a rear end part-linking member 125 that is made of a resin and molded by insertion molding so as to be integral with the seat spring 122, the rear end part-linking member 125 being formed so as to cover the rear pipe 119c.

The seat back frame 120 has a pair of seat back side frames 120a that extend in the up-and-down direction at positions spaced from each other in the left-and-right direction, an upper frame 120b that provides a link between upper end parts of the seat back side frames 120a, and a lower frame 120c that provides a link between lower end parts of the pair of seat back side frames 120a.

A back-side pressure-receiving member 126 formed from a resin, etc. so as to be elastically deformable is disposed between the pair of seat back side frames 120a, the back-side pressure-receiving member 126 bridging between the left and right seat back side frames 120a via an upper link wire 127 and a lower link wire 128.

Referring in addition to FIG. 15 and FIG. 16, the seat frame 118 is placed on the rotation mechanism 117, the rotation mechanism 117 including a base member 129 that can move along the slide rail 116, an annular rotating member 130 that supports the seat frame 118 and is rotatably supported on the base member 129, and a cover member 131 that is fixed to the base member 129 while covering part of the rotating member 130 from above.

The base member 129 has an annular first bottom wall portion 129a, a cylindrical first side wall portion 129b that rises upward from an outer peripheral part of the first bottom wall portion 129a, and a first collar portion 129c that protrudes outward from an upper end part of the first side wall portion 129b, the first collar portion 129c being formed into a rectangular shape. The base member 129 is disposed further inside than a middle part in the width direction of the pair of slide rails 116 and beneath the cushion-side pressure-receiving member 121.

The cover member 131 has an annular second bottom wall portion 131a that abuts against the first bottom wall portion 129a of the base member 129 from above, a cylindrical second side wall portion 131b that rises slightly upward from the outer periphery of the second bottom wall portion 131a, a first taper portion 131c that is formed so as to have a larger diameter in going upward and is connectedly provided on an upper end part of the second side wall portion 131b, an annular first flat wall portion 131d that is connected to an upper end part of the first taper portion 131c, and a cylindrical third side wall portion 131e that rises upward from the outer periphery of the first flat wall portion 131d, the second bottom wall portion 131a being joined to the first bottom wall portion 129a of the base member 129 by a plurality of rivets 132.

The rotating member 130 has a second taper portion 130a that is disposed at a position opposing the first taper portion 131c of the cover member 131 from the outside and is formed so as to have a larger diameter in going upward, a cylindrical third side wall portion 130b that rises upward from an upper end part of the second taper portion 130a so as to oppose the second side wall portion 131b of the cover member 131 from the outside, and a second collar portion 130c that protrudes outward from the third side wall portion 130b, the second collar portion 130c being formed into a rectangular shape. The side frame 119a of the seat cushion frame 119 of the seat frame 118 is fastened to the second collar portion 130c via pluralities of first bolts 134 and second nuts 135.

The rotating member 130 is rotatably supported on an annular rotation support part 136 of the base member 129 via a bearing 137, the rotation support part 136 being formed from the first bottom wall portion 129a and the first side wall portion 129b of the base member 129 so that its cross-sectional shape is substantially L-shaped.

The bearing 137 is formed by retaining balls 139 at a plurality of locations in the peripheral direction of an annular retainer 138, and an annular recess part 140 for the balls 139 to roll in is formed in the second taper portion 130a of the rotating member 130.

The slide rail 116 is formed from a fixed rail 141 that is fixed to a vehicle floor face 133, and a movable rail 142 that is slidably fitted to the fixed rail 141. Formed on the floor face 133 is a convex portion 133a that protrudes upward while extending in the vehicle fore-and-aft direction. Fixing the fixed rail 141 onto the convex portion 133a enables a lower part of the rotation mechanism 117 to be disposed at a position lower than the lower end of the slide rail 116 in the up-and-down direction.

A support bracket 143 is connectedly provided on the movable rail 142, the support bracket 143 extending toward the inside of the pair of slide rails 116 and being formed integrally with or separately from the movable rail 142 (in this embodiment separately), and the base member 129 is fastened to the support bracket 143 via a second bolt 145 and a second nut 146 screwed onto the second bolt 145. That is, the base member 129 is fixedly linked to the movable rail 142 via the support bracket 143.

The support bracket 143 is formed so as to integrally have a flat plate-shaped mounting plate portion 143a that is disposed on the movable rail 142 so that a lower face thereof is fixed to the movable rail 142 by welding, etc., a side-plate portion 143b that is connected to the mounting plate portion 143a at right angles while extending in the up-and-down direction at a position adjacent to the inner side of the slide rail 116, and a flat plate-shaped linking plate portion 143c that extends from the lower end of the side-plate portion 143b toward the side opposite to the slide rail 116 and abuts against the first collar portion 129c of the base member 129 from below. The linking plate portion 143c is fastened to the first collar portion 129c of the base member 129.

A first hook member 147 is fixed to the side-plate portion 143b of the support bracket 143 by welding, etc., and a second hook member 148 that forms, in cooperation with the first hook member 147, a deformation-suppressing mechanism 149 that suppresses upward lifting of the rotating member 130 with respect to the movable rail 142 is fixed to the third side wall portion 130b of the rotating member 130 by welding, etc. and engaged with the first hook member 147 while allowing the rotating member 130 to rotate.

The first hook member 147 is fixed to the support bracket 143 via a total of four positions corresponding to front end parts and rear end parts of the pair of left and right movable rails 142, and the second hook member 148 is fixed to the third side wall portion 130b of the rotating member 130 via four positions corresponding to the first hook member 147.

Referring in addition to FIG. 17 and FIG. 18, it is possible to switch between a locked state of the rotating member 130 in which it is locked with respect to the base member 129 and the cover member 131 and release of the locked state by means of operation of a lock member 152 supported on the rotating member 130, and a rattle-suppressing member 153 that operates in association with operation of the lock member 152 is disposed between the cover member 131 and the rotating member 130.

A tapered push-out member 154 whose diameter increases in going upward is disposed between the first taper portion 131c of the cover member 131 and the second taper portion 130a of the rotating member 130. A housing hole 155 extending lengthwise in the peripheral direction of the push-out member 154 is provided in a plurality of locations, spaced in the peripheral direction, of the push-out member 154, and the rattle-suppressing member 153 disposed between the first taper portion 131c of the cover member 131 and the second taper portion 130a of the rotating member 130 is housed in the housing hole 155.

On the other hand, the lock member 152 is pivotably supported on the rotating member 130 via a shaft 151 having a vertical axis, and can pivot between a locked position in which as shown in FIG. 17A it engages with the first taper portion 131c of the cover member 131 and prevents rotation of the rotating member 130 and a lock release position in which as shown in FIG. 17B the engagement with the first taper portion 131c is released and rotation of the rotating member 130 is allowed, the lock member 152 being pivotingly urged toward the locked position side by means of a spring 156.

A link arm portion 152a of the lock member 152 is inserted through a through hole 157 formed in the second taper portion 130a of the rotating member 130, an extremity part of the link arm portion 152a can be inserted into a link hole 158 formed in the push-out member 154, and inserting the extremity part of the link arm portion 152a through the link hole 158 links the lock member 152 to the push-out member 154. The link arm portion 152a is linked to the link hole 158 when the lock member 152 attains the lock release position as shown in FIG. 17B, and the link arm portion 152a applies a pushing force to the push-out member 154 in the pivoting direction.

An engagement arm portion 152b of the lock member 152 engages with a first through hole 159 formed in the second taper portion 130a of the rotating member 130 and a second through hole 160 formed in the first taper portion 131c of the cover member 131 when the lock member 152 is at the locked position shown in FIG. 17A, but disengages from the second through hole 160 to thus release engagement with the cover member 131 when it is at the lock release position shown in FIG. 17B. The engagement arm portion 152b operates between the locked position and the lock release position so as to straddle the push-out member 154.

Formed in the second taper portion 130a of the rotating member 130 is a recess part 161 that houses part of the rattle-suppressing member 153 and enables the rattle-suppressing member 153 to be closely fitted thereinto.

The rattle-suppressing member 153 is formed into a wedge shape so as to have an inclined face 153a whose height gradually decreases in going forward in a direction of movement 162 in which the push-out member 47 moves in response to the lock member 152 operating from the lock release position toward the locked position side, and the recess part 161, which enables the rattle-suppressing member 153 to be closely fitted therein, is formed into a triangular shape so as to house part of the rattle-suppressing member 153 while having a recess part-side inclined face 161a opposing the inclined face 153a.

A coil spring 163 is provided in a compressed state between the rattle-suppressing member 153 and, among longitudinally opposite end parts of the housing hole 151 formed in the push-out member 154, a front end part along the direction of movement 162. The rattle-suppressing member 153 is urged in a direction opposite to the direction of movement 162 by a spring force exerted by the coil spring 163.

When the lock member 152 is at the locked position, as shown in FIG. 17A the inclined face 153a of the rattle-suppressing member 153 abuts closely against the recess part-side inclined face 161a of the recess part 161 to thus put the rattle-suppressing member 153 in close contact with the rotating member 130 and the cover member 131, thereby preventing the rotating member 130 from rattling.

When the lock member 152 attains the lock release position, as shown in FIG. 17B, among the longitudinally opposite end parts of the housing hole 151, a rear end part along the direction of movement 162 abuts against the rattle-suppressing member 153, the rattle-suppressing member 153 is pushed in the direction of movement against the urging force of the coil spring 163, and the rattle-suppressing member 153 moves toward the side on which the inclined face 153a of the rattle-suppressing member 153 moves away from the recess part-side inclined face 161a, thus releasing the state in which rattling is prevented.

Referring in addition to FIG. 19, at least part, along the peripheral direction, of the outer periphery of an upper part of the rotating member 130 of the rotation mechanism 117 is covered by a cover 165 from the outside, and in this embodiment in a state in which an occupant seated on the seat cushion 112 faces forward in the vehicle fore-and-aft direction the cover 165 is disposed at a position in which it covers an upper part of the third side wall portion 130b of the rotating member 130 and the second collar portion 130c from the rear.

Moreover, in a state in which an occupant seated on the seat cushion 112 faces forward in the vehicle fore-and-aft direction, a skin 112a of the seat cushion 112 is linked to the rear edge of an upper end part of the rotating member 130, that is, the rear edge of the second collar portion 130c, and an upper part of the cover 165 is connected so as to be in contact with a part of the skin 112a that is linked to the second collar portion 130c.

The cover 165 is mounted on the pair of side frames 119a forming part of the seat cushion frame 119 via a mounting arm 166 (see FIG. 16).

The cover 165 integrally has a flat plate-shaped upper plate 165a, a lower plate 165b that opposes the upper plate 165a from below, a linking plate 165c that provides a link between end parts, on the side opposite to the rotating member 130, of the upper plate 165a and the lower plate 165b, and an end wall 165d that provides a link between opposite ends in the width direction of the upper plate 165a, the lower plate 165b, and the linking plate 165c. An outside face of the cover 165, that is, an outside face of the linking plate 165c, is formed into an arc shape that protrudes outward of the rotating member 130.

A fixed cover member 167 that covers at least the base member 129 from the rear in a state in which an occupant seated on the seat cushion 112 faces forward in the vehicle fore-and-aft direction is fixedly disposed beneath the cover 165, the fixed cover member 167 being mounted on for example a rear end part in the vehicle fore-and-aft direction of the fixed rail 141 of the slide rail 116.

In the same manner as for the cover 165, the fixed cover member 167 integrally has a flat plate-shaped upper plate 167a, a lower plate 167b that opposes the upper plate 167a from below, a linking plate 167c that provides a link between end parts, on the side opposite to the rotating member 130, of the upper plate 167a and the lower plate 167b, and an end wall 167d that provides a link between end parts, in the width direction, of the upper plate 167a, the lower plate 167b, and the linking plate 167c. An outside face of the linking plate 167c is formed into an arc shape that protrudes outward of the rotating member 130.

The fixed cover member 167 is in relatively slidable contact with a lower part of the cover 165, the upper plate 167a of an upper end part of the fixed cover member 167 being in relatively slidable contact with a lower face of the lower plate 165b of the cover 165.

The side frame 119a is covered by the side cover 114 from the outside, and as shown in FIG. 15 the lower end position of the side cover 114 is set so as to be present slightly above an upper face of the mounting plate portion 143a of the support bracket 143 in the up-and-down direction, and as shown in FIG. 13 the position in the up-and-down direction is the same as the lower end position of the cover 165.

The operation of the first embodiment is now explained. Since at least part, along the peripheral direction, of the outer periphery of an upper part of the rotating member 130 forming part of the rotation mechanism 117 of the vehicle seat device 110 is covered by the cover 165 from the outside, it is possible to suppress the entry of foreign matter into the rotation mechanism 117 via at least a part that is covered by the cover 165.

Furthermore, since the cover 165 is disposed at a position in which it covers the outer periphery of an upper part of the rotating member 130 from the rear in a state in which an occupant seated on the seat cushion 112 faces forward in the vehicle fore-and-aft direction, it is possible to suppress the entry of foreign matter into the rotation mechanism 117 from the rear passenger seat side in a state in which a driver's seat or a passenger seat faces forward.

Moreover, since the skin 112a of the seat cushion 112 is linked to the rear edge of an upper end part of the rotating member 130 while being in contact with the outer face of the cover 165 in a state in which an occupant seated on the seat cushion 112 faces forward in the vehicle fore-and-aft direction, it is possible to connect an upper part of the cover 165 to the skin 112a of the seat cushion 112 so as to be in contact therewith, and it is possible to suppress more effectively the entry of foreign matter into the rotation mechanism 117 from the rear passenger seat side in a state in which a driver's seat or a passenger seat faces forward.

Furthermore, since the seat cushion frame 119 has the pair of side frames 114, which extend linearly and are supported on the rotating member 130, and the cover 165 is mounted on the side frames 114, it is possible to rotate the cover 165 together with the seat 111 by a simple structure.

Moreover, since the outside face of the cover 165 is formed into an arc shape that protrudes outward of the rotating member 130, when the cover 165 rotates together with the seat 111, even if the cover 165 comes into contact with luggage, etc. on the floor within the vehicle compartment, it is possible to realize smooth rotation of the cover 165 and consequently the seat 111.

Furthermore, since the fixed cover member 167 is fixedly disposed beneath the cover 165, which covers at least the base member 129 from the rear in a state in which an occupant seated on the seat cushion 112 faces forward in the vehicle fore-and-aft direction, it is possible to suppress the entry of foreign matter into the rotation mechanism 117 from the rear passenger seat side in a state in which a driver's seat or a passenger seat faces forward.

Moreover, since the fixed cover member 167 is in relatively slidable contact with the lower part of the cover 165, it is possible to suppress more effectively the entry of foreign matter into the rotation mechanism 117 from the rear passenger seat side in a state in which a driver's seat or a passenger seat faces forward. Furthermore, since the outside face of the fixed cover member 167 is formed into an arc shape that protrudes outward of the rotating member 130 in the same manner as for the cover 165, which is present above the fixed cover member 167, it is possible to suppress as much as possible the occurrence of a gap between the fixed cover member 167 and the seat 111, including the cover 165, while the seat 111 is partway through rotation, and it is possible to suppress effectively the entry of foreign matter into the rotation mechanism 117.

Moreover, since the position of the lower end of the side cover 114 covering the seat cushion 112 from the outside is set to be the same as the position of the lower end of the cover 165, it is possible to suppress the entry of foreign matter into the rotation mechanism 117 from the rear passenger seat side in a state in which a driver's seat or a passenger seat is facing in the vehicle width direction.

FIG. 20 shows a second embodiment of the present invention; parts corresponding to those of the first embodiment are denoted by the same reference numerals and symbols and are only illustrated, detailed description thereof being omitted.

The rotation mechanism 117 is disposed beneath a seat cushion 172 forming a seat 171 together with the seat back 113, and a cover-mounting plate 174 that protrudes rearward in the vehicle fore-and-aft direction in a state in which an occupant seated on the seat cushion 172 faces forward in the vehicle fore-and-aft direction is fixed to the second taper portion 130a of the rotating member 130 forming part of the rotation mechanism 117.

On the other hand, part of a skin 172a of the seat cushion 172 is extended downward so as to form a cover 175 covering the outer periphery of the upper part of the rotating member 130 from the rear in a state in which an occupant seated on the seat cushion 172 faces forward in the vehicle fore-and-aft direction, the lower edge of the cover 175 is fixedly linked to the cover-mounting plate 174, and in this embodiment a hook 176 secured to the lower edge of the cover 175 by sewing is engaged with the edge of the cover-mounting plate 174. The cover 175 is thereby fixedly linked to the cover-mounting plate 174 while covering the outer periphery of the upper part of the rotating member 130 from the rear in a state in which an occupant seated on the seat cushion 172 faces forward in the vehicle fore-and-aft direction, but the lower edge of the cover 175 may be secured directly to the cover-mounting plate 174 by adhesion, etc.

A fixed cover member 177 that covers at least the base member 129 from the rear in a state in which an occupant seated on the seat cushion 172 faces forward in the vehicle fore-and-aft direction is fixedly disposed beneath the cover 175.

The fixed cover member 177 is mounted on for example a rear end part in the vehicle fore-and-aft direction of the fixed rail 141 of the slide rail 116, and is formed so as to integrally have a flat plate-shaped vertical wall portion 177a that extends in the up-and-down direction along a plane orthogonal to the longitudinal direction of the slide rail 116, and a flat plate-shaped protruding plate portion 177b that protrudes from the upper end of the vertical wall portion 177a rearward in the vehicle fore-and-aft direction.

The rear edge, in the vehicle fore-and-aft direction, of the protruding plate portion 177b is in contact with the hook 176, and is formed into an arc shape having the rotational axis of the rotating member 130 as the center in order to ensure smooth rotation of the hook 176, which rotates together with the rotating member 130.

In accordance with the second embodiment, since the cover 175 is formed from the skin 172a of the seat cushion 172, it is possible to avoid any increase in the number of components when suppressing the entry of foreign matter into the rotation mechanism 117.

FIG. 21 shows a third embodiment of the present invention; parts corresponding to those of the first and second embodiments are denoted by the same reference numerals and symbols and are only illustrated, detailed description thereof being omitted.

At least part along the peripheral direction of the outer periphery of the upper part of the rotating member 130 (see first and second embodiments) of the rotation mechanism 117 is covered by a cover 178 from the outside, and in this embodiment it is covered by the cover 178 from the rear in a state in which an occupant seated on the seat cushion 112 faces forward in the vehicle fore-and-aft direction.

The cover 178 is basically formed in the same manner as for the cover 165 of the first embodiment, and is formed integrally with at least one of the pair of side covers 114 covering from the outside the pair of side frames 112 (see first embodiment) forming part of the seat cushion frame 112. The position of the lower end of the side cover 114 is set to be the same as the position of the lower end of the cover 177, and the fixed cover member 167 is fixedly disposed beneath the cover 178.

Embodiments of the present invention are explained above, but the present invention is not limited to the embodiments and may be modified in a variety of ways as long as the modifications do not depart from the subject matter thereof.

For example, in the embodiments above, the arrangement is such that that the cover 165, 178 rotates together with the seat 111, 171, but the cover 165, 178 may be present at a fixed position.

<Embodiment of Solution Means for Third Problem>

An embodiment of the present invention is explained below by reference to the attached drawings. In the explanation below, 'fore and aft', 'left and right' and 'up and down' refer to directions viewed by a person seated on a seat in a normal attitude facing forward.

First, in FIG. 22, a vehicle seat device includes a pair of slide rails 213 that extend linearly while being arranged in parallel to each other and spaced in the left-and-right direction in order for a seat main body 211 to be slidable, and a rotation mechanism 214 that rotatably supports the seat main body 211 and can move along the slide rails 213.

The seat main body 211 includes a seat cushion 211a that is supported on a seat cushion frame 216, a seat back 211b that is supported on a seat back frame 217 linked to the seat cushion frame 216 and disposed above the seat cushion 211a, and a headrest 211c supported by a guide tube 218 provided on the seat back frame 216 so that the height can be adjusted.

The seat cushion frame 216 has a pair of side frames 216a that are disposed so as to extend linearly in the fore-and-aft direction at positions spaced from each other in the left-and-right direction, a pan frame 216b that provides a link between front end parts of the side frames 216a, and a rear pipe 216c that provides a link between rear end parts of the pair of side frames 216a.

Referring in addition to FIG. 23 and FIG. 24, mounted on the seat cushion frame 216 is a cushion-side pressure-receiving member 219 that receives a load from above the seat cushion 211a. The cushion-side pressure-receiving member 219 has a plurality (four in this embodiment) of seat springs 220 that are formed by curving a metal wire in a zig-zag so as to snake to the left and right, these seat springs 220 being disposed so that adjacent seat springs 220 have lateral symmetry and the adjacent seat springs 220 being linked to each other by means of a plurality of intermediate linking members 221 that are made of a resin and molded by insertion molding so as to be integral with the seat spring 220.

Front end parts of the plurality of seat springs 220 are each engaged with latching parts 222 provided on the pan frame 216b of the seat cushion frame 216. Rear end parts of the mutually adjacent seat springs 220 are engaged with the rear pipe 216c of the seat cushion frame 216 and are linked by means of a rear end part-linking member 223 that is made of a resin and molded by insertion molding so as to be integral with the seat spring 220, the rear end part-linking member 223 being formed so as to cover the rear pipe 216c.

That is, the cushion-side pressure-receiving member 219 bridges between the pan frame 216b and the rear pipe 216c of the seat cushion frame 216 and is disposed between the pair of side frames 216a in plan view. Moreover, as shown in FIG. 24 a majority of the cushion-side pressure-receiving member 219 is inclined downward to the rear and bridges between the pan frame 216b and the rear pipe 216c so that a lowest end 219a of the cushion-side pressure-receiving member 219 is present in the vicinity of the rear pipe 216c in a rear end part of the seat cushion frame 216.

Referring again to FIG. 22, the seat back frame 217 has a pair of seat back side frames 217a that extend in the up-and-down direction at positions spaced from each other in the left-and-right direction, an upper frame 217b that provides a link between upper end parts of the seat back side frames 217a, and a lower frame 217c that provides a link between lower end parts of the pair of seat back side frames 217a.

A back-side pressure-receiving member 224 formed from a resin, etc. so as to be elastically deformable is disposed between the pair of seat back side frames 217a, and the back-side pressure-receiving member 224 bridges between the left and right seat back side frames 217a via an upper link wire 225 and a lower link wire 226.

Referring in addition to FIG. 25 to FIG. 27, the seat cushion frame 216 is placed on the rotation mechanism 214, the rotation mechanism 214 including a base member 229 that can move along the slide rails 213, a rotating member 230 that supports the seat cushion frame 216 and is rotatably supported on the base member 229, and a cover member 231 that is fixed to the base member 229 while covering part of the rotating member 230 from above.

The base member 229 has an annular first bottom wall portion 229a, a cylindrical first side wall portion 229b that rises upward from an outer peripheral part of the first bottom wall portion 229a, and a first collar portion 229c that protrudes outward from an upper end part of the first side wall portion 229b, the first collar portion 229c being formed into a rectangular shape.

The cover member 231 has an annular second bottom wall portion 231a that abuts against the first bottom wall portion 229a of the base member 229 from above, a cylindrical second side wall portion 231b that rises slightly upward from the outer periphery of the second bottom wall portion 231a, a first taper portion 231c that is formed so as to have a larger diameter in going upward and is connectedly provided on an upper end part of the second side wall portion 231b, an annular first flat wall portion 231d that protrudes sideways from an upper end part of the first taper portion 231c, and a cylindrical third side wall portion 231e that rises upward from the outer periphery of the first flat wall portion 231d, the second bottom wall portion 231a being joined to the first bottom wall portion 229a of the base member 229 by a plurality of rivets 232.

The rotating member 230 has a second taper portion 230a that is disposed at a position opposing the first taper portion 231c of the cover member 231 from the outside and is formed so as to have a larger diameter in going upward, a cylindrical fourth side wall portion 230b that rises upward from an upper end part of the second taper portion 230a so as to oppose the third side wall portion 231e of the cover member 231 from the outside, and a second collar portion 230c that protrudes outward from the fourth side wall portion 230b, the second collar portion 230c being formed into a rectangular shape. A linking member 233 extending in parallel with the slide rail 213 is fastened to the second collar portion 230c by means of pluralities of first bolts 234 and second nuts 235. The side frame 216a of the seat cushion frame 216 is linked to the linking member 233, and the side frames 216a extend linearly while being arranged at positions spaced from each other and are fixedly disposed on the second collar portion 230c of the rotating member 230 via the linking member 233.

The rotating member 230 is rotatably supported on an annular rotation support part 236 of the base member 229 via a bearing 237, the rotation support part 236 being formed from the first bottom wall portion 229a and the first side wall portion 229b of the base member 229 so that its cross-sectional shape is substantially L-shaped.

The bearing 237 is formed by retaining balls 239 at a plurality of locations in the peripheral direction of an annular retainer 238, and an annular recess part 240 for the balls 239 to roll in is formed in the second taper portion 230a of the rotating member 230.

A housing part 241 opening at least upward is formed in a central part of the rotating member 230. In this embodiment, the housing part 241 is arranged so as to open both upward and downward via the second taper portion 230a and the fourth side wall portion 230b of the rotating member 230, and the cover member 231 is housed and disposed within the housing part 241.

The slide rail 213 is formed from a fixed rail 245 that extends in the vehicle fore-and-aft direction and a movable rail 246 that is slidably fitted to the fixed rail 245, the first collar portion 229c of the base member 229 being fastened to the movable rail 246 by means of pluralities of second bolts 247 and second nuts 248.

The rotating member 230 is rotatingly driven by a rotating device 249 that is provided between the rotating member 230 and the base member 229, the rotating device 249 including an actuator 250, an output gear 251 that is rotated by rotational power exerted by the actuator 250, and an input gear 252 that meshes with the output gear 251.

The actuator 250 and the output gear 251 are mounted on one of the rotating member 230 and the base member 229, and the input gear 252 is fixed to the other of the rotating member 230 and the base member 229.

Moreover, the actuator 250 is mounted on that one of the base member 229 and the rotating member 230 that is longer in the up-and-down direction, and in this embodiment the actuator 250 is mounted on the rotating member 230 side and the input gear 252 is fixed to the base member 229.

The actuator 250 includes an electric motor 253 that has a rotational axis extending in the vehicle width direction, a gear box 255 that is linked to a case 254 of the electric motor 253, and an output shaft 256 that protrudes from the gear box 255 with its rotational axis parallel to a rotational axis 2C of the rotating member 230, the output gear 251 being provided on the output shaft 256. A gear reduction mechanism (not illustrated) that transmits the rotational power of the electric motor 253 to the output shaft 256 by changing the rotational direction through 90 degrees and decreasing the speed is housed within the gear box 255, this gear reduction mechanism including a worm gear so as to prevent the rotational power from the output shaft 256 side from being transmitted toward the electric motor 253 side.

The rotating member 230 is rotatingly driven through a range of 180 degrees, the input gear 252 is formed into an arc shape of substantially 180 degrees while having a gear portion 252a on the inner peripheral part, and the gear portion 252a is fixed to a lower face of the inner peripheral part of the first bottom wall portion 229a of the base member 229 so as to protrude radially inward from the inner periphery of the first bottom wall portion 229a. The gear portion 252a is thereby disposed so as to face toward the rotational axis 2C of the rotating member 230.

When fixing the input gear 252 to the base member 229, some of the plurality of rivets 232 that are used to join the second bottom wall portion 231a of the cover member 231 to the first bottom wall portion 229a of the base member 229 are used for joining the second bottom wall portion 231a and the input gear 252 together to the first bottom wall portion 229a with the first bottom wall portion 229a sandwiched therebetween. In this arrangement, when an end part in the peripheral direction of the input gear 252 is disposed at a position corresponding to the rivet 232 for joining both the second bottom wall portion 231a and the input gear 252 together to the first bottom wall portion 229a, in order to avoid the input gear 252 having a wasteful length in the peripheral direction, as shown in FIG. 26 a cutout 257 may be formed in the end part in the peripheral direction of the input gear 252.

Mounted on the rotating member 230 is a mounting member 258 that is disposed further inside than an outer periphery 230d of the rotating member 230 in plan view, and mounted on the mounting member 258 is the actuator 250, which includes the electric motor 253. That is, the gear box 255 of the actuator 250 is mounted on an upper face of the mounting member 258, and the output gear 251 is provided on the output shaft 256, which extends through the mounting member 258.

The mounting member 258 is disposed further forward than the rotational axis 2C of the rotating member 230. The mounting member 258 extends so as to be orthogonal to the longitudinal direction of the slide rail 213 while having on opposite end parts joining plate portions 258a that are joined to an upper face of the third collar portion 230c of the rotating member 230, and are formed so as to integrally have the pair of joining plate portions 258a, a pair of left and right inclined plate portions 258b that are provided so as to be connected to the joining plate portions 258a via an upper end part while being inclined downward in going radially inward of the rotating member 230, and a flat supporting plate portion 258c that provides a connection between lower ends of the inclined plate portions 258b.

Since the inclined plate portion 258b is disposed within the housing part 241 in the central part of the rotating member 230 while opposing the first taper portion 231c of the cover member 231 from the inside, and the second taper portion 230a of the rotating member 230 opposes the first taper portion 231c from the outside, the inclined plate portion 258b is disposed within the housing part 241 while being inclined along the second taper portion 230a of the rotating member 230.

The actuator 250 is mounted on an upper face of the supporting plate portion 258c of the mounting member 258, and in a state in which it is mounted on the mounting member 258 the actuator 250 is disposed beneath the cushion-side pressure-receiving member 219 while avoiding interference with the cushion-side pressure-receiving member 219.

Disposed between the first taper portion 231c of the cover member 231 and the second taper portion 230a of the rotating member 230 is an annular slider 260 that is in sliding contact with each of the taper portions 231c, 230a. The slider 260 is employed in order to share the cover member 231 and the rotating member 230 with a vehicle seat device in which the rotating member 230 is rotated by applying manual power to the rotation mechanism 214 instead of electric power by means of the actuator 250. In a vehicle seat device in which rotation by manual power is made possible, instead of the slider 260, an annular member forming part of a mechanism that suppresses rattling of the rotating member 230 in a locked state in which rotation of the rotating member 230 is prevented is disposed between the first taper portion 231c and the second taper portion 230a.

A blower 265 is disposed further rearward than the front edge of the pan frame 216b forming a front part of the seat cushion frame 216, and a duct 266 having one end portion 266a connected to the blower 265 has an opening 267 formed in the other end portion 266b, which functions as a blower outlet.

As shown in FIG. 24 the blower 265 is mounted on a lower part of the pan frame 216b via a support member 268, and the opening 267 is disposed on the radially inner side of the annular rotating member 230 and on the radially inner side of the cover member 231 in plan view. The opening 267 opens toward the seat cushion 211a side, and is disposed in plan view as is clearly shown in FIG. 23 between a pair of seat springs 220 that are adjacent to each other among a plurality of seat springs 220 forming the cushion-side pressure-receiving member 219.

The other end portion 266b of the duct 266 protrudes slightly so as to be higher than the cushion-side pressure-receiving member 219, and an open edge 267a at the upper end of the opening 267 is disposed at a position higher than the annular rotating member 230 when viewed from the side.

The one end portion 266a of the duct 266 is connected to the blower 265 so as to overlap the annular rotating member 230 in plan view at a position higher than the upper end of the annular rotating member 230, and an intermediate part of the duct 266 is disposed so as to overlap the annular rotating member 230 when viewed from the side and is housed in the housing part 241.

The operation of the electric motor 253, which is a first item of electrical equipment, is controlled by a first ECU 270, and the operation of the blower 265, which is a second item of electrical equipment, is controlled by a second ECU 271, both the first and second ECUs 270, 271 being present within the housing part 241 in the central part of the rotating member 230 in plan view, and at least parts of the ECUs 270, 271 (the entirety in this embodiment) being disposed at positions in which they overlap the rotating member 230 when viewed from the side.

The first ECU 270 and the second ECU 271 are disposed in an attitude in which they are inclined along the second taper portion 230a of the rotating member 230, the first ECU 270 and the second ECU 271 being mounted on the mounting member 258, which is mounted on the rotating member 230 in order to mount the actuator 250, which includes the electric motor 253. That is, the mounting member 258 has the pair of inclined plate portions 258b, which are disposed within the housing part 241 in the central part of the rotating member 230 while being inclined along the second taper portion 230a, and the first ECU 270 and the second ECU 271 are respectively mounted on the pair of inclined plate portions 258b disposed within the housing part 241 while being inclined along the second taper portion 230a.

The first ECU 270 and the second ECU 271 are disposed beneath the cushion-side pressure-receiving member 219 while avoiding interference with the cushion-side pressure-receiving member 219 as in the case with the actuator 250, and are mounted on the inclined plate portion 258b. As shown in FIG. 24, the actuator 250 and the mounting member 258, on which the first ECU 270 and the second ECU 271 are mounted, are present beneath the cushion-side pressure-receiving member 219 further forward than the lowest end 219a of the cushion-side pressure-receiving member 219 when viewed from the side, and the first ECU 270 and the second ECU 271 are therefore disposed at positions that avoid being immediately below the lowest end 219a of the cushion-side pressure-receiving member 219 when viewed from the side.

The operation of the embodiment is now explained. Since the circular housing part 241, which opens at least upward, is formed in the central part of the rotating member 230 forming part of the rotation mechanism 214, and the first ECU 270, which controls the operation of the electric motor 253, and the second ECU 271, which controls the operation of the blower 265, are present within the housing part 241 in plan view and are disposed at positions so that at least parts of the ECUs 270, 271 overlap the rotating member 230 when viewed from the side, it is possible, by suppressing upward protrusion of the first ECU 270 and the second ECU 271 from the rotating member 230, to avoid any increase in the height of the seat cushion 211a due to disposition of the first and second ECUs 270, 271 and also to avoid any increase in the size of the vehicle seat device in a direction orthogonal to the rotational axis 2C of the rotating member 230. Moreover, in this embodiment, since the entireties of the first and second ECUs 270, 271 are disposed at positions in which they overlap the rotating member 230 when viewed from the side, it is possible to dispose the first ECU 270 and the second ECU 271 by suppressing upward protrusion of the first ECU 270 and the second ECU 271 from the rotating member 230, thus suppressing more effectively any increase in the height of the seat cushion 211a.

Furthermore, since the rotating member 230 is formed so as to have the second taper portion 230a, which is formed so that the diameter increases in going upward, the cylindrical fourth side wall portion 230b, which rises upward from the upper end part of the second taper portion 230a so as to form the housing part 241 in cooperation with the second taper portion 230a, and the second collar portion 230c, which protrudes outward from the fourth side wall portion 230b, and the first and second ECUs 270, 271 are disposed in an attitude in which they are inclined along the second taper portion 230a, it is possible to suppress more effectively upward protrusion of the first and second ECUs 270, 271 from the rotating member 230 and to suppress more effectively the height of the seat cushion 211a.

Moreover, the electric motor 253 and the first and second ECUs 270, 271 are mounted on the rotating member 230 side, which is the one that has the greater length in the up-and-down direction among the base member 229 and the rotating member 230, and it is thus possible to easily ensure there is space for disposition of the electric motor 253 and the first and second ECUs 270, 271 while suppressing any increase in the height of the vehicle seat device.

Furthermore, since the mounting member 258, which is disposed further inside than the outer periphery 230d of the rotating member 230 in plan view, is mounted on the rotating member 230, and the first and second ECUs 270, 271 are mounted on the mounting member 258, it is possible to avoid any increase in the size of the vehicle seat device in a direction orthogonal to the rotational axis 2C of the rotating member 230 due to disposition of the mounting member 258, on which the first and second ECUs 270, 271 are mounted.

Moreover, since not only the first ECU 270 and the second ECU 271 but also the electric motor 253, which exerts power for rotating the rotating member 230, are mounted on the mounting member 258, it is also possible to avoid any increase in the size of the vehicle seat device in a direction orthogonal to the rotational axis 2C of the rotating member 230 due to disposition of the mounting member 258, on which the electric motor 253 is mounted, thereby making it easy to connect the electric motor 253 and the first ECU 270, which controls the operation of the electric motor 253.

Furthermore, due to the mounting member 258 being mounted on the rotating member 230, both the electric motor 253 and the first and second ECUs 270, 271 rotate with respect to the base member 229 when the rotating member 230 is rotating, and it is possible to compactly collect together the wiring for connecting the electric motor 253 and the first ECU 270, which controls the operation of the electric motor 253.

Moreover, since the mounting member 258 has the inclined plate portion 258b, which is inclined along the second taper portion 230a of the rotating member 230 and is disposed within the housing part 241, and the first and second ECUs 270, 271 are mounted on the inclined plate portion 258b, it is possible to easily mount the first and second ECUs 270, 271 on the mounting member 258 in an inclined attitude in which they are inclined along the second taper portion 230a of the rotating member 230, thus suppressing upward protrusion of the first and second ECUs 270, 271 from the rotating member 230.

Furthermore, since the mounting member 258 is joined to the second collar portion 230c of the rotating member 230 further forward than the rotational axis 2C of the rotating member 230, and the first and second ECUs 270, 271 are mounted on the inclined plate portion 258b at positions in which they avoid interference with the cushion-side pressure-receiving member 219, which is mounted on the seat cushion frame 216 so as to receive a load from above the seat cushion 211a, it is possible to avoid any increase in the size of the vehicle seat device in the up-and-down direction.

Moreover, since the electric motor 250 and the first and second ECUs 270, 271 are disposed while avoiding being immediately beneath the lowest end 219a of the cushion-side pressure-receiving member 219 when viewed from the side, it is possible to more easily avoid interference of the electric motor 253 and the first and second ECUs 270, 271 with the cushion-side pressure-receiving member 219. Furthermore, the electric motor 250 and the first and second ECUs 270, 271 are disposed beneath the cushion-side pressure-receiving member 219 further forward than the lowest end 219a of the cushion-side pressure-receiving member 219, and it is possible to dispose the electric motor 250 and the first and second ECUs 270, 271 by utilizing effectively a space beneath the cushion-side pressure-receiving member 219.

An embodiment of the present invention is explained above, but the present invention is not limited to the embodiment and may be modified in a variety of ways as long as the modifications do not depart from the subject matter thereof.

For example, in the above embodiment, the first ECU 270, which controls the operation of the electric motor 253, and the second ECU 271, which controls the operation of the blower 265, are explained, but the present invention may be widely applied to an ECU for controlling the operation of electrical equipment possessed by the vehicle seat device.

Furthermore, in the above embodiment, the first and second ECUs 270, 271 are mounted on the mounting member 258 mounted on the rotating member 230, but an ECU may be mounted directly on the rotating member 230.

<Embodiments of Solution Means for Fourth Problem>

Embodiments of the present invention are explained below by reference to the attached drawings. In the explanation below, 'fore and aft', 'left and right' and 'up and down' refer to directions viewed by a person seated on a seat in a normal attitude facing forward.

A first embodiment of the present invention is explained by reference to FIG. 28 to FIG. 33. First, in FIG. 28, a seat main body 311 of a vehicle seat mounted on a vehicle includes a seat cushion 311a and a seat back 311b disposed above the seat cushion 311a, and a headrest 311c that receives a head part of an occupant is disposed on an upper part of the seat back 311b.

A seat frame 315 supporting the seat main body 311 includes a seat cushion frame 316 supporting the seat cushion 311a and a seat back frame 317 that supports the seat back 311b and is linked to a rear part of the seat cushion frame 316 via a support shaft 312, the seat frame 315 being supported by a pair of left and right slide rails 313 provided on a vehicle floor face so as to extend in the vehicle fore-and-aft direction via a seat-rotating device 314 that can slide in the vehicle fore-and-aft direction.

The seat cushion frame 316 includes a pair of left and right side frames 316a that extend along the longitudinal direction of the slide rail 313 when the seat-rotating device 314 is in a state in which an occupant faces forward in the vehicle fore-and-aft direction, a pan frame 316b that provides a link between front end parts of the side frames 316a, and a link pipe 316c that provides a link between rear parts of the pair of side frames 316a.

The seat back frame 317 includes a pair of left and right seat back side frames 317a that extend in the up-and-down direction and have their lower end parts tiltably linked to a rear end part of the side frame 316a via the support shaft 312, an upper frame 317b that provides a link between upper end parts of the seat back side frames 317a, and a lower frame 317c that provides a link between lower end parts of the pair of seat back side frames 317a, a pair of left and right pipe members 318 guiding up-and-down movement of the headrest 311c being fixed to the upper frame 317b.

Referring in addition to FIG. 29 and FIG. 30, a cushion-side pressure-receiving member 319 that receives a load from above the seat cushion 311a bridges between the pan frame 316b and the rear pipe 316c of the seat cushion frame 316. The cushion-side pressure-receiving member 319 has a plurality (four in this embodiment) of seat springs 320 that are formed by curving a metal wire in a zig-zag so as to snake to the left and right, these seat springs 320 being disposed so that adjacent seat springs 320 have lateral symmetry and the adjacent seat springs 320 being linked to each other by means of a plurality of intermediate linking members 321 that are made of a resin and molded by insertion molding so as to be integral with the seat spring 320.

Front end parts of the plurality of seat springs 320 are each engaged with latching parts 322 provided on the pan frame 316b of the seat frame 316. Rear end parts of the mutually adjacent seat springs 320 are linked by means of a rear end part-linking member 323 that is made of a resin, molded by insertion molding so as to be integral with the seat spring 320, and engaged with the support shaft 312 between the seat frame 315 and the seat back frame 317, the rear end part-linking member 323 being formed so as to cover the support shaft 312.

Referring again to FIG. 28, a back-side pressure-receiving member 324 formed from a resin, etc. so as to be elastically deformable is disposed between the pair of seat back side frames 317a of the seat back frame 317, and the back-side pressure-receiving member 324 bridges between the left and right seat back side frames 317a via an upper link wire 325 and a lower link wire 326.

The slide rail 313 is formed from a fixed rail 345 that extends in the vehicle fore-and-aft direction and a movable rail 346 that is slidably fitted to the fixed rail 345, a front part of the fixed rail 345 is fixed to a vehicle floor face 347 via a front bracket 348, and a rear part of the fixed rail 345 is fixed to the floor face 347 via a rear bracket 349. Moreover, the front bracket 348 is formed so as to be higher than the rear bracket 349, and the fixed rail 345, that is, the slide rail 313, extends in the vehicle fore-and-aft direction so as to be inclined so that its height decreases in going rearward in the vehicle fore-and-aft direction.

Referring in addition to FIG. 31 and FIG. 32, the seat cushion frame 316 is placed on the seat-rotating device 314, the seat-rotating device 314 including a base member 329 that can move along the slide rail 313, an annular rotating member 330 that supports the seat cushion frame 316 and is rotatably supported on the base member 329, and a cover member 331 that is fixed to the base member 329 while covering part of the rotating member 330 from above.

The base member 329 has an annular first bottom wall portion 329a, a cylindrical first side wall portion 329b that rises upward from an outer peripheral part of the first bottom wall portion 329a, and a first collar portion 329c that protrudes outward from an upper end part of the first side wall portion 329b, the first collar portion 329c being formed into a rectangular shape.

The cover member 331 has an annular second bottom wall portion 331a that abuts against the first bottom wall portion 329a of the base member 329 from above, a cylindrical second side wall portion 331b that rises slightly upward from the outer periphery of the second bottom wall portion 331a, a first taper portion 331c that is formed so as to have a larger diameter in going upward and is connectedly provided on an upper end part of the second side wall portion 331b, an annular first flat wall portion 331d that protrudes sideways from an upper end part of the first taper portion 331c, and a cylindrical third side wall portion 331e that rises upward from the outer periphery of the first flat wall portion 331d, the second bottom wall portion 331a being joined to the first bottom wall portion 329a of the base member 329 by a plurality of rivets 332.

The rotating member 330 has a second taper portion 330a that is disposed at a position opposing the first taper portion 331c of the cover member 331 from the outside and is formed so as to have a larger diameter in going upward, a cylindrical fourth side wall portion 330b that rises upward from an upper end part of the second taper portion 330a so as to oppose the third side wall portion 331e of the cover member 331 from the outside, and a second collar portion 330c that protrudes outward from the fourth side wall portion 330b, the second collar portion 330c being formed into a rectangular shape.

A frame support member 333 extending in parallel with the side frame 316a of the seat cushion frame 316 is fastened to the second collar portion 330c of the rotating member 330 via pluralities of first bolts 334 and second nuts 335. The side frame 316a is supported on the frame support member 333 so that it can be raised and lowered and cannot undergo relative rotation.

The rotating member 330 is rotatably supported on an annular rotation support part 336 of the base member 329 via a bearing 337, the rotation support part 336 being formed from the first bottom wall portion 329a and the first side wall portion 329b of the base member 329 so that its cross-sectional shape is substantially L-shaped.

The bearing 337 is formed by retaining balls 339 at a plurality of locations in the peripheral direction of an annular retainer 338, and an annular recess part 340 for the balls 339 to roll in is formed in the second taper portion 330a of the rotating member 330.

A housing part 341 is formed in a central part of the rotating member 330 so as to open both upward and downward by means of the second taper portion 330a and the fourth side wall portion 330b of the rotating member 330, the cover member 331 being housed and disposed within the housing part 341.

The first collar portion 329c of the base member 329 is fastened to the movable rail 346 by means of pluralities of second bolts 342 and second nuts 343.

The rotating member 330 is rotatingly driven by power exerted by an electric actuator for rotation 350 as a first electrical component mounted on at least one of the seat frame 315 and the rotating member 330 (in this embodiment the rotating member 330), and an input gear 352 provided on the base member 329 is meshed with an output gear 351 possessed by the electric actuator for rotation 350.

The electric actuator for rotation 350 includes an electric motor 353 that has a rotational axis extending in the vehicle width direction, a gear box 355 that is linked to a case 354 of the electric motor 353, and an output shaft 356 that protrudes from the gear box 355 with its rotational axis parallel to a rotational center 3C of the rotating member 330, the output gear 351 being provided on the output shaft 356. A gear reduction mechanism (not illustrated) that transmits the rotational power of the electric motor 353 to the output shaft 356 by changing the rotational direction through 90 degrees and decreasing the speed is housed within the gear box 355, this gear reduction mechanism including a worm gear so as to prevent the rotational power from the output shaft 356 side from being transmitted toward the electric motor 353 side.

The rotating member 330 is rotatingly driven through a range of 180 degrees, the input gear 352 is formed into an arc shape of substantially 180 degrees while having a gear portion 352a on the inner peripheral part, and the gear portion 352a is fixed to a lower face of an inner peripheral part of the first bottom wall portion 329a of the base member 329 so as to protrude radially inward from the inner periphery of the first bottom wall portion 329a.

When fixing the input gear 352 to the base member 329, some of the plurality of rivets 332, which are used to join the second bottom wall portion 331a of the cover member 331 to the first bottom wall portion 329a of the base member 329, are used for joining the second bottom wall portion 331a and the input gear 352 together to the first bottom wall portion 329a with the first bottom wall portion 329a sandwiched therebetween.

Mounted on the rotating member 330 is a mounting member 358 that is disposed further inside than an outer periphery 330d of the rotating member 330 in plan view, and mounted in the mounting member 358 is the actuator 350, which includes the electric motor 353. That is, the gear box 355 of the actuator 350 is mounted on an upper face of the mounting member 358, and the output gear 351 is provided on the output shaft 356, which extends through the mounting member 358.

The mounting member 358 is disposed further forward than the rotational center 3C of the rotating member 330. The mounting member 358 extends so as to be orthogonal to the longitudinal direction of the slide rail 313 while having on opposite end parts joining plate portions 358a that are joined to an upper face of the third collar portion 330c of the rotating member 330, and is formed so as to integrally have the pair of joining plate portions 358a, a pair of left and right inclined plate portions 358b that are provided so as to be connected to the joining plate portion 358a via an upper end part while being inclined downward in going radially inward of the rotating member 330, and a flat supporting plate portion 358c that provides a connection between lower ends of the inclined plate portions 358b.

An electric wire 359 connected to the electric motor 353 of the electric actuator for rotation 350 is retained by an electric wire retaining member 360 that is fixedly disposed at the rotational center 3C of the rotating member 330.

Disposed between the first taper portion 331c of the cover member 331 and the second taper portion 330a of the rotating member 330 is an annular slider 361 that is in sliding contact with each of the taper portions 331c, 330a. The slider 361 is employed in order to share the cover member 331 and the rotating member 330 with a vehicle seat device in which the rotating member 330 is rotated by applying manual power to the seat-rotating device 314 instead of electric power by means of the electric actuator for rotation 350. In a vehicle seat device in which rotation by manual power is made possible, instead of the slider 360, an annular member forming part of a mechanism that suppresses rattling of the rotating member 330 in a locked state in which rotation of the rotating member 330 is prevented is disposed between the first taper portion 331c and the second taper portion 330a.

A blower 365, which is a second electrical component, is mounted on at least one of the seat frame 315 and the rotating member 330, in this embodiment the pan frame 316b of the seat cushion frame 316 of the seat frame 315, and a duct 366 having one end portion 366a connected to the blower 365 has an opening 367 formed in the other end portion 366b, which functions as a blower outlet.

As shown in FIG. 30 the blower 365 is mounted on a lower part of the pan frame 316b via a blower support member 368, the opening 367 being disposed on the radially inner side of the annular rotating member 330 and on the radially inner side of the cover member 331 in plan view. The opening 367 opens toward the seat cushion 311a side, and is disposed in plan view as is clearly shown in FIG. 29 between a pair of seat springs 320 that are adjacent to each other among a plurality of seat springs 320 forming the cushion-side pressure-receiving member 319.

The other end portion 366b of the duct 366 protrudes slightly so as to be higher than the cushion-side pressure-receiving member 319, and an open edge 367a at the upper end of the opening 367 is disposed at a position higher than the annular rotating member 330 when viewed from the side.

An electric wire 369 connected to an electric motor (not illustrated) of the blower 365 is retained by the electric wire retaining member 360 fixedly disposed at the rotational center 3C of the rotating member 330.

Referring to FIG. 28, a link mechanism 371 is provided between the rotating member 330 of the seat-rotating device 314 and the seat frame 315, the link mechanism 371 including a pair of left and right link members 372 having one end part pivotably linked to the link pipe 316c on the inside of the pair of side frames 316a of the seat cushion frame 316 of the seat frame 315, and the other end parts of the link members 372 being pivotably linked to the frame support member 333 fixed to the rotating member 330 via a link pin 373. That is, the side frame 316a of the seat cushion frame 316 of the seat frame 315 is supported on the frame support member 333 fixed to the rotating member 330 so that it can be raised and lowered.

Mounted on at least one of the seat frame 315 and the rotating member 330, in this embodiment an outside face of one of the pair of side frames 316a of the seat frame 315, is an electric actuator for raising/lowering 374, which is a third electrical component, that can exert power for raising and lowering the seat frame 315.

Among the pair of link members 372 of the link mechanism 371 provided between frame support member 333 fixed to the rotating member 330 and the seat frame 315, the link member 372 on the one side frame 316a side has provided integrally therewith a sector gear (not illustrated) that can rotate around the axis of the link pin 373, the electric actuator for raising/lowering 374 includes a drive gear (not illustrated) meshing with the sector gear, and the sector gear is pivoted around the axis of the link pin 373 together with the link member 372 by rotation of the drive gear, thus making it possible to raise and lower the seat frame 315.

An electric wire 376 connected to an electric motor 375 of the electric actuator for raising/lowering 374 is guided to the inside of the seat-rotating device 314 via a through hole 377 formed in the one side frame 316a and is retained by the electric wire retaining member 360.

An electric actuator for tilting 378 as a fourth electrical component is mounted on a lower part of the seat back frame 317 of the seat frame 315. In this embodiment the electric actuator for tilting 378 is mounted on a lower part of one of the pair of seat back side frames 317a of the seat back frame 317.

An electric wire 380 connected to an electric motor 379 of the electric actuator for tilting 378 is made to extend to the inside of the seat-rotating device 314 and is retained by the electric wire retaining member 360.

An intermediate retaining member 381 is mounted on the seat back frame 317 or the rotating member 330 (in this embodiment the lower part of the one seat back side frame 317a of the seat back frame 317) in the vicinity of the support shaft 312 tiltably linking the seat back frame 317 to the seat cushion frame 316, and the electric wire 380 is retained on the electric wire retaining member 360 via the electric wire retaining member 381.

The electric wires 359, 369, 376, 380 individually connected to the electric actuator for rotation 350 as the first electrical component, the blower 365 as the second electrical component, the electric actuator for raising/lowering 374 as the third electrical component, and the electric actuator for tilting 378 as the fourth electrical component are collected together and retained by the single electric wire retaining member 360.

Moreover, the electric wire retaining member 360 is disposed at a position in which it retains the electric wires 359, 369, 376, 380 beneath the cushion-side pressure-receiving member 319, and is mounted directly on the cushion-side pressure-receiving member 319.

The operation of the embodiment is now explained. Electrical components are mounted on at least one of the seat frame 315 supporting the seat main body 311 and the rotating member 330 supporting the seat frame 315; in this embodiment the blower 365, the electric actuator for raising/lowering 374, and the electric actuator for tilting 378 as electrical components are mounted on the seat frame 315, and the electric actuator for rotation 350 as an electrical component is mounted on the rotating member 330, the electric wire 359 connected to the electric actuator for rotation 350, the electric wire 369 connected to the blower 365, the electric wire 376 connected to the electric actuator for raising/lowering 374, and the electric wire 380 connected to the electric actuator for tilting 378 being retained by the electric wire retaining member 360 fixedly disposed at the rotational center 3C of the rotating member 330, thus making it possible to avoid the occurrence of sagging or damage to the electric wires 359, 369, 376, 380 when the seat main body 311 is rotating.

Furthermore, since the electric wires 359, 369, 376, 380 individually connected to the electric actuator for rotation 350, the blower 365, the electric actuator for raising/lowering 374, and the electric actuator for tilting 378, which are the plurality of electrical components, are collected together and retained by the single electric wire retaining member 360, it is possible to compactly and collectively carry out wiring of the plurality of electric wires 359, 369, 376, 380.

Moreover, since the cushion-side pressure-receiving member 319, which receives a load from above the seat cushion 311a, is mounted on the cushion frame 316, which forms part of the seat frame 315 and is supported on the rotating member 330, and the electric wire retaining member 360 is disposed at a position in which it retains the electric wires 359, 369, 376, 380 beneath the cushion-side pressure-receiving member 319, it is possible to suppress protrusion of the electric wire retaining member 360 toward the seat face for an occupant, thus enabling interference of the electric wire retaining member 360 with the occupant seated on the seat face to be avoided.

Furthermore, since the electric wire retaining member 360 is mounted directly on the cushion-side pressure-receiving member 319, it is possible to efficiently dispose the electric wire retaining member 360 at the rotational center 3C of the rotating member 330 while avoiding any increase in the number of components due to there being no need for newly providing a member for mounting the electric wire retaining member 360.

Furthermore, since the seat frame 315 includes the seat cushion frame 316 supported on the rotating member 330, and the seat back frame 317 tiltably mounted on the seat cushion frame 316 via the support shaft 312, the electric actuator for tilting 378, which is the electrical component, is mounted on the lower part of the seat back frame 317 so that the seat back frame 317 can be driven so as to tilt, and the electric wire 380 connected to the electric actuator for tilting 378 is retained by the electric wire retaining member 360 via the intermediate retaining member 381 mounted on the seat back frame 317 in the vicinity of the support shaft 312, it is possible to prevent the occurrence of sagging or damage to the electric wire 380 between the electric wire retaining member 360 and the electric actuator for tilting 378 when the seat main body 311 is rotating or the seat back frame 317 is tilting.

A second embodiment of the present invention is explained by reference to FIG. 33 and FIG. 34; parts corresponding to those of the first embodiment are denoted by the same reference numerals and symbols and are only illustrated, detailed description thereof being omitted.

A retaining member-supporting part 383 is mounted on the base member 329 of the seat-rotating device 314, and an electric wire retaining member 384 is mounted on the retaining member-supporting member 383.

The retaining member-supporting member 383 is mounted on the base member 329 so as to pass through the rotational center 3C of the rotating member 330, and the electric wire retaining member 384 is mounted on the retaining member-supporting member 383 so as to retain, above the retaining member-supporting member 383, the electric wires 359, 369, 376, 380 individually connected to the electric actuator for rotation 350, the blower 365, the electric actuator for raising/lowering 374, and the electric actuator for tilting 378 as electrical components, while being disposed at the center of rotation 3C.

In accordance with the second embodiment, as in the above first embodiment, it is possible to avoid the occurrence of sagging or damage to the electric wires 359, 369, 376, 380 when the seat main body 311 is rotating, and it is also possible to carry out wiring by compactly collecting together the plurality of electric wires 359, 369, 376, 380. In addition thereto, when assembling the seat-rotating device 314, the electric wire retaining member 384 can be easily assembled, the workability improves, and since the electric wire retaining member 384 retains the electric wires 359, 369, 376, 380 above the retaining member-supporting member 383, it is possible to carry out wiring of the electric wires 359, 369, 376, 380 by compactly collecting them together within the seat-rotating device 314.

As a third embodiment of the present invention as shown in FIG. 35, an electric wire retaining member 386 retaining the electric wires 359, 369, 376, 380 individually connected to the electric actuator for rotation 350, the blower 365, the electric actuator for raising/lowering 374, and the electric actuator for tilting 378 as electrical components is mounted on a retaining member-supporting member 385 mounted on the base member 329 of the seat-rotating device 314, and the electric wires 359, 369, 376, 380 are retained by the electric wire retaining member 386 so that they are present beneath the retaining member-supporting member 385 and at the rotational center 3C of the rotating member 330.

In accordance with the third embodiment, the same effects as those of the above second embodiment can be exerted and, furthermore, due to assembly of the seat-rotating device 314 being carried out in a state in which the seat-rotating device 314 is laid sideways it is possible to easily retain the electric wires 359, 369, 376, 380 on the electric wire retaining member 386, thus improving the workability.

Embodiments of the present invention are explained above, but the present invention is not limited to the embodiments and may be modified in a variety of ways as long as the modifications do not depart from the subject matter thereof.

The invention claimed is:

1. A vehicle seat device that includes a rotation mechanism that has a rotating member having mounted thereon a seat cushion frame supporting a seat cushion and a base member rotatably supporting the rotating member from below,
wherein at least part, along a peripheral direction, of an outer periphery of an upper part of the rotating member is covered by a cover from the outside, and
wherein, in a state in which an occupant seated on the seat cushion faces forward in the vehicle fore-and-aft direction, a skin of the seat cushion is linked to a rear edge of an upper end part of the rotating member while being in contact with an outer face of the cover.

2. A vehicle seat device that includes a rotation mechanism that has a rotating member having mounted thereon a seat cushion frame supporting a seat cushion and a base member rotatably supporting the rotating member from below,
wherein at least part, along a peripheral direction, of an outer periphery of an upper part of the rotating member is covered by a cover from the outside,
wherein an outside face of the cover is formed into an arc shape that protrudes toward the outside of the rotating member.

3. The vehicle seat device according to claim 2, wherein, in a state in which an occupant seated on the seat cushion faces forward in the vehicle fore-and-aft direction, a fixed cover member that covers at least the base member from the rear is fixedly disposed beneath the cover, and
wherein the fixed cover member is formed so as to be in relatively slidable contact with a lower part of the cover in a state in which an occupant seated on the seat cushion faces forward in the vehicle fore-and-aft direction.

4. The vehicle seat device according to claim 2, wherein the cover is disposed at a position in which the cover covers the outer periphery of the upper part of the rotating member from a rear in a state in which an occupant seated on the seat cushion faces forward in a vehicle fore-and-aft direction.

5. The vehicle seat device according to claim 2, wherein the seat cushion frame has a pair of side frames that extend linearly and are supported on the rotating member, and the cover is mounted on the side frames.

6. The vehicle seat device according to claim 2, wherein the cover is formed by extending a skin of the seat cushion.

7. The vehicle seat device according to claim 2, wherein the cover is formed integrally with at least one of the pair of side covers.

8. A vehicle seat device that includes a rotation mechanism that has a rotating member having mounted thereon a seat cushion frame supporting a seat cushion and a base member rotatably supporting the rotating member from below,
- wherein at least part, along a peripheral direction, of an outer periphery of an upper part of the rotating member is covered by a cover from the outside,
- wherein the seat cushion frame has a pair of side frames that extend linearly and are supported on the rotating member, and
- wherein the lower end position of a side cover covering the side frame from the outside is set at the same height as the lower end position of the cover.

* * * * *